(12) United States Patent
Park

(10) Patent No.: US 12,707,161 B2
(45) Date of Patent: Aug. 11, 2026

(54) CAMERA APPARATUS AND OPTICAL DEVICE

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 226 days.

(21) Appl. No.: 18/577,594

(22) PCT Filed: Jul. 6, 2022

(86) PCT No.: PCT/KR2022/009743
§ 371 (c)(1),
(2) Date: Jan. 8, 2024

(87) PCT Pub. No.: WO2023/282613
PCT Pub. Date: Jan. 12, 2023

(65) Prior Publication Data
US 2024/0334077 A1 Oct. 3, 2024

(30) Foreign Application Priority Data
Jul. 7, 2021 (KR) ........................ 10-2021-0089006

(51) Int. Cl.
*H04N 25/48* (2023.01)
*H04N 23/54* (2023.01)
(Continued)

(52) U.S. Cl.
CPC ............. *H04N 25/48* (2023.01); *H04N 23/57* (2023.01); *H04N 23/667* (2023.01);
(Continued)

(58) Field of Classification Search
CPC ........ H04N 23/00; H04N 23/54; H04N 23/57; H04N 23/667; H04N 23/687; H04N 25/48; H04N 25/77
See application file for complete search history.

(56) References Cited

U.S. PATENT DOCUMENTS 10,554,949 B2 * 2/2020 Jeong .................. G02B 27/646
2017/0223250 A1 * 8/2017 Ajito .................. H04N 25/134
(Continued)

FOREIGN PATENT DOCUMENTS

JP 2019-191258 A 10/2019
JP 2020-096301 A 6/2020
(Continued)

OTHER PUBLICATIONS

International Search Report dated Sep. 29, 2022 in International Application No. PCT/KR2022/009743.
(Continued)

*Primary Examiner* — Amy R Hsu
(74) *Attorney, Agent, or Firm* — SALIWANCHIK, LLOYD & EISENSCHENK

(57) ABSTRACT

An embodiment comprises: a fixed part; a movable part located away from the fixed part and comprising an image sensor having an imaging area comprising a unit pixel; and a first control part for moving the movable part in a direction perpendicular to an optical axis with respect to the fixed part, wherein the first control part sequentially moves the movable part to predetermined locations, and the image sensor obtains pixel data of the imaging area from the predetermined locations.

19 Claims, 45 Drawing Sheets

(51) Int. Cl.
*H04N 23/57* (2023.01)
*H04N 23/667* (2023.01)
*H04N 23/68* (2023.01)
*H04N 25/77* (2023.01)

(52) U.S. Cl.
CPC ........... *H04N 23/687* (2023.01); *H04N 25/77* (2023.01); *H04N 23/54* (2023.01)

(56) References Cited

U.S. PATENT DOCUMENTS

| | | | | |
|---|---|---|---|---|
| 2020/0404183 | A1* | 12/2020 | Kimura .................. | H04N 25/61 |
| 2022/0094824 | A1* | 3/2022 | Yang ...................... | H04N 23/55 |
| 2022/0286591 | A1* | 9/2022 | Seo ........................ | H04N 23/54 |

FOREIGN PATENT DOCUMENTS

| | | | |
|---|---|---|---|
| KR | 10-2016-0087684 | A | 7/2016 |
| KR | 10-2020-0122013 | A | 10/2020 |
| KR | 10-2021-0081556 | A | 7/2021 |
| WO | 2019-092844 | A1 | 5/2019 |

OTHER PUBLICATIONS

Office Action dated Sep. 9, 2025 in Korean Application No. 10-2021-0089006.

* cited by examiner

<INITIAL POSITION>

CAMERA APPARATUS AND OPTICAL DEVICE

CROSS-REFERENCE TO RELATED APPLICATIONS

This application is the U.S. national stage application of International Patent Application No. PCT/KR2022/009743, filed Jul. 6, 2022, which claims the benefit under 35 U.S.C. § 119 of Korean Application No. 10-2021-0089006, filed Jul. 7, 2021, the disclosures of each of which are incorporated herein by reference in their entirety.

TECHNICAL FIELD

Embodiments relate to a camera device and an optical instrument including the same.

BACKGROUND ART

Voice coil motor (VCM) technology, which is used in conventional general camera devices, is difficult to apply to a micro-scale camera device, which is intended to exhibit low power consumption, and study related thereto has been actively conducted.

There is increasing demand for, and production of, electronic products such as smartphones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as autofocus, shutter shaking inhibition, and zooming in and out, are required.

DISCLOSURE

Technical Problem

Embodiments provide a camera device capable of improving resolution by securing additional pixel data of an imaging area of an image sensor through mechanical movement of an OIS moving unit and an optical instrument including the same.

Technical Solution

A camera device according to an embodiment includes a fixed unit, a moving unit spaced apart from the fixed unit and including an image sensor having an imaging area including a plurality of unit pixels, and a first controller configured to move the moving unit with respect to the fixed unit in a direction perpendicular to an optical axis, wherein the first controller is configured to sequentially move the moving unit to predetermined positions, and the image sensor is configured to obtain pixel data of the imaging area at the predetermined positions.

The predetermined positions may be positions spaced apart from an initial position of the moving unit by a predetermined distance in different directions, and the initial position may be a position of the moving unit in a state in which the moving unit is not moved by the first controller.

The predetermined positions may include a first position shifted from the initial position by the predetermined distance in a positive x-axis direction, a second position shifted from the initial position by the predetermined distance in a negative x-axis direction, a third position shifted from the initial position by the predetermined distance in a positive y-axis direction, and a fourth position shifted from the initial position by the predetermined distance in a negative y-axis direction.

The predetermined distance may be greater than or equal to one half the length of the unit pixel, and may be less than or equal to ten times the length of the unit pixel.

In a mode of taking a snapshot, the moving unit may be sequentially moved to the predetermined positions for a predetermined time period. The predetermined time period may be 1 second.

In a mode of taking a video, sequential movement of the moving unit to the predetermined positions may be repeatedly performed.

A pixel area of the imaging area at each of the predetermined positions may be defined as a pixel plane, and when the speed of the image sensor is a predetermined number of frames per second, the moving unit may be repeatedly moved to the predetermined positions in order to obtain a predetermined number of pixel planes per second.

The predetermined positions may include a first position spaced apart from the initial position of the moving unit by a predetermined distance in a +x-axis direction, a second position spaced apart from the first position by the predetermined distance in a +y-axis direction, a third position spaced apart from the second position by the predetermined distance in a −x-axis direction, and a fourth position spaced apart from the third position by the predetermined distance in a −y-axis direction, and the moving unit may be sequentially moved to the first position, the second position, the third position, and the fourth position.

The first controller may sequentially move the moving unit to the predetermined positions in the clockwise or counterclockwise direction.

The camera device may include a magnet disposed in the fixed unit and a coil disposed in the moving unit so as to face the magnet. The first controller may supply a driving signal to the coil, and may control the driving signal to sequentially move the moving unit to the predetermined positions.

One of the predetermined positions may be the initial position of the moving unit, and the initial position may be a position of the moving unit in a state in which the moving unit is not moved by the first controller.

A camera device according to another embodiment includes a fixed unit, a moving unit spaced apart from the fixed unit and including an image sensor having an imaging area including a plurality of unit pixels, and a first controller configured to move the moving unit with respect to the fixed unit in a direction perpendicular to an optical axis, wherein the first controller sequentially moves the moving unit to predetermined positions for a predetermined time period, and the image sensor obtains pixel data of the imaging area at each of the predetermined positions.

The first controller may move the moving unit to the predetermined positions once for the predetermined time period.

The first controller may move the moving unit to the predetermined positions twice or more for the predetermined time period. The predetermined time period may be 1 second. The moving unit may be repeatedly moved to the predetermined positions a predetermined number of times for 1 second.

The speed of the image sensor may be a predetermined number of frames per second. The predetermined number of times may be greater than or equal to a number of predetermined positions, and may be less than or equal to a value obtained by dividing the predetermined number of frames by the number of predetermined positions.

An optical instrument according to an embodiment includes the above-described camera device and a second controller configured to perform image processing on pixel data of the imaging area at the predetermined positions transmitted from the image sensor.

Advantageous Effects

According to embodiments, an image sensor may be moved to predetermined positions shifted in an x-axis or y-axis direction perpendicular to an optical axis. An image may be realized according to the result of performing image processing on pixel data of pixel planes at the predetermined positions. Accordingly, resolution obtainable through an image sensor having a given condition may be increased without increase in the pixel size of the image sensor.

DESCRIPTION OF DRAWINGS

FIG. 4C is a cross-sectional view taken along line EF in the camera device in

FIG. 1.

FIG. 33 illustrates an image obtained by performing image processing on images corresponding to pixel planes at the predetermined positions according to an embodiment, and FIG. 34 is a block diagram of an embodiment of the image sensor.

BEST MODE

Figure 1:
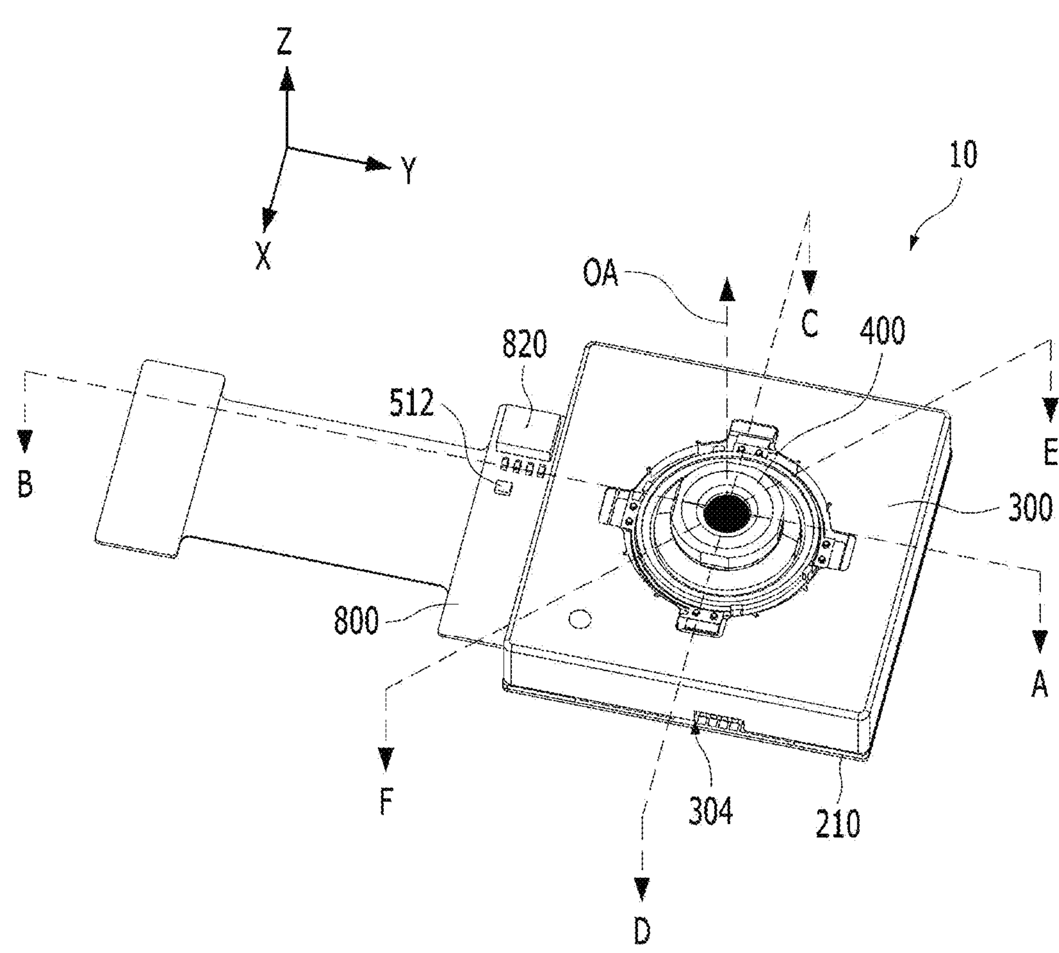
FIG. 1 is a perspective view of a camera device according to an embodiment.

Hereinafter, embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence, or procedure of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

Hereinafter, an AF moving unit may alternatively be referred to as a lens moving apparatus, a lens moving unit, a voice coil motor (VCM), an actuator, or a lens moving device. Hereinafter, a "coil" may alternatively be referred to as a coil unit, and an "elastic member" may alternatively be referred to as an elastic unit or a spring.

In addition, in the following description, a "terminal" may alternatively be referred to as a pad, an electrode, a conductive layer, or a bonding unit.

For convenience of description, a camera device according to an embodiment will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the direction of the optical axis OA, may be referred to as a "first direction", the x-axis direction may be referred to as a "second direction", and the y-axis direction may be referred to as a "third direction". In addition, for example, the x-axis direction may be referred to as "any one of the first horizontal direction and the second horizontal direction", and the y-axis direction may be referred to as "the other of the first horizontal direction and the second horizontal direction".

In addition, for example, the optical axis may be the optical axis of a lens mounted to a lens barrel. The first direction may be a direction perpendicular to an imaging area of an image sensor. In addition, for example, the optical-axis direction may be a direction parallel to the optical axis.

The camera device according to the embodiment may perform an "autofocus function". Here, the autofocus function is a function of automatically focusing an image of a subject on the surface of an image sensor.

Hereinafter, the camera device may alternatively be referred to as a "camera module", a "camera", an "image-capturing device", or a "lens moving device".

In addition, the camera device according to the embodiment may perform a "hand-tremor compensation function". Here, the hand-tremor compensation function is a function of inhibiting the contour of a captured still image from being blurred due to vibration caused by shaking of a hand of a user when capturing the still image.

Figure 2:
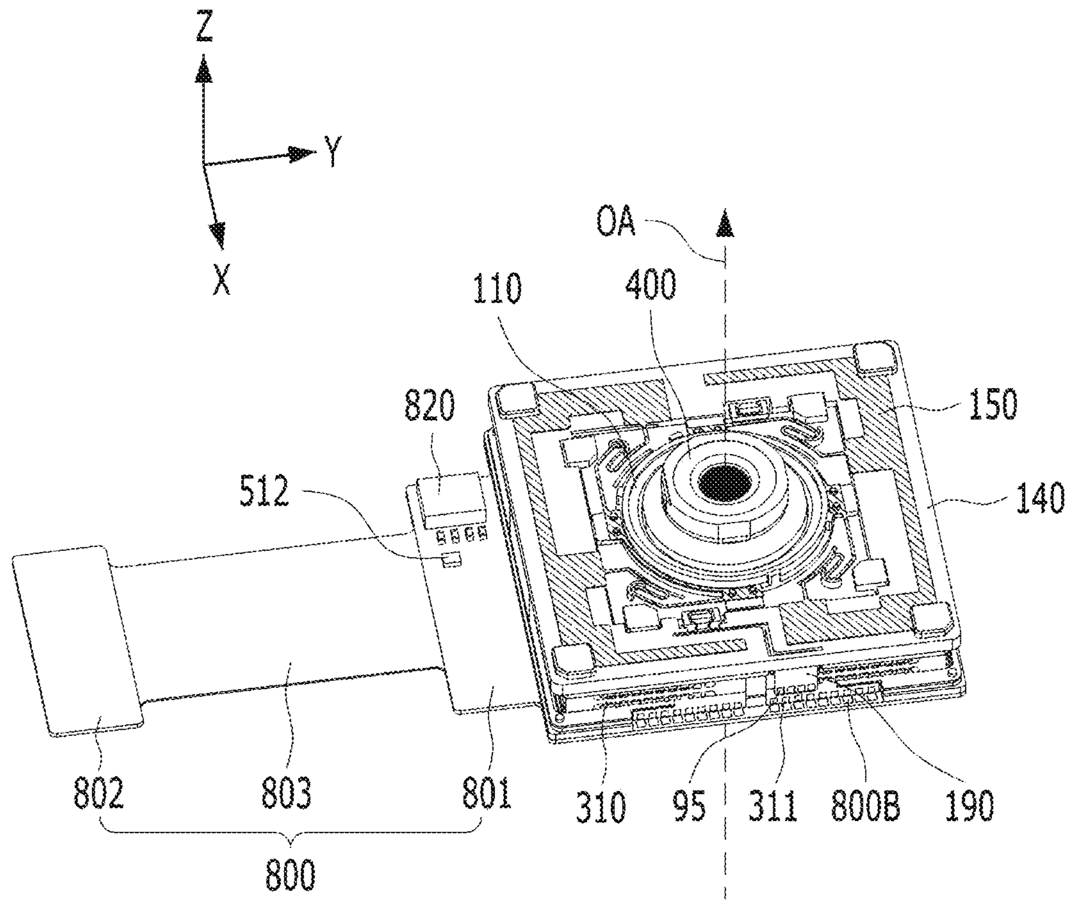
FIG. 2 is a perspective view of the camera device, with a cover member removed therefrom.
Figure 3:
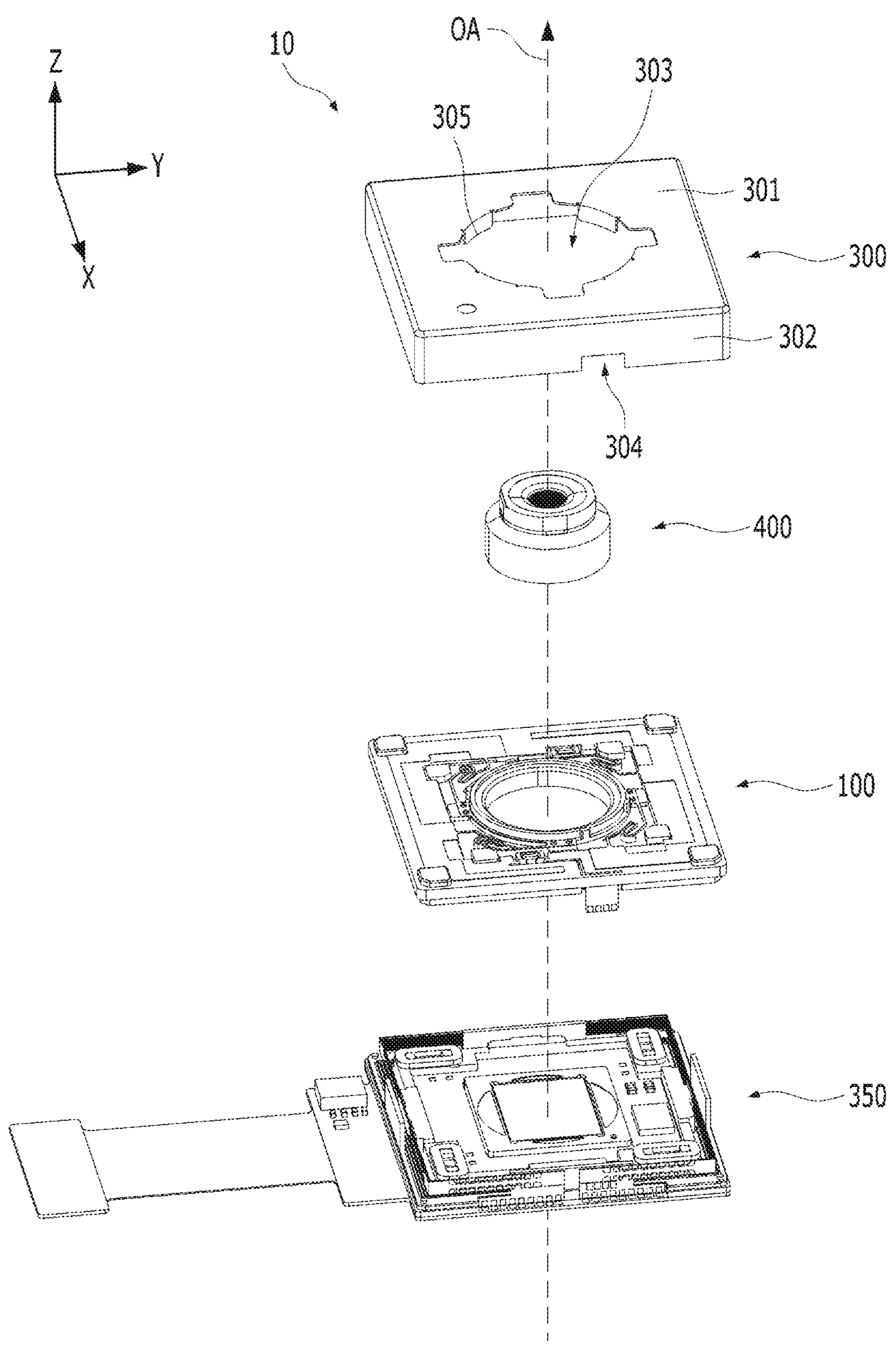
FIG. 3 is an exploded perspective view of the camera device in FIG. 1.
Figure 4A:
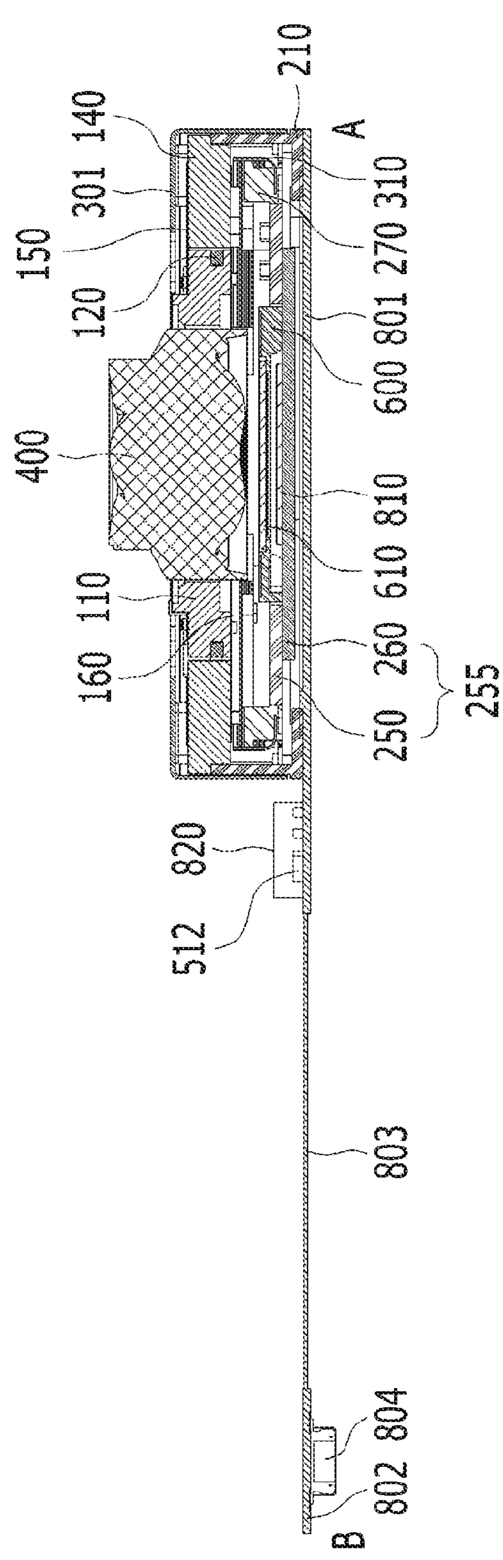
FIG. 4A is a cross-sectional view taken along line AB in the camera device in FIG. 1.
Figure 4B:
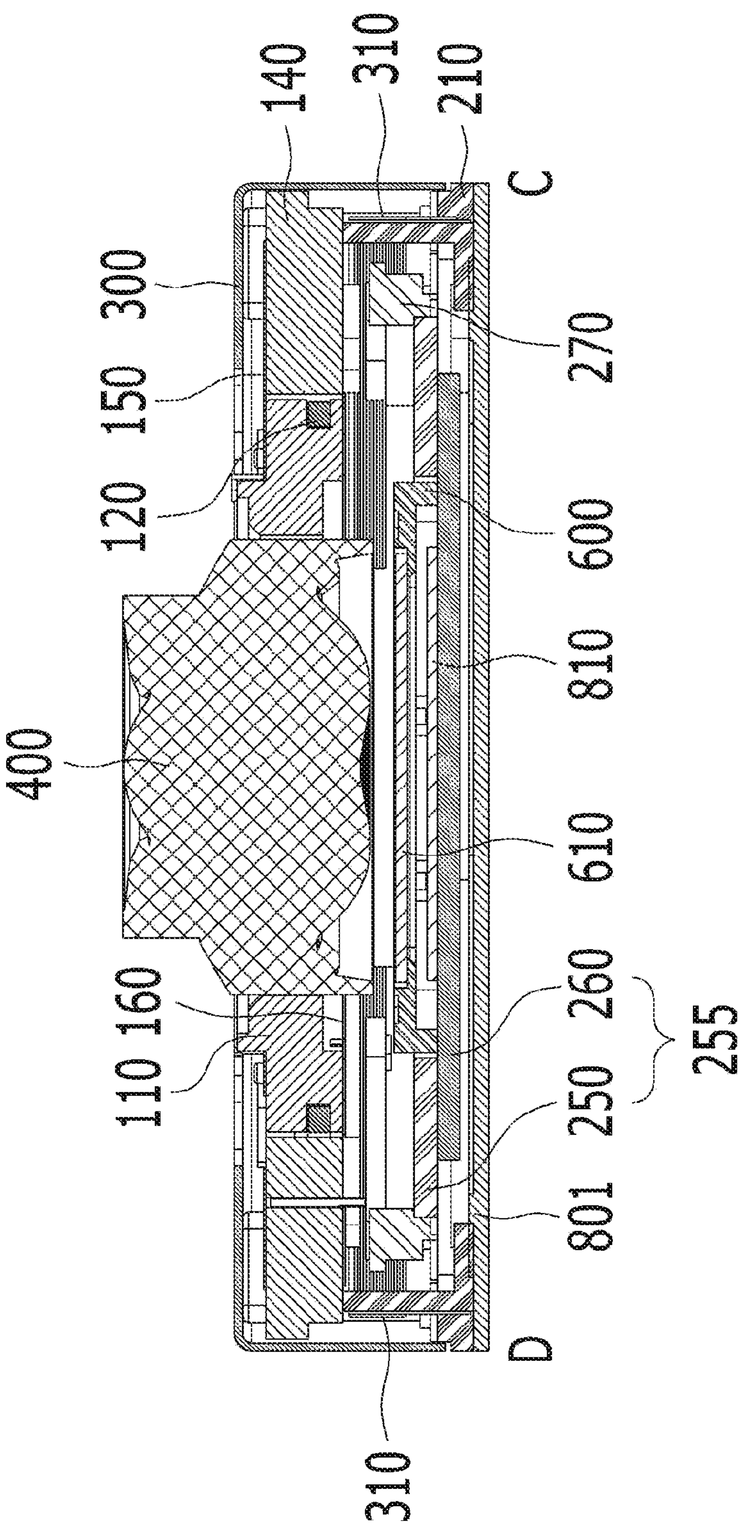
FIG. 4B is a cross-sectional view taken along line CD in the camera device in FIG. 1.
Figure 4C:
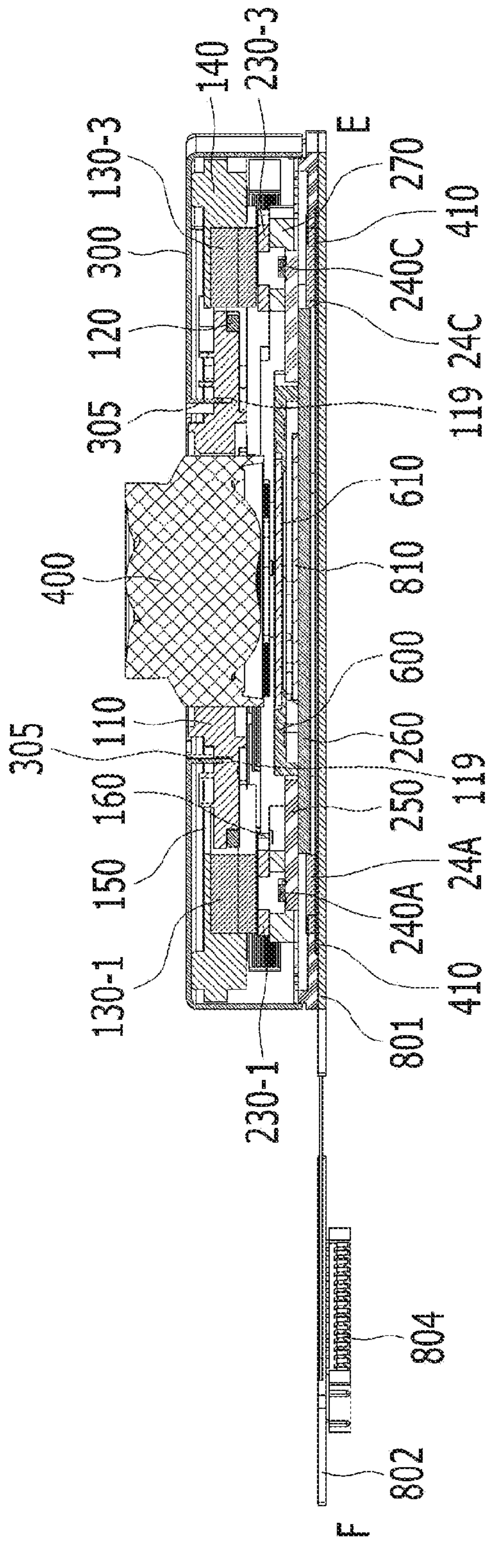
Figure 5:
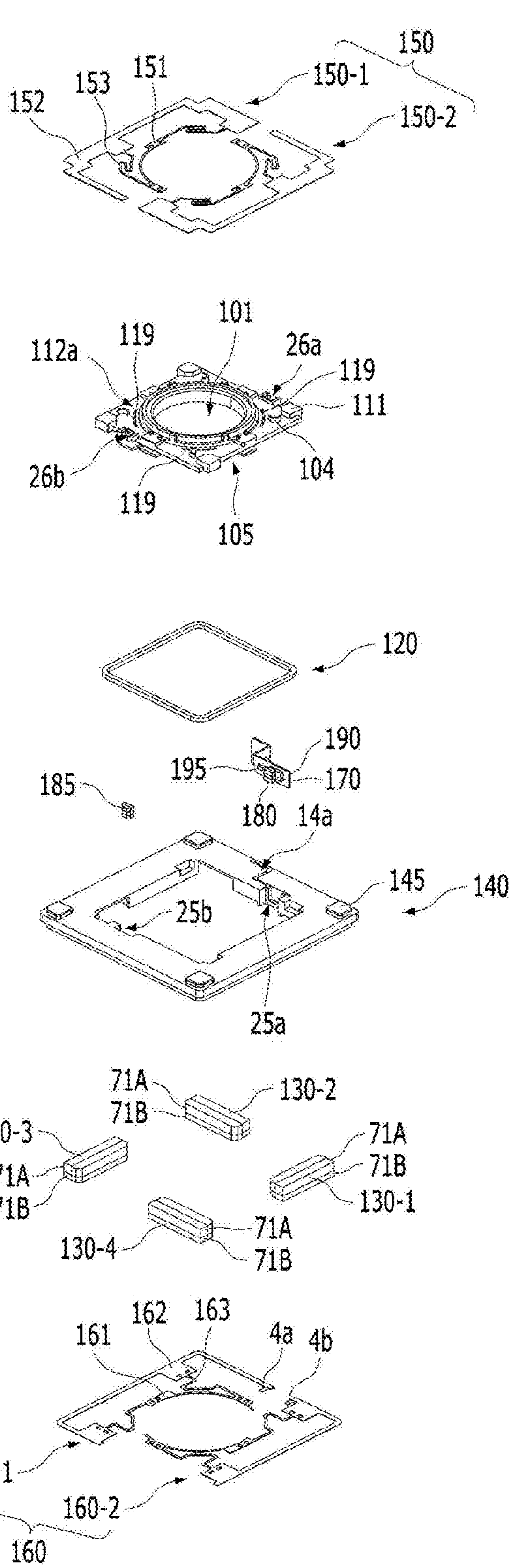
FIG. 5 is an exploded perspective view of the AF moving unit in FIG. 3.
Figure 6:
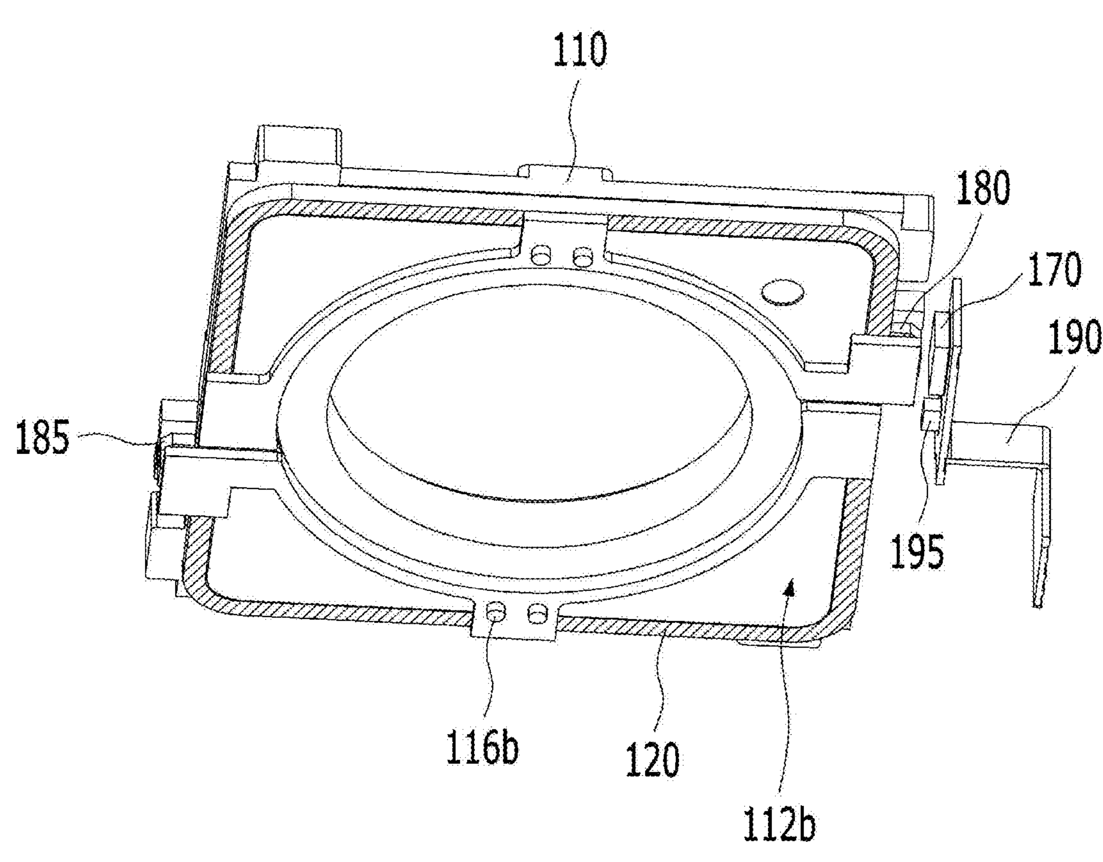
FIG. 6 is a perspective view of a bobbin, a sensing magnet, a balancing magnet, a first coil, a circuit board, a first position sensor, and a capacitor.
Figure 7:
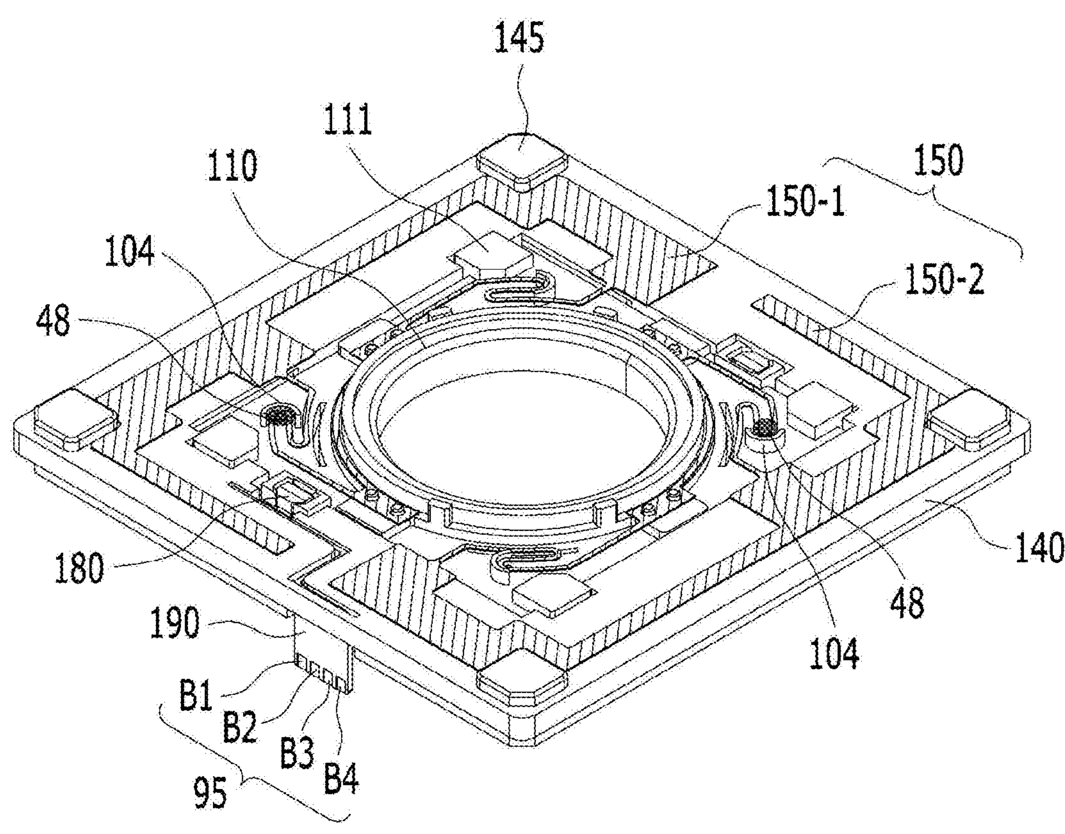
FIG. 7 is a perspective view of the bobbin, a housing, the circuit board, an upper elastic member, the sensing magnet, and the balancing magnet.
Figure 8:
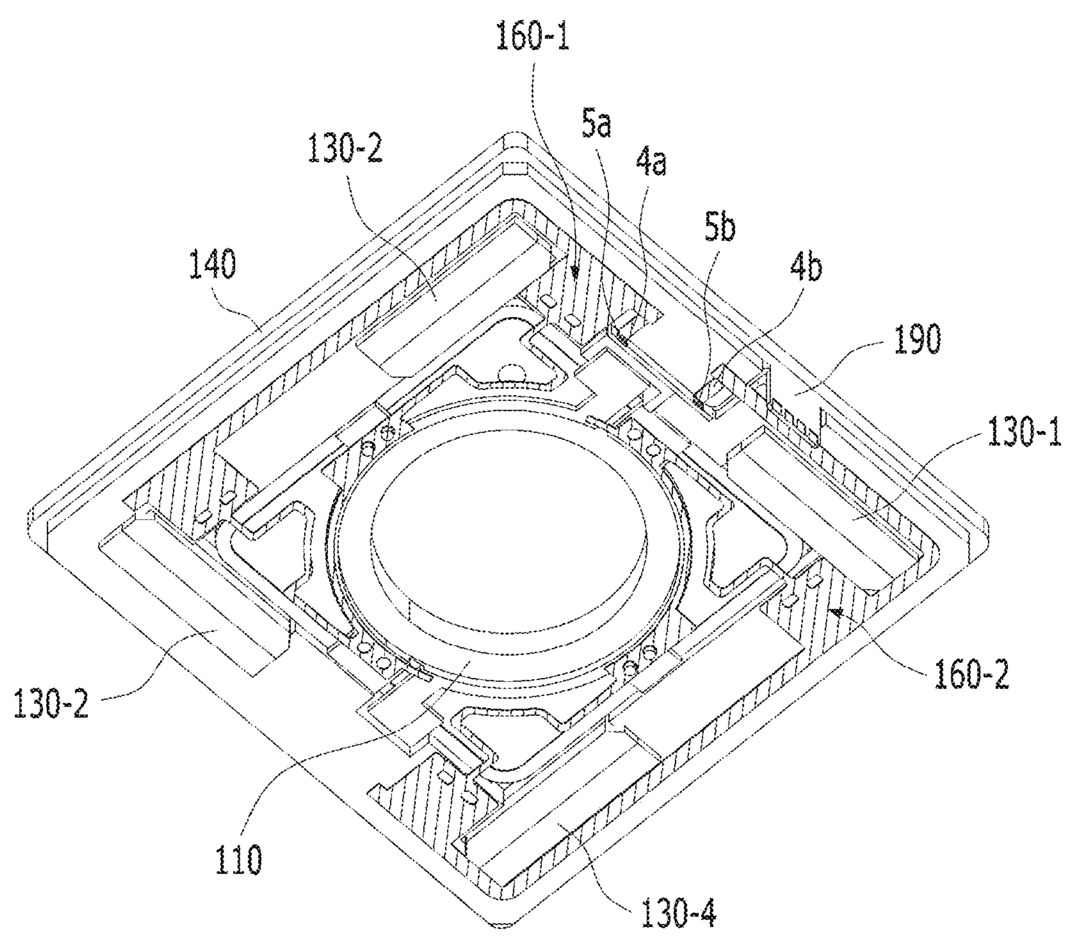
FIG. 8 is a bottom perspective view of the housing, the bobbin, a lower elastic member, a magnet, and the circuit board.

FIG. 1 is a perspective view of a camera device 10 according to an embodiment, FIG. 2 is a perspective view of the camera device 10, with a cover member 300 removed therefrom, FIG. 3 is an exploded perspective view of the camera device 10 in FIG. 1, FIG. 4A is a cross-sectional view taken along line AB in the camera device 10 in FIG. 1, FIG. 4B is a cross-sectional view taken along line CD in the camera device 10 in FIG. 1, FIG. 4C is a cross-sectional view taken along line EF in the camera device 10 in FIG. 1, FIG. 5 is an exploded perspective view of an AF moving unit 100 in FIG. 3, FIG. 6 is a perspective view of a bobbin 110, a sensing magnet 180, a balancing magnet 185, a first coil 120, a circuit board 190, a first position sensor 170, and a capacitor 195, FIG. 7 is a perspective view of the bobbin 110, a housing 140, the circuit board 190, an upper elastic member 150, the sensing magnet 180, and the balancing magnet 185, and FIG. 8 is a bottom perspective view of the housing 140, the bobbin 110, a lower elastic member 160, a magnet 130, and the circuit board 190.

Referring to FIGS. 1 to 8, the camera device 10 may include an AF moving unit 100 and an image sensor unit 350.

The camera device 10 may further include at least one of a cover member 300 or a lens module 400. The cover member 300 and a base 210 to be described later may constitute a case.

The AF moving unit 100 may be coupled to a lens module 400, and may move the lens module in the direction of the optical axis OA or a direction parallel to the optical axis, thereby performing the autofocus function of the camera device 10.

The image sensor unit 350 may include an image sensor 810. The image sensor unit 350 may move the image sensor 810 in a direction perpendicular to the optical axis. In addition, the image sensor unit 350 may tilt the image sensor 810 with respect to the optical axis or may rotate (or roll) the image sensor 810 about the optical axis. The hand-tremor compensation function of the camera device 10 may be performed by the image sensor unit 350.

In an example, the image sensor 810 may include an imaging area for sensing of light that has passed through the lens module 400. Here, the imaging area may alternatively be referred to as an effective area, a light-receiving area, an active area, or a pixel area. For example, the imaging area of the image sensor 810 may be a portion into which light that has passed through a filter 610 is introduced so as to form an image contained in the light, and may include at least one unit pixel. In an example, the imaging area may include a plurality of unit pixels.

The AF moving unit 100 may alternatively be referred to as a "lens moving unit" or a "lens moving apparatus". Alternatively, the AF moving unit 100 may be referred to as a "first moving unit (or second moving unit)", a "first actuator (or second actuator)", or an "AF driving unit".

In addition, the image sensor unit 350 may alternatively be referred to as an "image sensor moving unit", an "image sensor shift unit", a "sensor moving unit", or a "sensor shift unit". Alternatively, the image sensor unit 350 may be referred to as a "second moving unit (or first moving unit)" or a "second actuator (or first actuator)".

Referring to FIGS. 5 and 6, the AF moving unit 100 moves a bobbin 110 in the optical-axis direction. In an example, the AF moving unit 100 may include a bobbin 110, a first coil 120, a magnet 130, and a housing 140. The AF moving unit 100 may further include an upper elastic member 150 and a lower elastic member 160.

In addition, the AF moving unit 100 may further include a first position sensor 170, a circuit board 190, and a sensing magnet 180 in order to implement AF feedback. In addition, the AF moving unit 100 may further include at least one of a balancing magnet 185 or a capacitor 195.

The bobbin 110 may be disposed in the housing 140, and may be moved in the direction of the optical axis OA or the first direction (e.g., the Z-axis direction) by electromagnetic interaction between the first coil 120 and the magnet 130.

The bobbin 110 may have a bore formed therein in order to be coupled to the lens module 400 or to mount the lens module 400 therein. In an example, the bore in the bobbin 110 may be a through-hole formed through the bobbin 110 in the optical-axis direction, and may have a circular shape, an elliptical shape, or a polygonal shape, without being limited thereto.

The lens module 400 may include at least one lens and/or a lens barrel.

For example, the lens module 400 may include one or more lenses and a lens barrel accommodating the one or more lenses. However, the disclosure is not limited thereto. Any of various holding structures may be used in place of the lens barrel, so long as the same is capable of supporting one or more lenses.

In an example, the lens module 400 may be screwed to the bobbin 110. Alternatively, in another example, the lens module 400 may be coupled to the bobbin 110 by means of an adhesive (not shown). Meanwhile, light that has passed through the lens module 400 may pass through the filter 610, and may be introduced into the image sensor 810.

The bobbin 110 may be provided on the outer surface thereof with a protruding portion 111. In an example, the protruding portion 111 may protrude in a direction parallel to a line perpendicular to the optical axis OA. However, the disclosure is not limited thereto.

The protruding portion 111 of the bobbin 110 may correspond to a recessed portion 25*a* in the housing 140, and may be inserted into or disposed in the recessed portion 25*a* in the housing 140. The protruding portion 111 may suppress or inhibit the bobbin 110 from rotating beyond a predetermined range about the optical axis. In addition, the protruding portion 111 may serve as a stopper for inhibiting the bobbin 110 from moving beyond a predetermined range in the optical-axis direction (e.g., the direction from the upper elastic member 150 toward the lower elastic member 160) due to external impact or the like.

The bobbin 110 may have a first escape recess 112*a* formed in the upper surface thereof to avoid spatial interference with a first frame connection portion 153 of the upper elastic member 150. In addition, the bobbin 110 may have a second escape recess 112*b* formed in the lower surface thereof to avoid spatial interference with a second frame connection portion 163 of the lower elastic member 160.

The bobbin 110 may include a first coupling portion 116*a* in order to be coupled or secured to the upper elastic member 150. In an example, the first coupling portion of the bobbin 110 may take the form of a protrusion, but the disclosure is not limited thereto. In another embodiment, the first coupling portion of the bobbin may take the form of a flat surface or a recess.

In addition, the bobbin 110 may include a second coupling portion 116*b* in order to be coupled or secured to the lower elastic member 160. In an example, the second coupling portion 116*b* may take the form of a protrusion, but the disclosure is not limited thereto. In another embodiment, the second coupling portion may take the form of a flat surface or a recess.

Referring to FIG. 6, the bobbin 110 may have a recess formed in the outer surface thereof to allow the first coil 120 to be seated therein, inserted thereinto, or disposed therein. The recess in the bobbin 110 may have a closed curve shape (e.g., a ring shape), which coincides with the shape of the first coil 120.

In addition, the bobbin 110 may have a first seating recess 26*a* formed therein to allow the sensing magnet 180 to be seated therein, inserted thereinto, secured thereto, or disposed therein. In addition, the bobbin 110 may have a second seating recess 26*b* formed in the outer surface thereof to allow the balancing magnet 185 to be seated therein, inserted thereinto, secured thereto, or disposed therein. In an example, the first and second seating recesses 26*a* and 26*b* in the bobbin 110 may be formed in the outer surfaces of the bobbin 110 that face each other.

Referring to FIGS. 5 and 7, a damper 48 may be disposed between the bobbin 110 and the upper elastic member 150. In an example, the damper 48 may be disposed between the bobbin 110 and the first frame connection portion 153 of the upper elastic member 150 so as to be in contact therewith, coupled thereto, or attached thereto.

In an example, the bobbin 110 may be provided with a protrusion 104 protruding from the upper surface thereof so as to correspond to the first frame connection portion 153 of the upper elastic member 150. In an example, the protrusion 104 may protrude from the bottom surface of the first escape recess in the bobbin 110.

The damper 48 may be disposed between the protrusion 104 of the bobbin 110 and the first frame connection portion 153 of the upper elastic member 150. The damper 48 may be in contact with and attached to the protrusion 104 of the bobbin 110 and the first frame connection portion 153, and may serve to alleviate or absorb vibration of the bobbin 110. For example, the damper 48 may be embodied as a damping member (e.g., silicone). The protrusion 104 may serve to guide the damper 48.

The bobbin 110 may have a groove 119 or a groove portion formed in the upper surface thereof at a position corresponding to, facing, or overlapping the protruding portion 305 of the cover member 300 in the first direction (or the optical-axis direction). In an example, the groove 119 may be formed so as to be depressed into the bottom surface of the first escape recess 112*a*. In another embodiment, the groove 119 may be formed so as to be depressed into the upper surface of the bobbin 110.

The first coil 120 may be disposed on or coupled to the bobbin 110. In an example, the first coil 120 may be disposed on the outer surface of the bobbin 110. In an example, the first coil 120 may surround the outer surface of the bobbin 110 in the direction of rotation about the optical axis OA, but the disclosure is not limited thereto.

The first coil 120 may be directly wound around the outer surface of the bobbin 110, but the disclosure is not limited thereto. In another embodiment, the first coil 120 may be wound around the bobbin 110 using a coil ring, or may be embodied as a coil block having an angled ring shape.

Power or a driving signal may be supplied to the first coil 120. The power or the driving signal supplied to the first coil 120 may be a DC signal, an AC signal, or a signal containing both DC and AC components, and may be of a voltage type or a current type.

When a driving signal (e.g., driving current) is supplied to the first coil 120, electromagnetic force may be generated by electromagnetic interaction with the magnet 130, and the bobbin 110 may be moved in the direction of the optical axis OA by the generated electromagnetic force.

At the initial position of an AF operation unit, the bobbin 110 may be movable upward or downward, which is referred to as bidirectional driving of the AF operation unit. Alternatively, at the initial position of the AF operation unit, the bobbin 110 may be movable upward, which is referred to as unidirectional driving of the AF operation unit.

For example, the maximum stroke of the bobbin 110 in the upward direction from the initial position thereof may be 400 micrometers to 500 micrometers, and the maximum stroke of the bobbin 110 in the downward direction from the initial position thereof may be 100 micrometers to 200 micrometers.

At the initial position of the AF operation unit, the first coil 120 may be disposed so as to correspond to or overlap the magnet 130, which is disposed in the housing 140, in a direction parallel to a line that is perpendicular to the optical axis OA and extends through the optical axis.

In an example, the AF operation unit may include the bobbin 110 and components coupled to the bobbin 110 (e.g., the first coil 120, the sensing magnet 180, and the balancing magnet 185). In addition, the AF operation unit may further include the lens module 400.

The initial position of the AF operation unit may be the original position of the AF operation unit in the state in which no power is supplied to the first coil 120 or a position at which the AF operation unit is located as the result of the upper and lower elastic members 150 and 160 being elastically deformed due only to the weight of the AF operation unit. In addition, the initial position of the bobbin 110 may be a position at which the AF operation unit is located when gravity acts in the direction from the bobbin 110 toward the base 210 or when gravity acts in the direction from the base 210 toward the bobbin 110.

The sensing magnet 180 may provide a magnetic field, which is to be detected by the first position sensor 170, and the balancing magnet 185 may cancel out the influence of the magnetic field of the sensing magnet 180 and may establish weight equilibrium with the sensing magnet 180.

The sensing magnet 180 may alternatively be referred to as a "sensor magnet" or a "second magnet". The sensing magnet 180 may be disposed on the bobbin 110, or may be coupled to the bobbin 110. The sensing magnet 180 may be disposed so as to face the first position sensor 170. The balancing magnet 185 may be disposed on the bobbin 110, or may be coupled to the bobbin 110. In an example, the balancing magnet 185 may be disposed opposite the sensing magnet 180.

In an example, each of the sensing magnet 180 and the balancing magnet 185 may be a monopolar-magnetized magnet, which has one N pole and one S pole, but the disclosure is not limited thereto. In another embodiment, each of the sensing magnet 180 and the balancing magnet 185 may be a bipolar-magnetized magnet or a 4-pole magnet, which includes two N poles and two S poles.

The sensing magnet 180 may be moved together with the bobbin 110 in the optical-axis direction, and the first position sensor 170 may detect the intensity of the magnetic field or the magnetic force of the sensing magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

The housing 140 is disposed inside the cover member 300. The housing 140 may accommodate therein the bobbin 110, and may support the magnet 130, the first position sensor 170, and the circuit board 190.

Referring to FIGS. 5, 7, and 8, the housing 140 may be formed so as to take the overall shape of a hollow column. In an example, the housing 140 may have a polygonal (e.g., quadrangular or octagonal) or circular bore formed therein, and the bore in the housing 140 may take the form of a through-hole formed through the housing 140 in the optical-axis direction.

The housing 140 may include side portions, which correspond to or face side plates 302 of the cover member 300, and corners, which correspond to or face the corners of the cover member 300.

The housing 140 may be provided on the upper portion, the upper surface, or the upper end thereof with a stopper 145 in order to be inhibited from directly colliding with the inner surface of the upper plate 301 of the cover member 300.

Referring to FIG. 5, the housing 140 may include a mounting groove (or a seating groove) **14*a* formed therein to accommodate the circuit board 190. The mounting groove 14*a* may have a shape coinciding with the shape of the circuit board 190**.

Referring to FIG. 7, the housing 140 may include an opening formed therein to expose terminals B1 to B4 of a terminal unit 95 of the circuit board 190 therethrough. The opening may be formed in the side portion of the housing 140.

The housing 140 may be provided on the upper portion, the upper end, or the upper surface thereof with at least one first coupling portion for coupling to a first outer frame 152 of the upper elastic member 150. The housing 140 may be provided on the lower portion, the lower end, or the lower surface thereof with a second coupling portion for coupling and securing to a second outer frame 162 of the lower elastic member 160. For example, each of the first and second coupling portions of the housing 140 may be formed in the shape of a flat surface, a protrusion, or a recess.

The magnet 130 may be disposed on the housing 140, which is the fixed unit. In an example, the magnet 130 may be disposed on a side portion of the housing 140. The magnet 130 may be a driving magnet for AF operation. In another embodiment, the magnet 130 may be disposed on a corner portion of the housing.

For example, the magnet 130 may include a plurality of magnet units. In an example, the magnet 130 may include first to fourth magnet units 130-1 to 130-4 disposed on the housing 140. In another embodiment, the magnet 130 may include two or more magnet units.

The magnet 130 may be disposed on at least one of the side portion or the corner of the housing 140. In an example, at least a portion of the magnet 130 may be disposed on the side portion or the corner of the housing 140.

For example, each of the magnet units 130-1 to 130-4 may include a first portion disposed on a corresponding corner among the four corners of the housing 130. In addition, each of the magnet units 130-1 to 130-4 may include a second portion disposed on the side portion of the housing 140 that is adjacent to the corresponding corner of the housing 140.

In an example, the first magnet unit 130-1 and the second magnet unit 130-2 may correspond to or face each other in the first horizontal direction (e.g., the Y-axis direction). The second magnet unit 130-2 and the third magnet unit 130-3 may correspond to or face each other in the second horizontal direction (e.g., the X-axis direction). The third magnet unit 130-3 and the fourth magnet unit 130-4 may correspond to or face each other in the first horizontal direction (e.g., the Y-axis direction). The fourth magnet unit 130-4 and the first magnet unit 130-1 may correspond to or face each other in the second horizontal direction (e.g., the X-axis direction).

At the initial position of the AF operation unit, the magnet 130 may be disposed on the housing 140 such that at least a portion thereof overlaps the first coil 120 in a direction parallel to a line that is perpendicular to the optical axis OA and extends through the optical axis OA.

The magnet 130 may be a monopolar-magnetized magnet, which includes one N pole and one S pole. In another embodiment, the magnet 130 may be a bipolar-magnetized magnet or a 4-pole magnet, which includes two N poles and two S poles.

In an example, the magnet 130 may be a common magnet for implementing AF operation and OIS operation.

The circuit board 190 may be disposed in the housing 140. The first position sensor 170 may be disposed or mounted on the circuit board 190, and may be conductively connected to the circuit board 190. In an example, the circuit board 190 may be disposed in the mounting groove **14*a* in the housing 140, and the terminals B1 to B4 of the circuit board 190 may be exposed outside the housing 140**.

The circuit board 190 may be provided with a terminal unit (or terminal part) 95 including a plurality of terminals B1 to B4 for conductive connection to an external terminal or an external device. The plurality of terminals B1 to B4 of the circuit board 190 may be conductively connected to the first position sensor 170.

The first position sensor 170 may be disposed on a first surface of the circuit board 190, and the plurality of terminals B1 to B4 may be disposed on a second surface of the circuit board 190. Here, the second surface of the circuit board 190 may be a surface opposite the first surface of the circuit board 190. For example, the first surface of the circuit board 190 may be the surface of the circuit board 190 that faces the bobbin 110 or the sensing magnet 180.

For example, the circuit board 190 may be a printed circuit board or an FPCB.

The circuit board 190 may include a circuit pattern or wiring (not shown) for conductive connection of the first to fourth terminals B1 to B4 to the first position sensor 170.

In an example, at the initial position of the AF operation unit, at least a portion of the first position sensor 170 may face or overlap the sensing magnet 180 in a direction parallel to a line that is perpendicular to the optical axis OA and extends through the optical axis OA. In another embodiment, at the initial position of the AF operation unit, the first position sensor may not face or overlap the sensing magnet.

The first position sensor 170 serves to detect the movement, displacement, or position of the bobbin 110 in the optical-axis direction. That is, when the bobbin 110 is moved, the first position sensor 170 may detect the magnetic field or the intensity of the magnetic field of the sensing magnet 180 mounted to the bobbin 110, and may output an output signal corresponding to the result of the detection. The movement, displacement, or position of the bobbin 110 in the optical-axis direction may be detected using the output from the first position sensor 170.

The first position sensor 170 may be a driver IC including a Hall sensor and a driver. The first position sensor 170 may include first to fourth terminals for transmitting and receiving data to and from the outside through data communication using a protocol, such as I2C communication, and fifth and sixth terminals for directly supplying a driving signal to the first coil 120.

The first position sensor 170 may be conductively connected to the first to fourth terminals B1 to B4 of the circuit board 190. In an example, each of the first to fourth terminals of the first position sensor 170 may be conductively connected to a corresponding one of the first to fourth terminals of the circuit board 190.

The fifth and sixth terminals of the first position sensor 170 may be conductively connected to the first coil 120 via at least one of the upper elastic member 150 or the lower elastic member 160, and may supply a driving signal to the first coil 120. In an example, a portion of the first lower elastic member 160-1 may be connected to one end of the first coil 120, and another portion of the first lower elastic member 160-1 may be conductively connected to the circuit board 190. A portion of the second lower elastic member 160-2 may be connected to the other end of the first coil 120, and another portion of the second lower elastic member 160-2 may be conductively connected to the circuit board 190. The fifth and sixth terminals of the first position sensor 170 may be conductively connected to the first and second lower elastic members 160-1 and 160-2 and the first coil 120 via the circuit board 190.

In another embodiment, the first coil may be conductively connected to the circuit board 190 and the fifth and sixth terminals of the first position sensor 170 via the two upper elastic members.

For example, in an embodiment in which the first position sensor 170 is a driver IC, the first and second terminals B1 and B2 of the circuit board 190 may be a power terminal for supply of power, the third terminal may be a terminal for transmission and reception of a clock signal, and the fourth terminal may be a terminal for transmission and reception of a data signal.

In another embodiment, the first position sensor 170 may be a Hall sensor. The first position sensor 170 may include two input terminals for reception of a driving signal or power supplied thereto and two output terminals for output of a sensing voltage (or output voltage). In an example, a driving signal may be supplied to the first position sensor 170 through the first and second terminals B1 and B2 of the circuit board 190, and the output from the first position sensor 170 may be output to the outside through the third and fourth terminals B3 and B4. In addition, the first coil 120 may be conductively connected to the circuit board 190, and a driving signal may be supplied to the first coil 120 from the outside through the circuit board 190. In this case, the circuit board 190 may further include two separate terminals to receive a driving signal to be supplied to the first coil 120.

In an example, among the power terminals of the first position sensor 170, a ground terminal may be conductively connected to the cover member 300.

The capacitor 195 may be disposed or mounted on the first surface of the circuit board 190. The capacitor 195 may be of a chip type. In this case, the chip may include a first terminal, which corresponds to one end of the capacitor 195, and a second terminal, which corresponds to the other end of the capacitor 195. The capacitor 195 may alternatively be referred to as a “capacitive element” or a condenser.

The capacitor 195 may be conductively connected in parallel to the first and second terminals B1 and B2 of the circuit board 190, through which power (or a driving signal) is supplied to the first position sensor 170 from the outside. Alternatively, the capacitor 195 may be conductively connected in parallel to the terminals of the first position sensor 170, which are conductively connected to the first and second terminals B1 and B2 of the circuit board 190.

Since the capacitor 195 is conductively connected in parallel to the first and second terminals B1 and B2 of the circuit board 190, the capacitor 195 may serve as a smoothing circuit for removing ripple components included in power signals GND and VDD, which are supplied to the first position sensor 170 from the outside, and thus may supply stable and consistent power signals to the first position sensor 170.

The upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

The upper elastic member 150 may include a plurality of upper elastic units (e.g., 150-1 and 150-2), which are conductively separated or isolated from each other, and the lower elastic member 160 may include a plurality of lower elastic units (e.g., 160-1 and 160-2), which are conductively separated or isolated from each other.

Each of the upper elastic member and the lower elastic member is described as including two elastic units. However, in another embodiment, at least one of the upper elastic member or the lower elastic member may be embodied as a single unit or a single construction.

The upper elastic member 150 may further include a first inner frame 151 coupled or secured to the upper portion, the upper surface, or the upper end of the bobbin 110, a second inner frame 152 coupled or secured to the upper portion, the upper surface, or the upper end of the housing 140, and a first frame connection portion 153 interconnecting the first inner frame 151 and the first outer frame 152.

The lower elastic member 160 may further include a second inner frame 161 coupled or secured to the lower portion, the lower surface, or the lower end of the bobbin 110, a second outer frame 162 coupled or secured to the lower portion, the lower surface, or the lower end of the housing 140, and a second frame connection portion 163 interconnecting the second inner frame 161 and the second outer frame 162. The inner frame may alternatively be referred to as an inner portion, the outer frame may alternatively be referred to as an outer portion, and the frame connection portion may alternatively be referred to as a connection portion.

Each of the first and second frame connection portions 153 and 163 may be formed so as to be bent or curved (or crooked) at least once to form a predetermined pattern.

Each of the upper elastic member 150 and the lower elastic member 160 may be formed of a conductive material, for example, a metallic material.

Referring to FIG. 8, the circuit board 190 may be provided with two pads 5*a* and 5*b*. The two pads 5*a* and 5*b* may be conductively connected to the first position sensor 170. In an example, the two pads 5*a* and 5*b* may be conductively connected to the fifth and sixth terminals of the first position sensor 170.

In addition, the first pad 5*a* of the circuit board 190 may be conductively connected to the first lower elastic unit 160-1, and the second pad 5*b* of the circuit board 190 may be conductively connected to the second lower elastic unit 160-2.

In an example, the second outer frame 162 of the first lower elastic unit 160-1 may include a first bonding portion 4*a*, which is coupled or conductively connected to the first pad 5*a* of the circuit board 190, and the second outer frame 162 of the second lower elastic unit 160-2 may include a second bonding unit 4*b*, which is conductively connected to the second pad 5*b* of the circuit board 190.

In another embodiment, at least one of the upper elastic member 150 or the lower elastic member 160 may include two elastic members. In an example, each of the two elastic members of any one of the upper elastic member 150 and the lower elastic member 160 may be coupled or conductively connected to a corresponding one of the first and second pads of the circuit board 190, and the first coil 120 may be conductively connected to the two elastic members.

Figure 9:
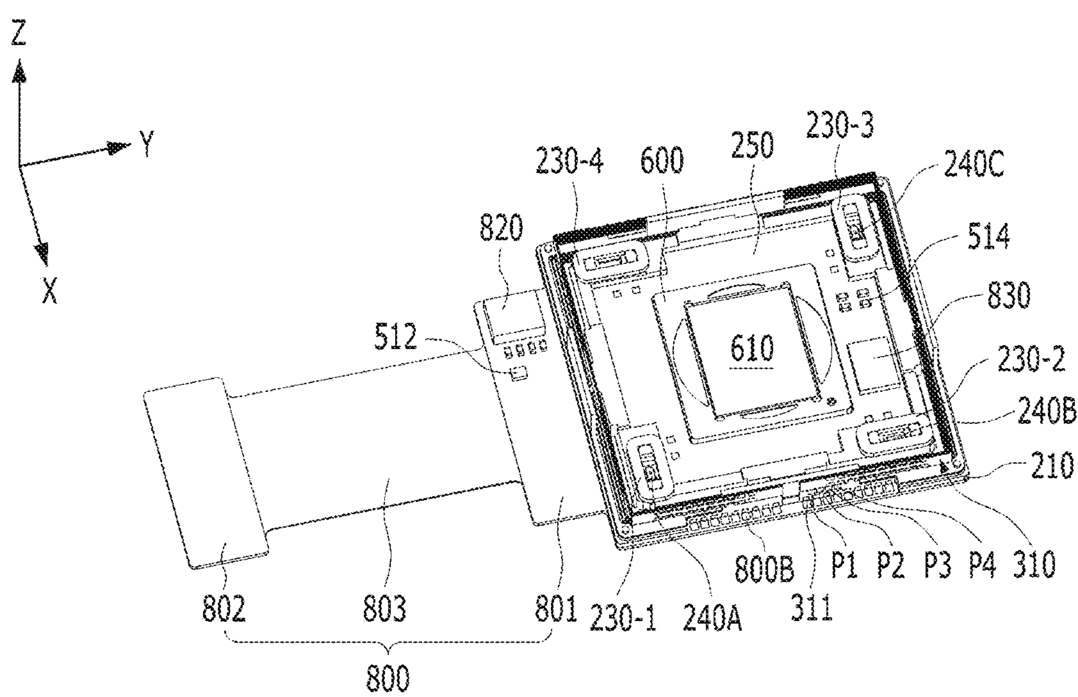
FIG. 9 is a perspective view of an image sensor unit.
Figure 10A:
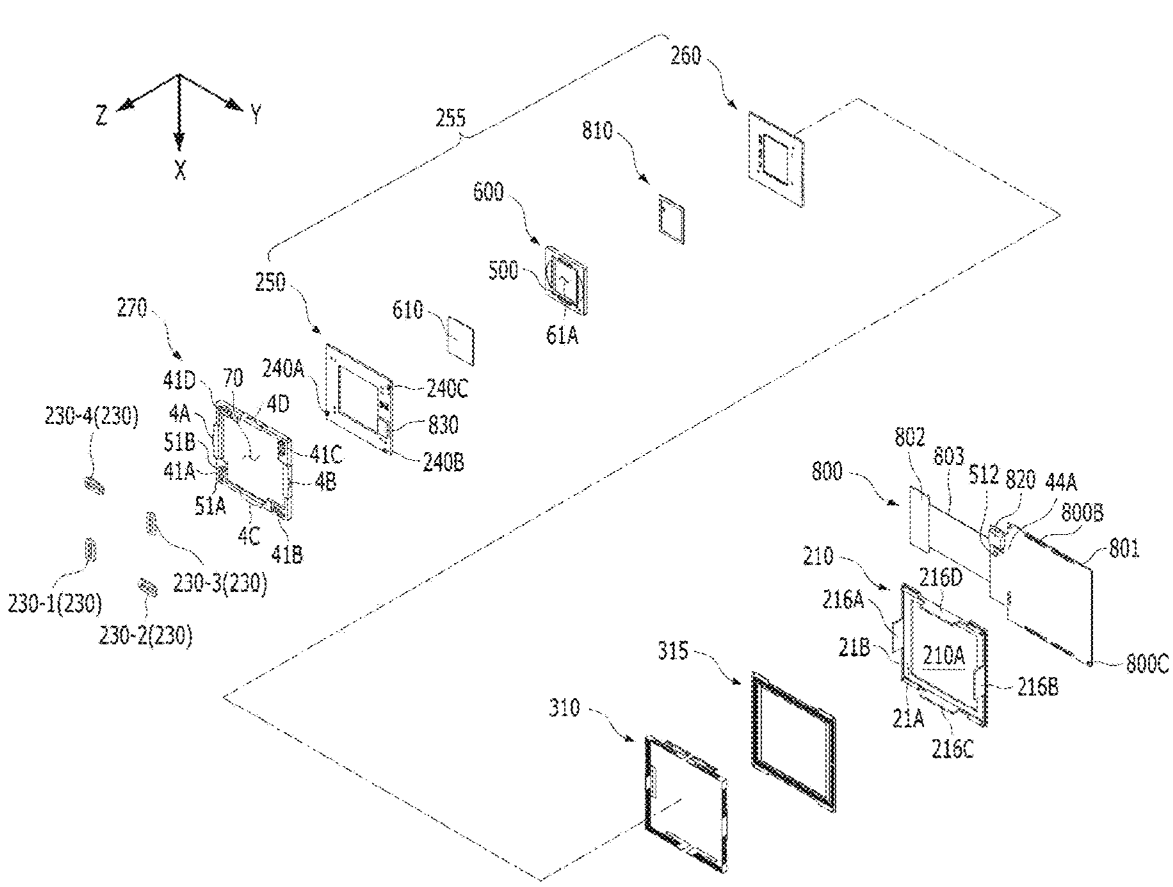
FIG. 10A is a first exploded perspective view of the image sensor unit in FIG. 9.
Figure 10B:
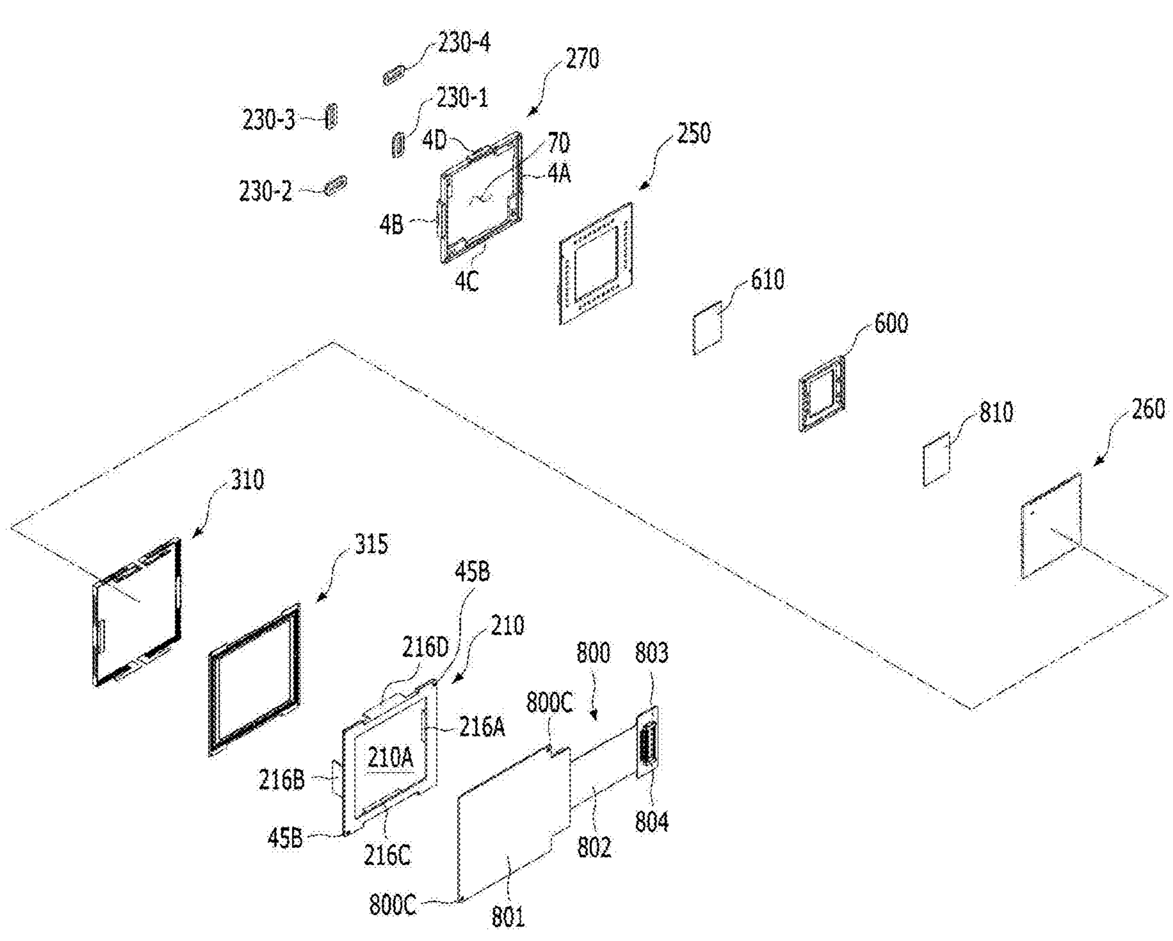
FIG. 10B is a second exploded perspective view of the image sensor unit in FIG. 9.
Figure 11:
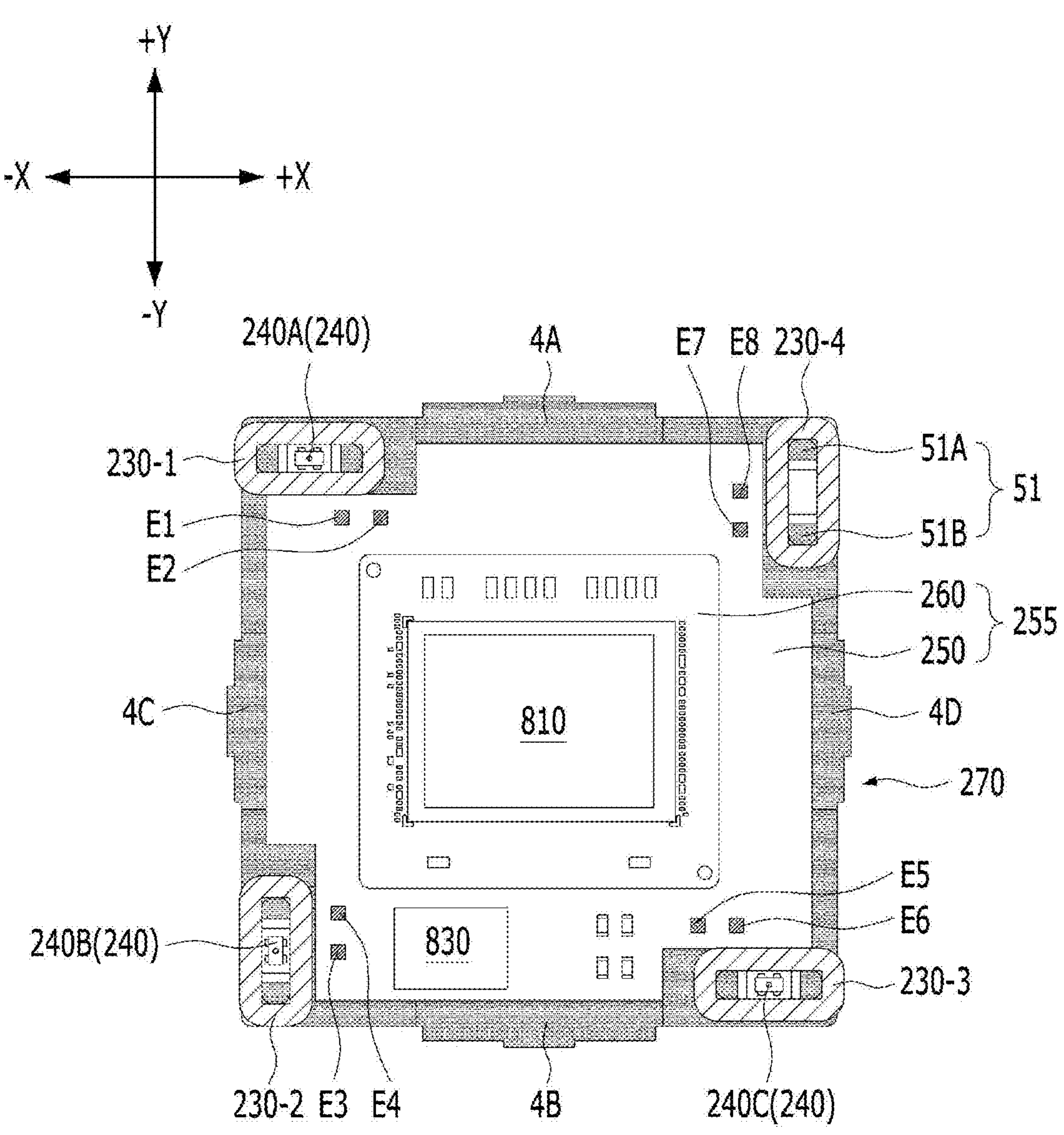
FIG. 11 is a perspective view of the holder, the second coil, the image sensor, the OIS position sensor, and the first board unit in FIG. 10A.
Figure 12:
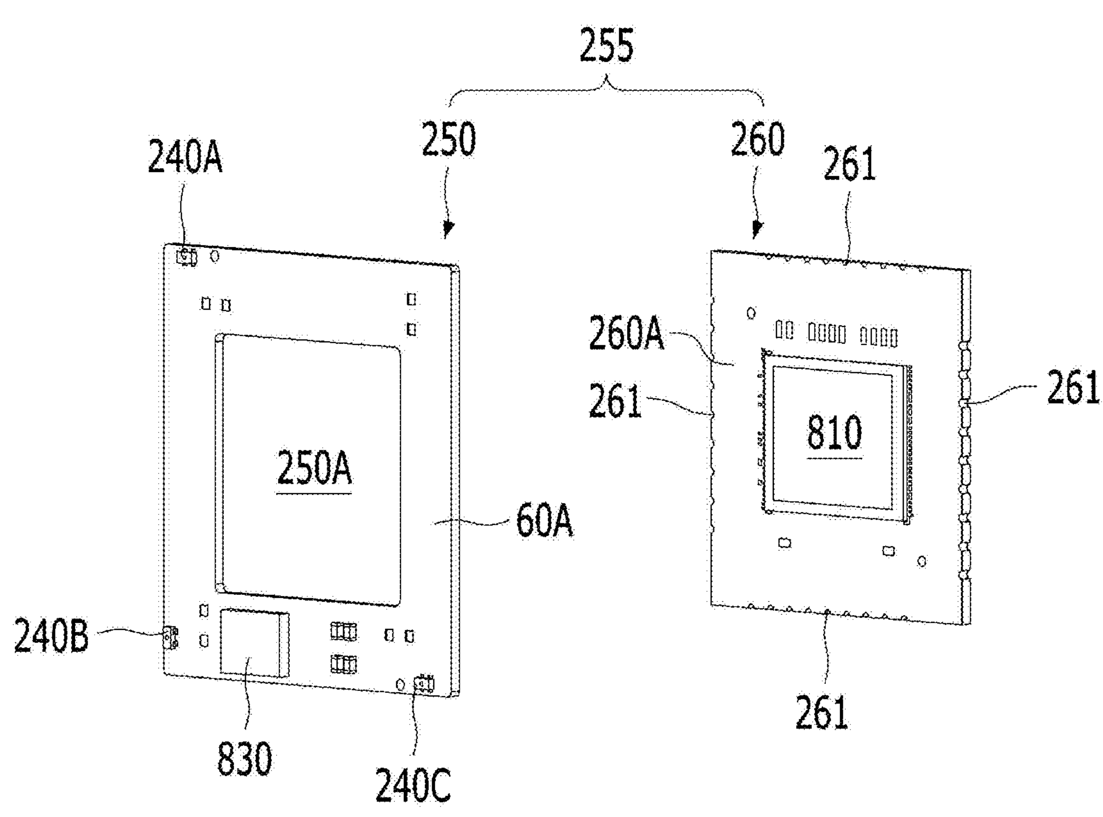
FIG. 12 is a first perspective view of a first circuit board and a second circuit board of the first board unit.
Figure 13:
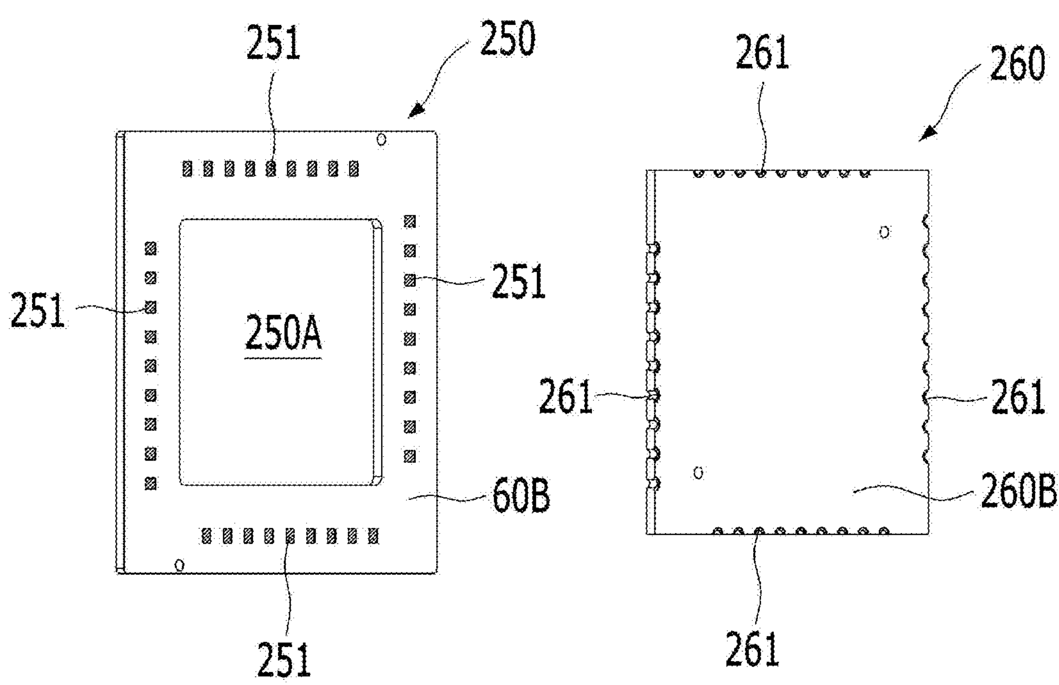
FIG. 13 is a second perspective view of the first circuit board and the second circuit board of the first board unit.
Figure 14A:
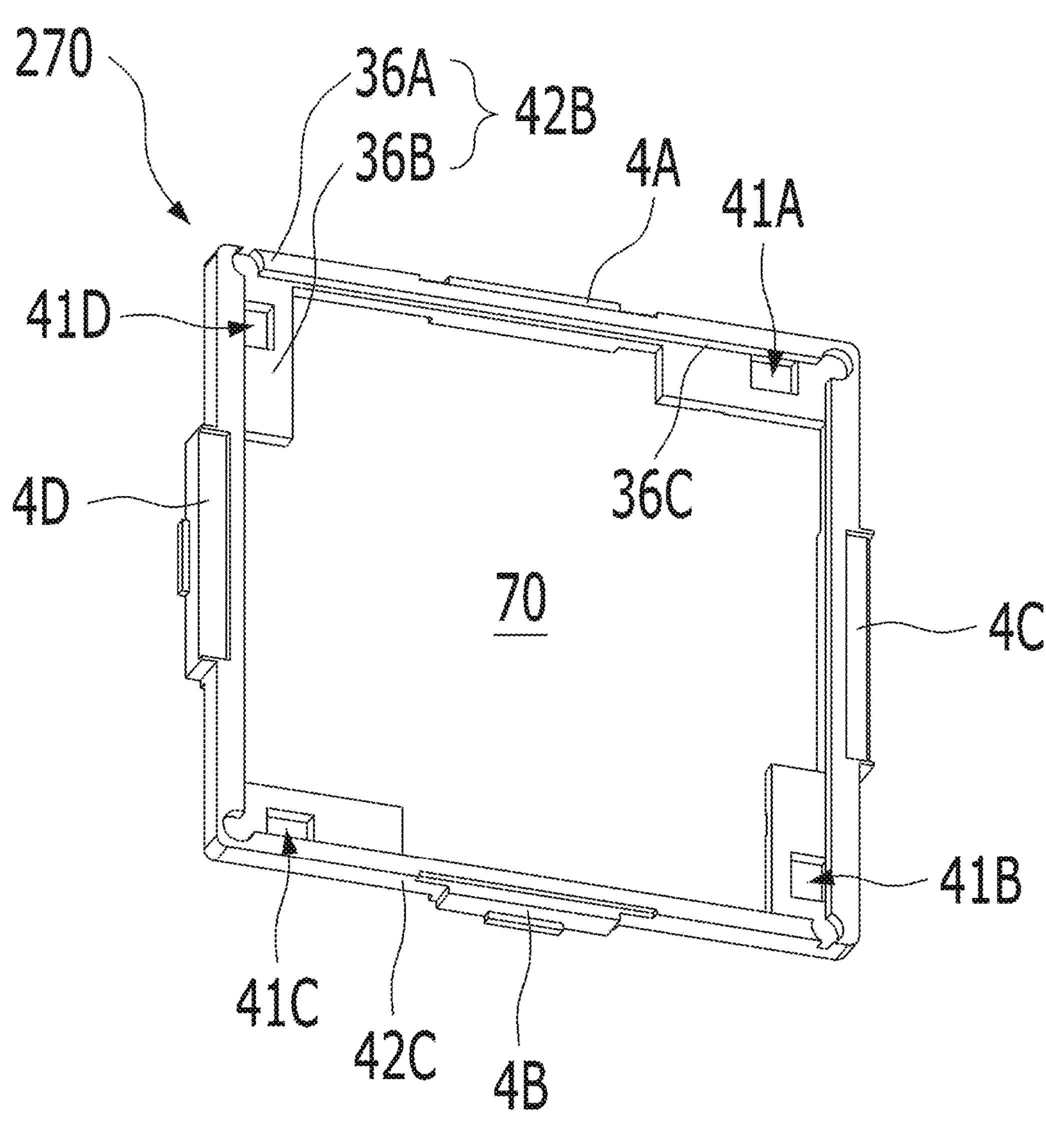
FIG. 14A is a bottom perspective view of the holder.
Figure 14B:
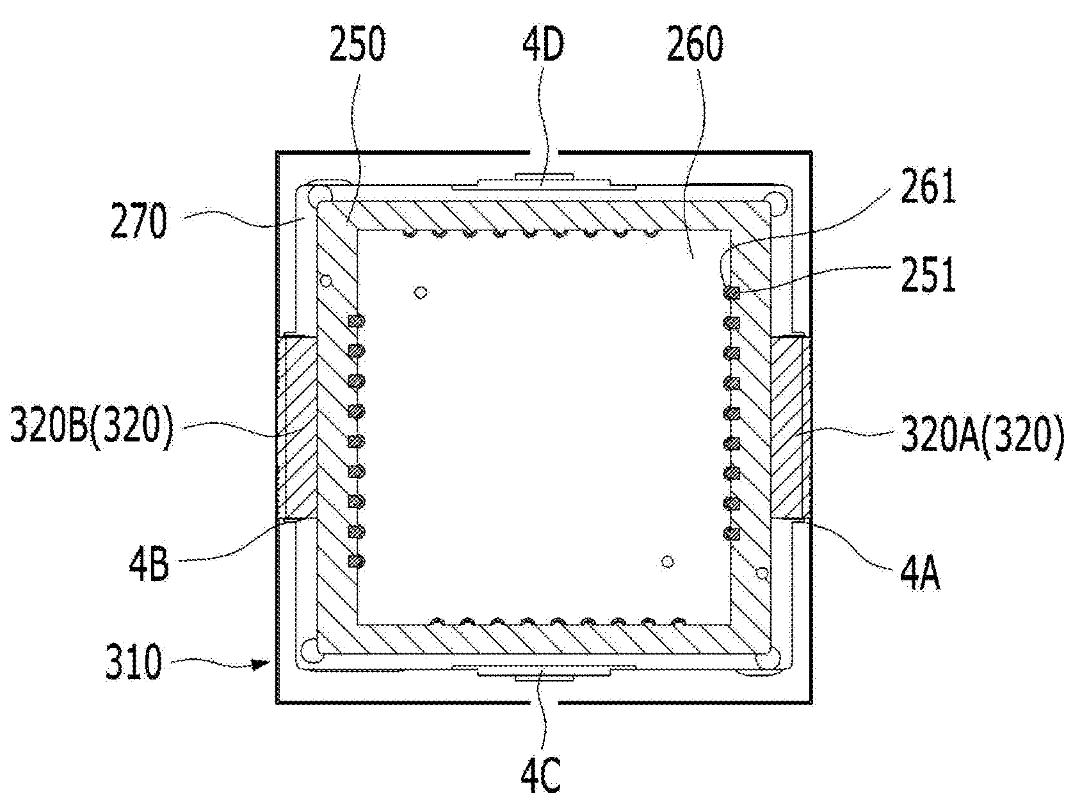
FIG. 14B illustrates the holder, the first board unit, and a support board.
Figure 15:
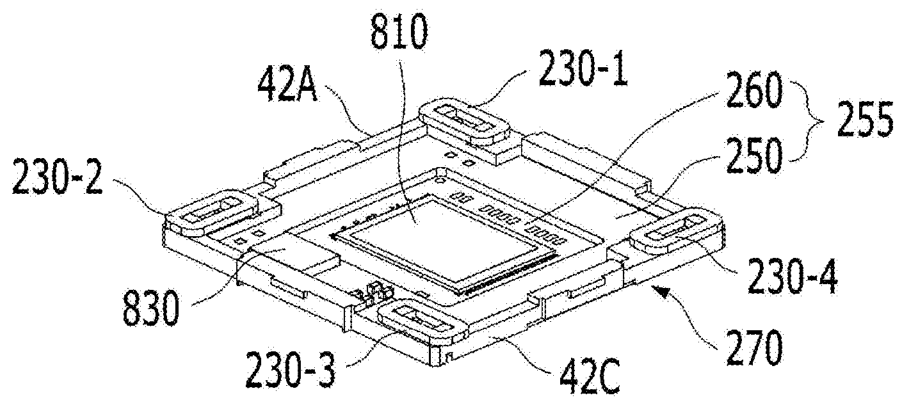
FIG. 15 is a perspective view of the holder, the second coil, the first board unit, the image sensor, and the support board.
Figure 15:
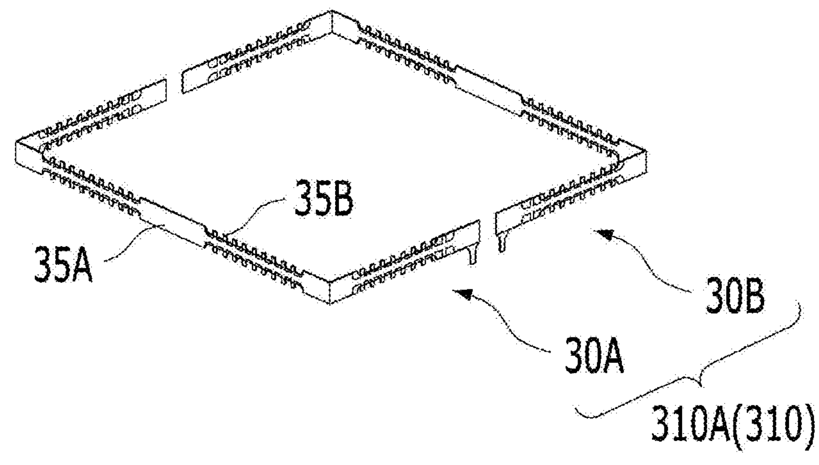
Figure 15:
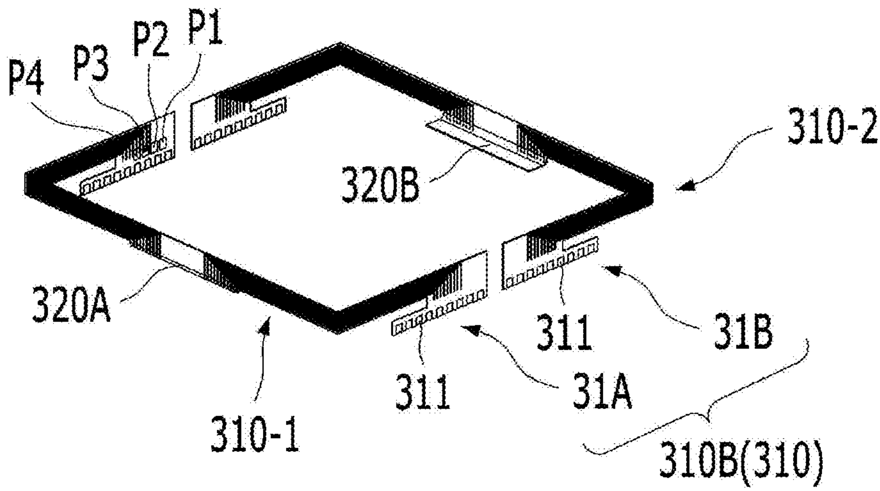
Figure 16:
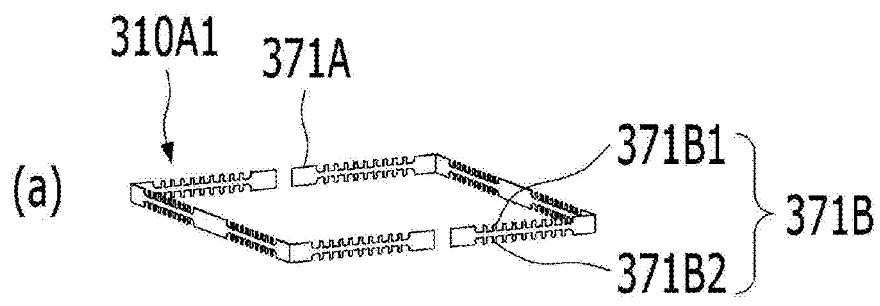
FIG. 16 illustrates embodiments of the support board.
Figure 16:
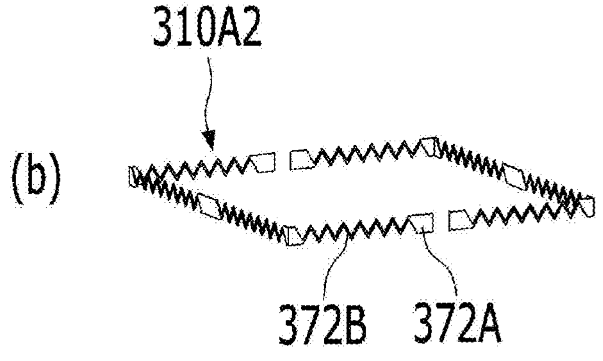
Figure 16:
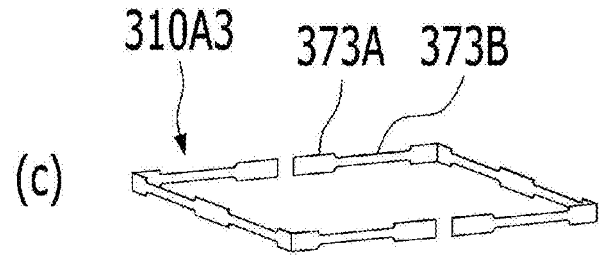
Figure 16:
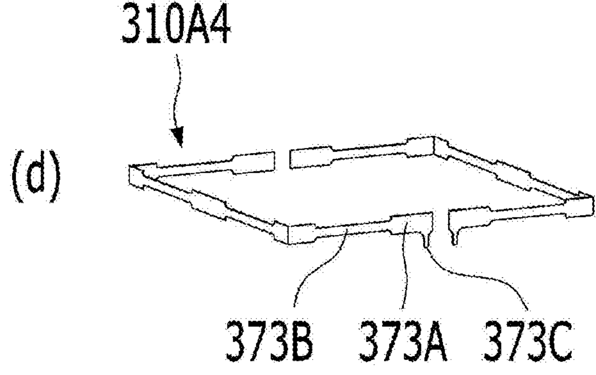
Figure 17:
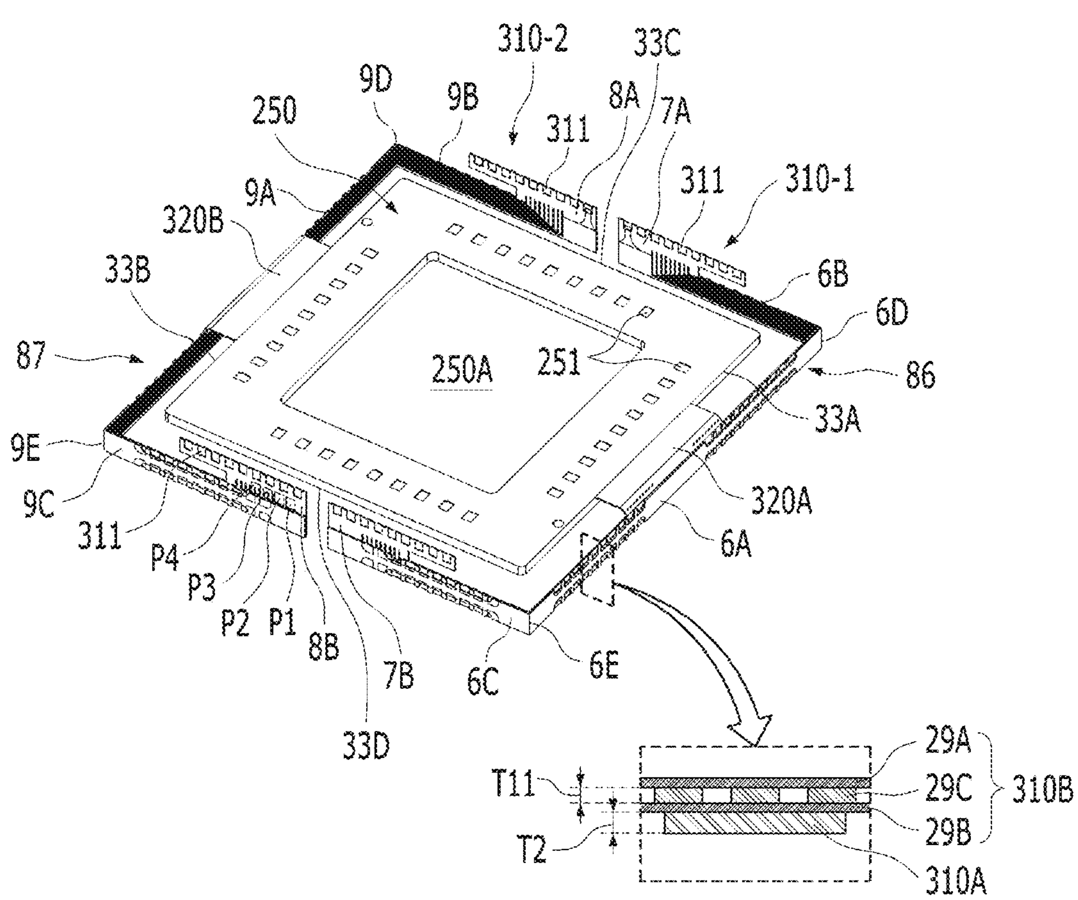
FIG. 17 is a bottom perspective view of the first circuit board and the support board.
Figure 18A:
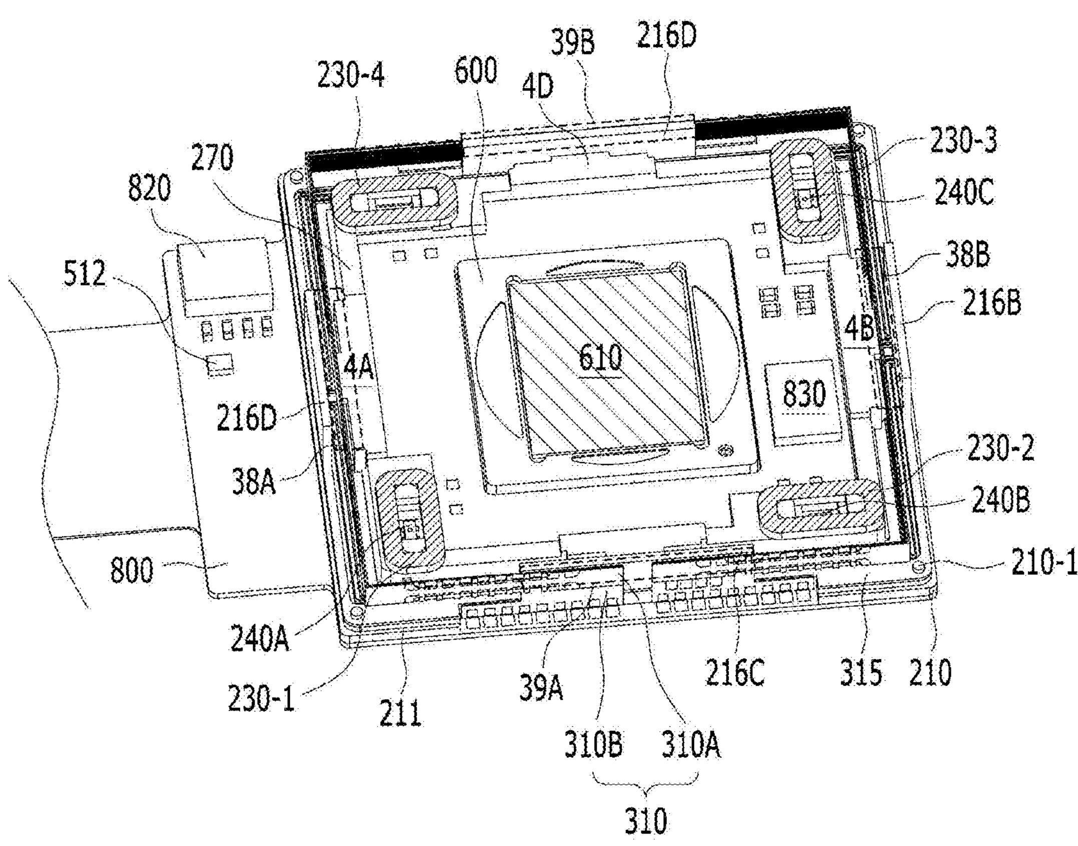
FIG. 18A is a first perspective view of the support board coupled to the holder and to the base.
Figure 18B:
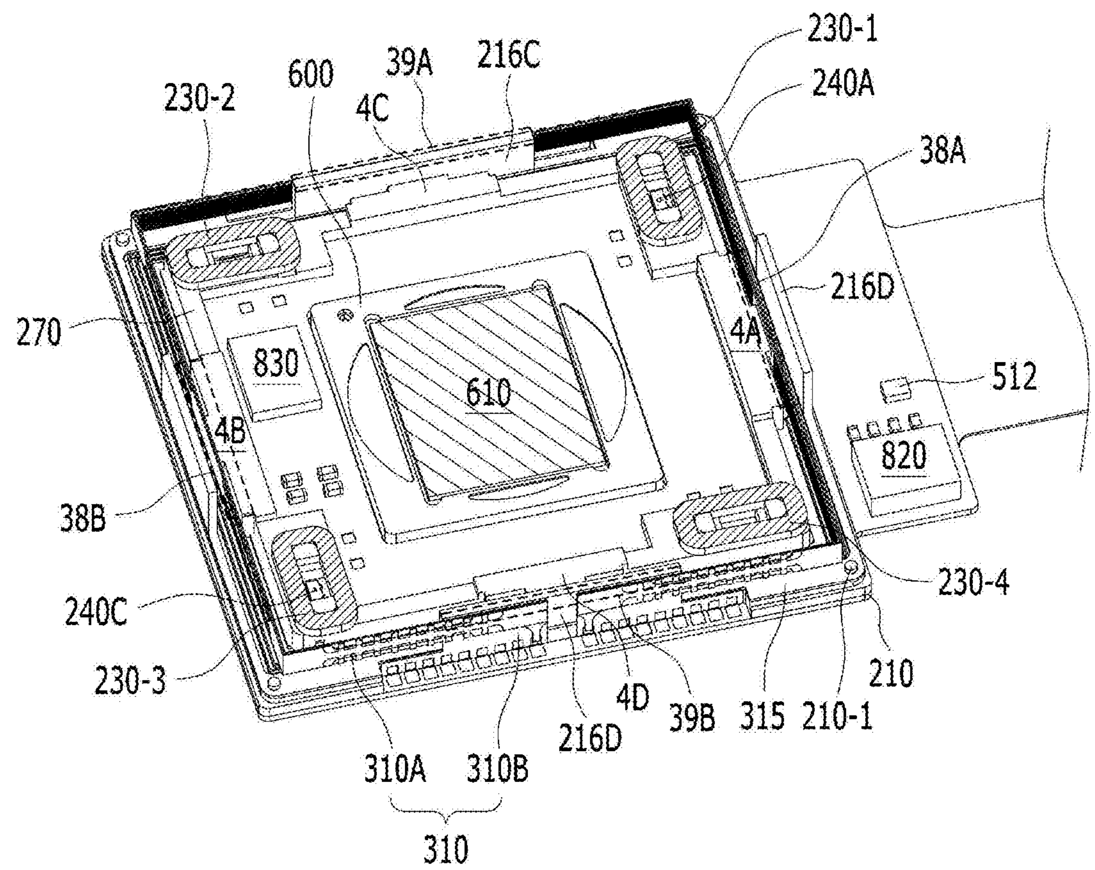
FIG. 18B is a second perspective view of the support board coupled to the holder and to the base.
Figure 19:
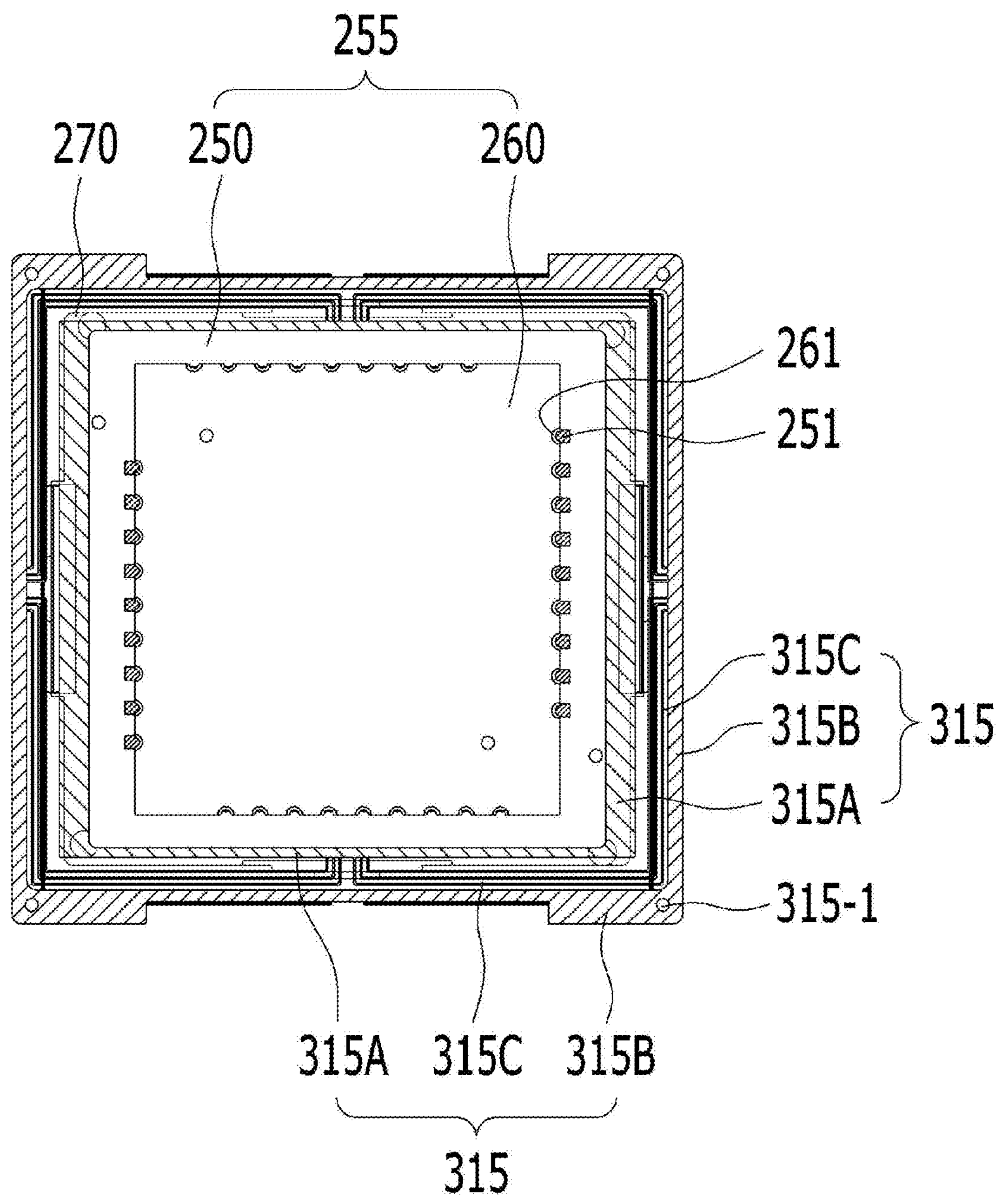
FIG. 19 is a bottom view of the first board unit, the holder, the support board, and an elastic member.

FIG. 9 is a perspective view of the image sensor unit 350, FIG. 10A is a first exploded perspective view of the image sensor unit 350 in FIG. 9, FIG. 10B is a second exploded perspective view of the image sensor unit 350 in FIG. 9, FIG. 11 is a perspective view of the holder 270, the second coil 230, the image sensor 810, the OIS position sensor 240, and the first board unit 255 in FIG. 10A, FIG. 12 is a first perspective view of a first circuit board 250 and a second circuit board 260 of the first board unit 255, FIG. 13 is a second perspective view of the first circuit board 250 and the second circuit board 260 of the first board unit 255, FIG. 14A is a bottom perspective view of the holder 270, FIG. 14B illustrates the holder 270, the first board unit 255, and a support board 310, FIG. 15 is a perspective view of the holder 270, the second coil 230, the first board unit 255, the image sensor 810, and the support board 310, FIG. 16 illustrates embodiments of the support board, FIG. 17 is a bottom perspective view of a first circuit board 250 and the support board 310, FIG. 18A is a first perspective view of the support board 310 coupled to the holder 270 and to the base 210, FIG. 18B is a second perspective view of the support board 310 coupled to the holder 270 and to the base 210, and FIG. 19 is a bottom view of the first board unit 255, the holder 270, the support board 310, and an elastic member 315.

Referring to FIGS. 9 to 19, the image sensor unit 350 may include a fixed unit and an OIS moving unit spaced apart from the fixed unit. The image sensor unit 350 may include a support board 310 interconnecting the fixed unit and the OIS moving unit. The image sensor unit 350 may further include an elastic member 315 for elastically supporting the OIS moving unit with respect to the fixed unit.

The support board 310 may support the OIS moving unit with respect to the fixed unit such that the OIS moving unit is capable of moving in a direction perpendicular to the optical axis or such that the OIS moving unit is capable of tilting or rotating within a predetermined range about the optical axis.

The OIS moving unit may include an image sensor 810. In an example, the OIS moving unit may include a first board unit 255, an image sensor 810 disposed on the first board unit 255, a second coil 230 disposed so as to face the magnet 130 in the optical-axis direction, and a second position sensor 240 disposed on the first board unit 255.

The OIS moving unit may further include a holder 270 disposed between the second coil 230 and the first board unit 255 and accommodating the first board unit 255. The holder 270 may alternatively be referred to as a "spacing member".

The OIS moving unit may further include a filter 610. The OIS moving unit may further include a filter holder 600 configured to accommodate the filter 610.

The fixed unit may include a second board unit 800 spaced apart from the first board unit 255 and conductively connected to the first board unit 255. In addition, the fixed unit may include the housing 140 of the AF moving unit and the magnet 130 disposed in the housing 140.

The fixed unit may further include a base 210 accommodating the second board unit 800 and coupled to the cover member 300. The base 210 may be coupled to the second board unit 800. In addition, the fixed unit may further include the cover member 300 coupled to the base 210.

The holder 270 may be disposed under the AF moving unit. In an example, the holder 270 may be embodied as a non-conductive member. In an example, the holder 270 may be made of an injection-molded material, which is easily embodied through an injection-molding process. In addition, the holder 27 may be formed of an insulative material. In addition, for example, the holder 270 may be formed of resin or plastic.

Referring to FIGS. 11, 14A, 14B, and 15, the holder 270 may include an upper surface 42A, a lower surface 42B formed opposite the upper surface 42A, and a side surface 42C interconnecting the upper surface 42A and the lower surface 42B. In an example, the lower surface 42B of the holder 270 may face or be located opposite the second board unit 800.

The holder 270 may support the first board unit 255, and may be coupled to the first board unit 255. In an example, the first board unit 255 may be disposed under the holder 270. In an example, the lower portion, the lower surface, or the lower end of the holder 270 may be coupled to the upper portion, the upper surface, or the upper end of the first board unit 255.

Referring to FIG. 14A, the lower surface 42B of the holder 270 may include a first surface 36A and a second surface 36B. The second surface 36B may have a height difference with respect to the first surface 36A in the optical-axis direction. In an example, the second surface 36B may be located above (or at a higher position than) the first surface 36A. In an example, the second surface 36B may be located closer to the upper surface 42A of the holder 270 than the first surface 36A. In an example, a distance between the upper surface 42A of the holder 270 and the second surface 36B may be shorter than a distance between the upper surface 42A of the holder 270 and the first surface 36A.

The holder 270 may include a third surface 36C interconnecting the first surface 36A and the second surface 36B. In an example, the first surface 36A and the second surface 36B may be parallel to each other, and the third surface 36C may be perpendicular to the first surface 36A and/or the second surface 36B, but the disclosure is not limited thereto. In another embodiment, the included angle between the third surface 36C and the first surface 36A (or the second surface 36B) may be an acute angle or an obtuse angle. In an example, the first surface 36A and the second surface 36B may be located on the edge of the lower surface 42B of the holder 270.

The holder 270 may accommodate or support the second coil 230. The holder 270 may support the second coil 230 such that the second coil 230 is spaced apart from the first board unit 255.

The holder 270 may include a bore 70 formed therein so as to correspond to one region of the first board unit 255. In an example, the bore 70 in the holder 270 may be a through-hole formed through the holder 270 in the optical-axis direction. In an example, the bore 70 in the holder 270 may correspond to, face, or overlap the image sensor 810 in the optical-axis direction.

The shape of the bore 70 in the holder 270 viewed from above may be a polygonal shape such as a quadrangular shape, a circular shape, or an elliptical shape, but the disclosure is not limited thereto. The bore may be formed in any of various shapes.

In an example, the bore 70 in the holder 270 may have a shape or a size suitable for exposing the image sensor 810, a portion of the upper surface of the first circuit board 250, a portion of the upper surface of the second circuit board 260, and elements. In an example, the area of the bore 70 in the holder 270 may be larger than the area of the image sensor 810, and may be smaller than the area of the first surface of the first circuit board 250. In an example, the bore 70 may be formed in the second surface 36B of the lower surface 42B of the holder 270.

The holder 270 may have holes 41A, 41B, and 41C formed therein so as to correspond to the second position sensor 240. In an example, the holder 270 may have holes 41A, 41B, and 41C formed therein at positions corresponding to first to third sensors 240A, 240B, and 240C of the second position sensor 240.

In an example, the holes 41A, 41B, and 41C may be disposed adjacent to the corners of the holder 270. The holder 270 may have a dummy hole 41D formed therein at a position that does not correspond to the second position sensor 240 and is adjacent to the corner of the holder 270 that does not correspond to the second position sensor 240. The dummy hole 41D may be formed in order to enable weight balancing of the OIS moving unit during OIS operation. In another embodiment, the dummy hole 41D may not be formed.

The holes 41A, 41B, and 41C may be through-holes formed through the holder 270 in the optical-axis direction. In an example, the holes 41A, 41B, and 41C may be formed in the second surface 36B of the lower surface 42B of the holder 270, but the disclosure is not limited thereto. In another embodiment, the holes may be formed in the first surface of the lower surface of the holder 270. In still another embodiment, the holes 41A, 41B, and 41C in the holder 270 may be omitted.

The holder 270 may be provided on the upper surface 42A thereof with at least one coupling protrusion 51 for coupling to the second coil 230. The coupling protrusion 51 may protrude from the upper surface 42A of the holder 270 toward the AF moving unit. In an example, the coupling protrusion 51 may be formed adjacent to each of the holes 41A to 41D in the holder 270.

In an example, two coupling protrusions 51A and 51B may be disposed or arranged so as to correspond to respective holes 41A, 41B, 41C, and 41D in the holder 270. In an example, each of the holes 41A, 41B, 41C, and 41D in the holder 270 may be located between the two coupling protrusions 51A and 51B.

The first board unit 255 may include a first circuit board 250 and a second circuit board 260, which are conductively connected to each other. The second circuit board 260 may alternatively be referred to as a "sensor board".

The first board unit 255 may be disposed on the lower surface 42B of the holder 270. In an example, the first board unit 255 may be disposed on the second surface 36B of the lower surface 42B of the holder 270. In an example, the first circuit board 250 may be disposed on the second surface 36B of the lower surface 42B of the holder 270. In an example, the first surface 60A (refer to FIG. 12) of the first circuit board 250 may be coupled or attached to the second surface 36B of the lower surface 42B of the holder 270 by means of an adhesive member.

In this case, the first surface 60A of the first circuit board 250 may be a surface that faces the AF moving unit and on which the second position sensor 240 is disposed. In addition, the second surface 60B of the first circuit board 250 may be a surface formed opposite the first surface 60A of the first circuit board 250.

The first circuit board 250 may alternatively be referred to as a sensor board, a main board, a main circuit board, a sensor circuit board, or a moving circuit board. In all of the embodiments, the first circuit board 250 may alternatively be referred to as a "second board" or a "second circuit board", and the second circuit board 260 may alternatively be referred to as a "first board" or a "first circuit board".

The second position sensors 240A, 240B, and 240C may be disposed on the first circuit board 250 in order to detect movement of the OIS moving unit in a direction perpendicular to the optical-axis direction and/or rotation, tilting, or rolling of the OIS moving unit about the optical axis. In addition, a controller 830 and/or a circuit element (e.g., a capacitor) may be disposed on the first circuit board 250. The image sensor 810 may be disposed on the second circuit board 260.

The first circuit board 250 may include first terminals E1 to E8 to be conductively connected to the second coil 230. Here, the first terminals E1 to E8 may alternatively be referred to as "first pads" or "first bonding parts". The first terminals E1 to E8 of the first circuit board 250 may be disposed or arranged on the first surface 60A of the first circuit board 250. For example, the first circuit board 250 may be a printed circuit board or a flexible printed circuit board (FPCB).

The first circuit board 250 may include a bore 250A formed therein so as to correspond to or face the lens module 400 and the bore in the bobbin 110. In an example, the bore 250A in the first circuit board 250 may be a through-hole formed through the first circuit board 250 in the optical-axis direction, and may be formed in the center of the first circuit board 250.

When viewed from above, the shape of the first circuit board 250, e.g., the outer circumferential shape thereof, may be a shape coinciding with or corresponding to the shape of the holder 270, for example, a quadrangular shape. In addition, when viewed from above, the shape of the bore 250A in the first circuit board 250 may be a polygonal shape such as a quadrangular shape, a circular shape, or an elliptical shape.

In addition, the first circuit board 250 may include at least one second terminal 251 to be conductively connected to the second circuit board 260. Here, the second terminal 251 may alternatively be referred to as a "second pad" or a "second bonding part". The second terminal 251 of the first circuit board 250 may be disposed or arranged on the second surface 60B of the first circuit board 250.

In an example, the at least one second terminal 251 may be provided in plural, and the plurality of second terminals 251 may be disposed or arranged in a region between the bore 250A in the first circuit board 250 and any one side of the first circuit board 250 in a direction parallel to the side of the first circuit board 250. In an example, the plurality of second terminals 251 may be arranged around the bore 250A.

The second circuit board 260 may be disposed under the first circuit board 250.

When viewed from above, the shape of the second circuit board 260 may be a polygonal shape (e.g., a quadrangular shape, a square shape, or a rectangular shape), but the disclosure is not limited thereto. In another embodiment, the shape of the second circuit board may be a circular shape or an elliptical shape.

In an example, when the shape of the second circuit board 260 is a quadrangular shape, the area of the front surface of the second circuit board 260 may be larger than the area of the bore 250A in the first circuit board 250. In an example, the lower side of the bore 250A in the first circuit board 250 may be shielded or blocked by the second circuit board 260.

In an example, when viewed from above or below, the outer side surface (or the side) of the second circuit board 260 may be located between the outer side surface (or the side) of the first circuit board 250 and the bore 250A in the first circuit board 250.

The image sensor 810 may be disposed on or coupled to a first surface 260A (e.g., the upper surface) of the second circuit board 260. Referring to FIGS. 12 and 13, the second circuit board 260 may include at least one terminal 261 conductively connected to the at least one second terminal 251 of the first circuit board 250. In an example, the terminal 261 of the second circuit board 260 may be provided in plural.

In an example, the at least one terminal 261 of the second circuit board 260 may be formed on the side surface or the outer side surface of the second circuit board 260 that connects the first surface 260A of the second circuit board 260 to a second surface 260B thereof. The first surface 260A may be a surface facing the first circuit board 250, and the second surface 260B may be a surface formed opposite the first surface 260A. In an example, the terminal 261 may take the form of a recess depressed into the side surface of the second circuit board 260. Alternatively, in an example, the terminal 261 may take the form of a semicircular-shaped or a semi-elliptical-shaped via formed in the side surface of the second circuit board 260. In another embodiment, the at least one terminal of the second circuit board 260 that is conductively connected to the second terminal 251 of the first circuit board 250 may be formed on the first surface 260A of the second circuit board 260.

In an example, the terminal 261 of the second circuit board 260 may be coupled to the terminal 251 of the first circuit board 250 by means of solder or a conductive adhesive member. The first and second circuit boards 250 and 260 may be printed circuit boards or FPCBs.

The second coil 230 may be disposed on the holder 270. The second coil 230 may be disposed on the upper surface 42A of the holder 270. The second coil 230 may be disposed under the magnet 130.

The second coil 230 may be coupled to the holder 270. In an example, the second coil 230 may be coupled or attached to the upper surface 42A of the holder 270. In an example, the second coil 230 may be coupled to the coupling protrusion 51 of the holder 270.

The second coil 230 may move the OIS moving unit through interaction with the magnet 130.

In an example, the second coil 230 may correspond to, face, or overlap the magnet 130 disposed on the fixed unit in the direction of the optical axis OA. In another embodiment, the fixed unit may include an OIS-dedicated magnet, which is provided separately from the magnet of the AF moving unit, and the second coil may correspond to, face, or overlap the OIS-dedicated magnet. In this case, the number of OIS-dedicated magnets may be equal to the number of coil units included in the second coil 230.

In an example, the second coil 230 may include a plurality of coil units 230-1 to 230-4. In an example, the second coil 230 may include four coil units 230-1 to 230-4 disposed on the four corners of the holder 270.

Each of the coil units 230-1 to 230-4 may take the form of a coil block having a closed curve shape or a ring shape. In an example, each coil unit may have a cavity or a hole formed therein. In an example, the coil units may be embodied as fine pattern (FP) coils, wound coils, or coil blocks.

In another embodiment, the second coil 230 may be disposed on the first circuit board 250, or may be coupled to the first circuit board 250.

The second coil 230 may be conductively connected to the first circuit board 250. In an example, the first coil unit 230-1 may be conductively connected to the two first terminals E1 and E2 of the first circuit board 250, the second coil unit 230-2 may be conductively connected to two other first terminals E3 and E4 of the first circuit board 250, the third coil unit 230-3 may be conductively connected to two other first terminals E5 and E6 of the first circuit board 250, and the fourth coil unit 230-4 may be conductively connected to two other first terminals E7 and E8 of the first circuit board 250.

Power or a driving signal may be supplied to the first to fourth coil units 230-1 to 230-4 through the first circuit board 250. The power or the driving signal supplied to the second coil 230 may be a DC signal, an AC signal, or a signal containing both DC and AC components, and may be of a current type or a voltage type.

The OIS moving unit may be moved in the first horizontal direction or the second horizontal direction or rolled about the optical axis by interaction between the first to fourth magnet units 130-1 to 130-4 and the first to fourth coil units 230-1 to 230-4.

In an example, currents may be independently applied to at least three coil units among the four coil units 230-1 to 230-4.

The controller 830 or 780 may supply at least one driving signal to at least one of the first to fourth coil units 230-1 to 230-4, and may control the at least one driving signal such that the OIS moving unit is moved in the X-axis direction and/or the Y-axis direction or is rotated within a predetermined angular range about the optical axis. The controller to be described hereinbelow may be at least one of the controller 830 of the camera device 10 or the controller 780 of an optical instrument 200A.

When the second coil 230 is driven in a three-channel drive mode, three independent driving signals may be supplied to the second coil 230. In an example, among the four coil units, two coil units (e.g. 230-2 and 230-4, or 230-1 and 230-3), which face each other in an oblique direction, may be connected to each other in series. One driving signal may be supplied to the two coil units connected to each other in series, and an independent driving signal may be supplied to each of the remaining two coil units among the four coil units.

Alternatively, when the second coil 230 is driven in a four-channel drive mode, an independent driving signal may be supplied to each of the four coil units 230-1 to 230-4, which are separated from each other.

Figure 20A:
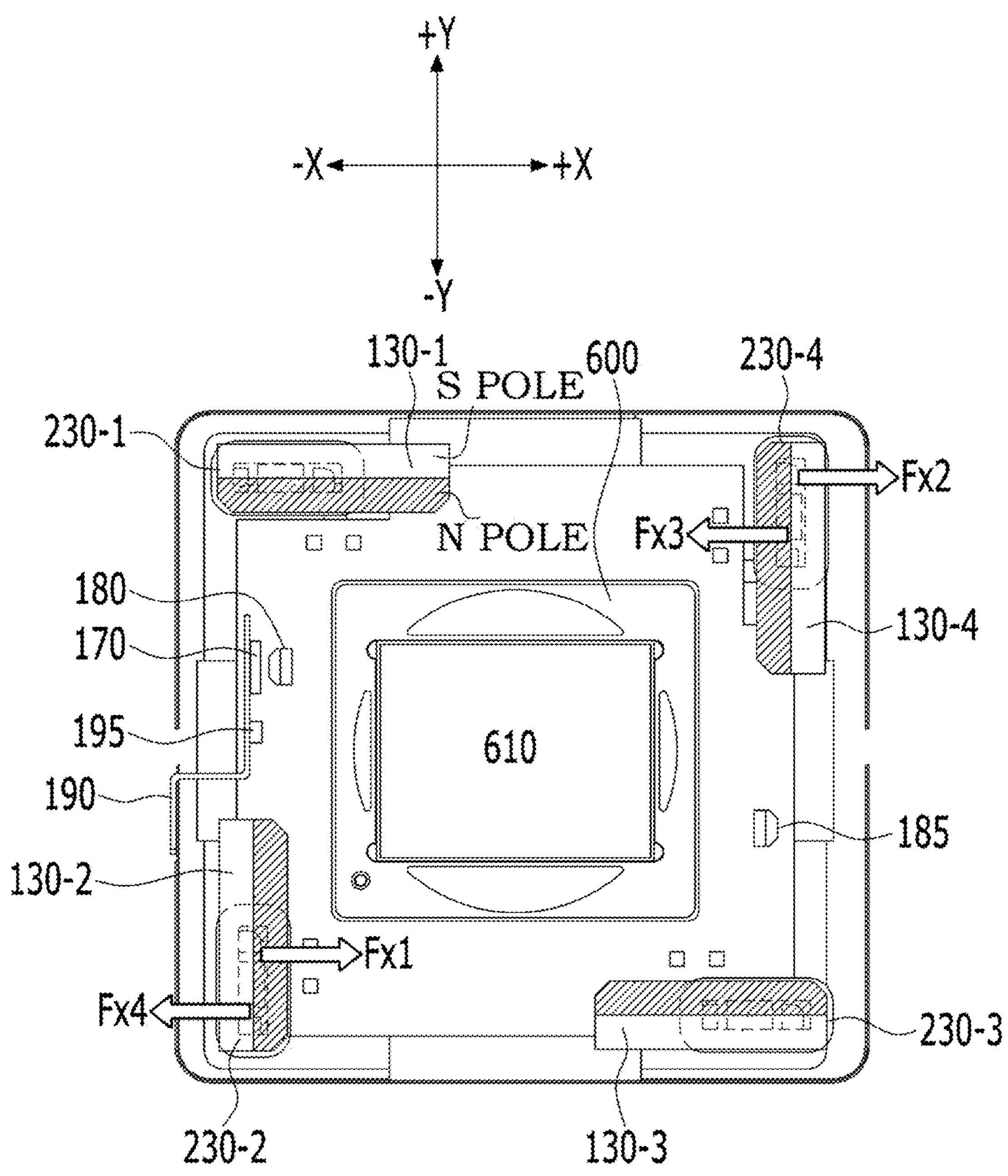
FIG. 20A is a view for explaining movement of an OIS moving unit in an X-axis direction.
Figure 20B:
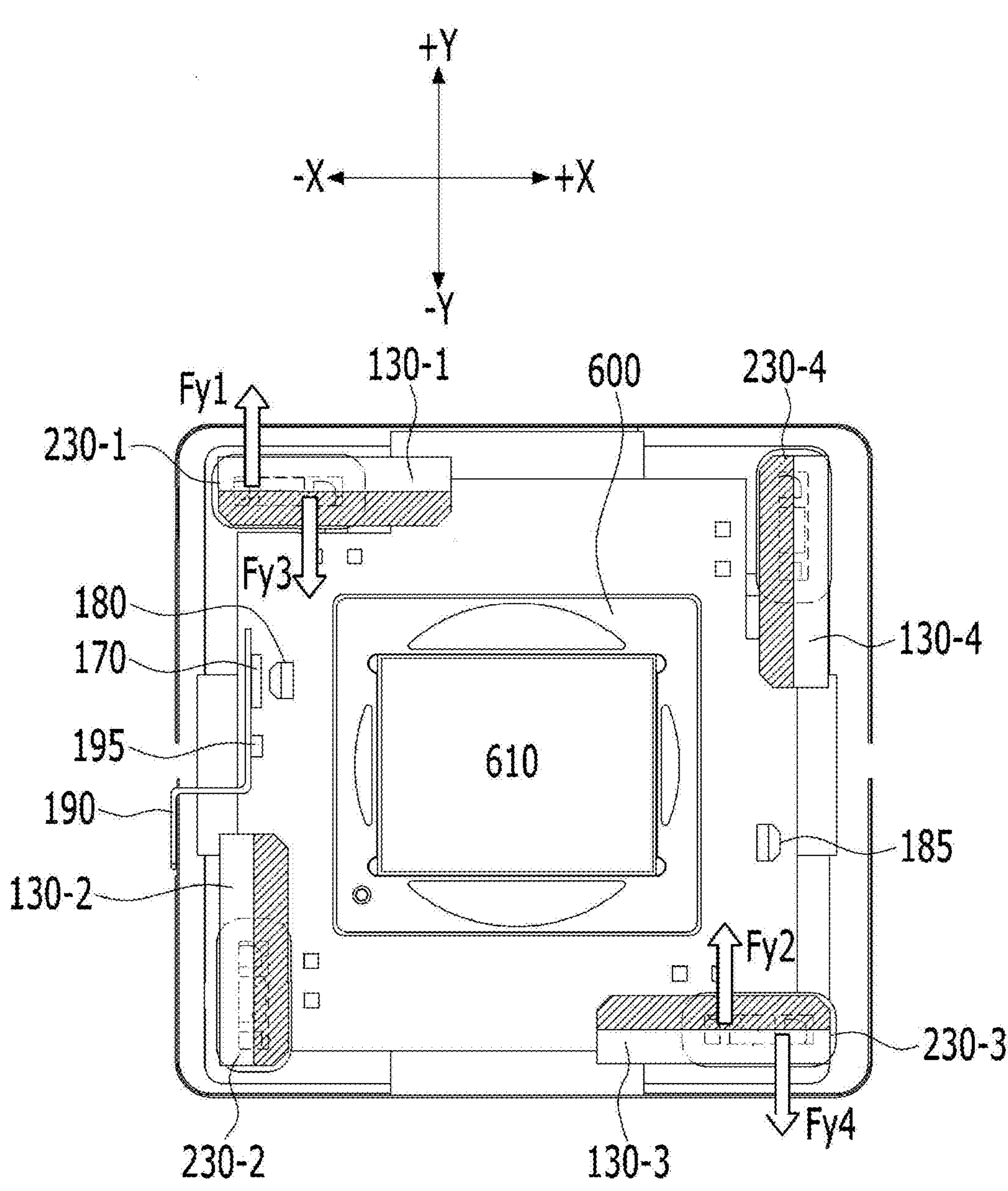
FIG. 20B is a view for explaining movement of the OIS moving unit in a y-axis direction.

FIG. 20A is a view for explaining movement of the OIS moving unit in the X-axis direction, and FIG. 20B is a view for explaining movement of the OIS moving unit in the y-axis direction.

The N pole and the S pole of each of the first and third magnet units 130-1 and 130-3, which face each other in a first oblique direction, may be disposed so as to face each other in the first horizontal direction (e.g. the Y-axis direction). In addition, the N pole and the S pole of each of the second and fourth magnet units 130-2 and 130-4, which face each other in a second oblique direction, which is perpendicular to the first oblique direction, may be disposed so as to face each other in the second horizontal direction (e.g. the X-axis direction).

That is, the direction in which the N pole and the S pole of the first magnet unit 130-1 face each other may be the same as or parallel to the direction in which the N pole and the S pole of the third magnet unit 130-3 face each other. In addition, the direction in which the N pole and the S pole of the second magnet unit 130-2 face each other may be the same as or parallel to the direction in which the N pole and the S pole of the fourth magnet unit 130-4 face each other.

In FIG. 20A, on the basis of a boundary line (or an interface) between the N pole and the S pole of each of the first to fourth magnet units 130-1 to 130-4, the N pole may be located at an inner position, and the S pole may be located at an outer position. In another embodiment, on the basis of the boundary line between the N pole and the S pole, the S pole may be located at an inner position, and the N pole may be located at an outer position. The boundary line (or the interface) may be a portion that isolates the N pole and the S pole from each other and has substantially no magnetism and thus almost no polarity. When the magnet 130 is a bipolar-magnetized magnet or a 4-pole magnet, the boundary line may correspond to a partition wall. In this case, the partition wall may be a non-magnetic material or air, and may be referred to as a “neutral zone” or a “neutral region”.

Referring to FIG. 20A, the OIS moving unit may be moved or shifted in the X-axis direction by first electromagnetic force Fx1 or Fx3, which is generated by interaction between the second coil unit 230-2 and the second magnet unit 130-2, and second electromagnetic force Fx2 or Fx4, which is generated by interaction between the fourth coil unit 230-4 and the fourth magnet unit 130-4. In an example, the direction of the first electromagnetic force Fx1 or Fx3 and the direction of the second electromagnetic force Fx2 or Fx4 may be identical to each other.

Referring to FIG. 20B, the OIS moving unit may be moved or shifted in the y-axis direction by third electromagnetic force Fy1 or Fy3, which is generated by interaction between the first coil unit 230-1 and the first magnet unit 130-1, and fourth electromagnetic force Fy2 or Fy4, which is generated by interaction between the third coil unit 230-3 and the third magnet unit 130-3. In an example, the direction of the third electromagnetic force Fy1 or Fy3 and the direction of the fourth electromagnetic force Fy2 or Fy4 may be identical to each other.

Figure 20C:
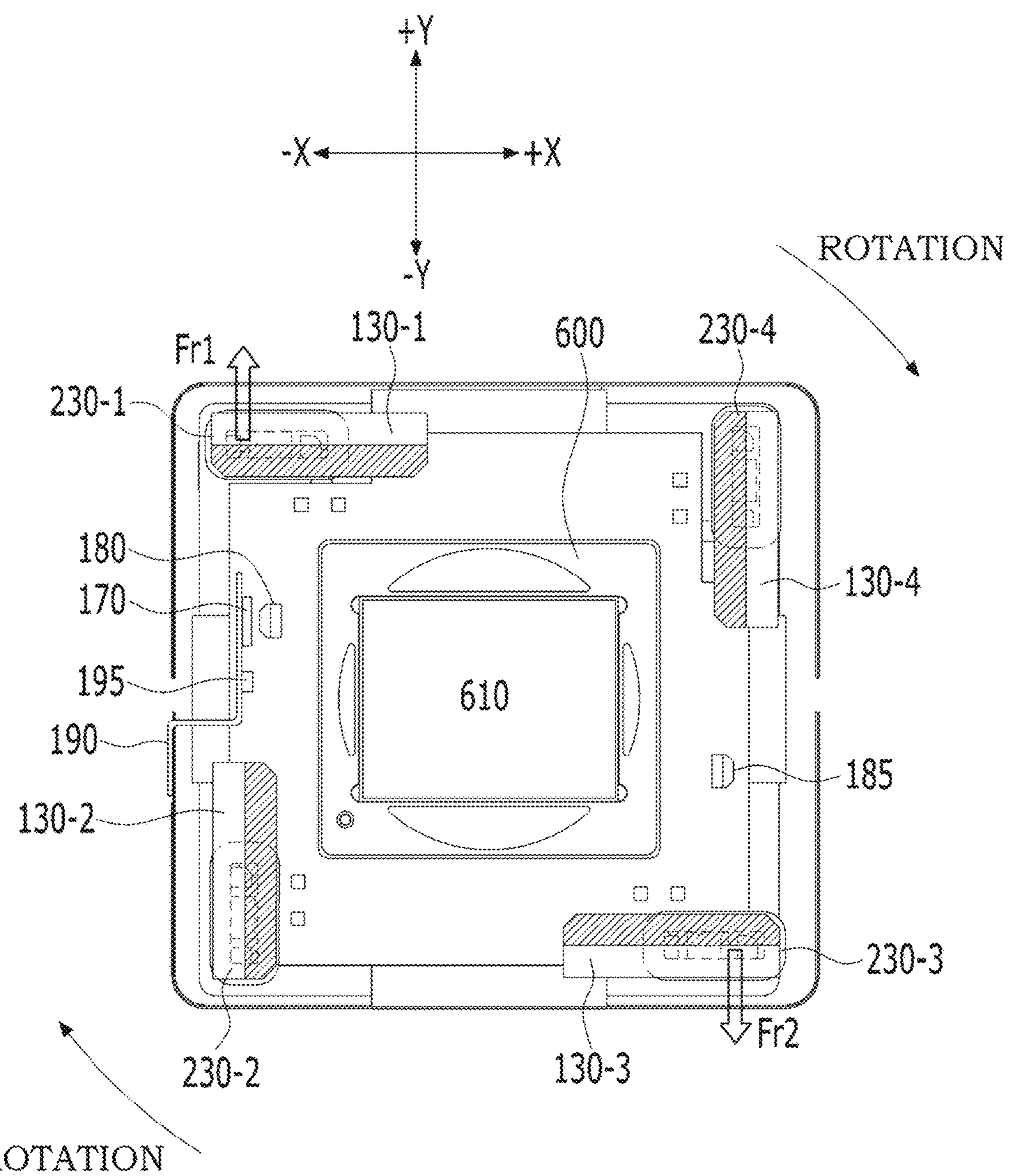
FIG. 20C is a view for explaining rotation of the OIS moving unit in the clockwise direction in a three-channel drive mode.
Figure 20D:
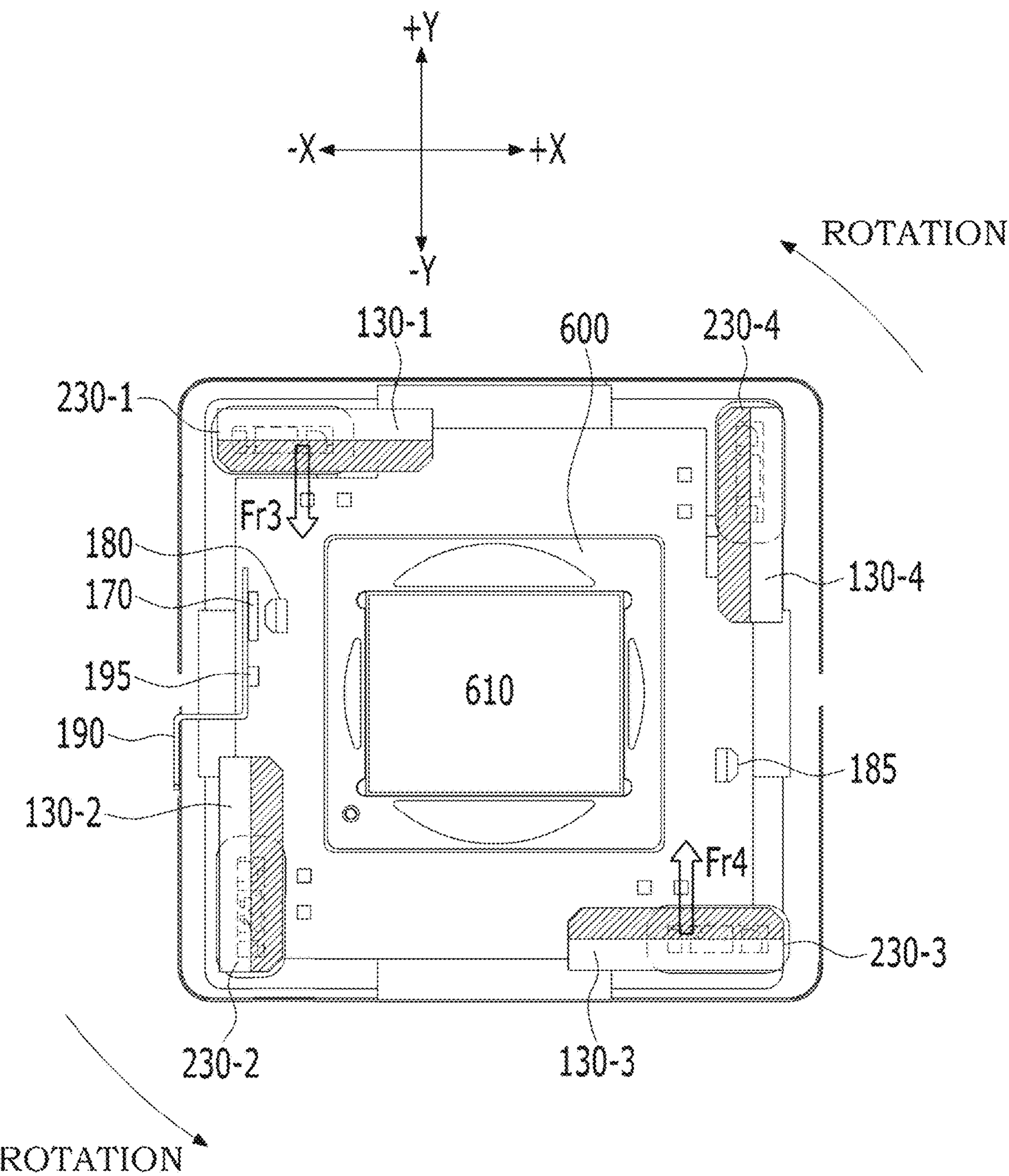
FIG. 20D is a view for explaining rotation of the OIS moving unit in the counterclockwise direction in the three-channel drive mode.

FIG. 20C is a view for explaining rotation of the OIS moving unit in the clockwise direction in the three-channel drive mode, and FIG. 20D is a view for explaining rotation of the OIS moving unit in the counterclockwise direction in the three-channel drive mode. In an example, in the three-channel drive mode, the second coil unit 230-2 and the fourth coil unit 230-4 may be connected to each other in series, a driving signal may be supplied to each of the first and third coil units 230-1 and 230-3, and no driving signal may be supplied to the second and fourth coil units 230-2 and 230-4.

Referring to FIGS. 20C and 20D, the OIS moving unit may be rotated, tilted, or rolled with respect to the optical axis or about the optical axis by fifth electromagnetic force Fr1 or Fr3, which is generated by interaction between the first coil unit 230-1 and the first magnet unit 130-1, and sixth electromagnetic force Fr2 or Fr4, which is generated by interaction between the third coil unit 230-3 and the third magnet unit 130-3. In an example, the direction of the fifth electromagnetic force Fr1 and the direction of the sixth electromagnetic force Fr2 may be opposite each other.

Figure 20E:
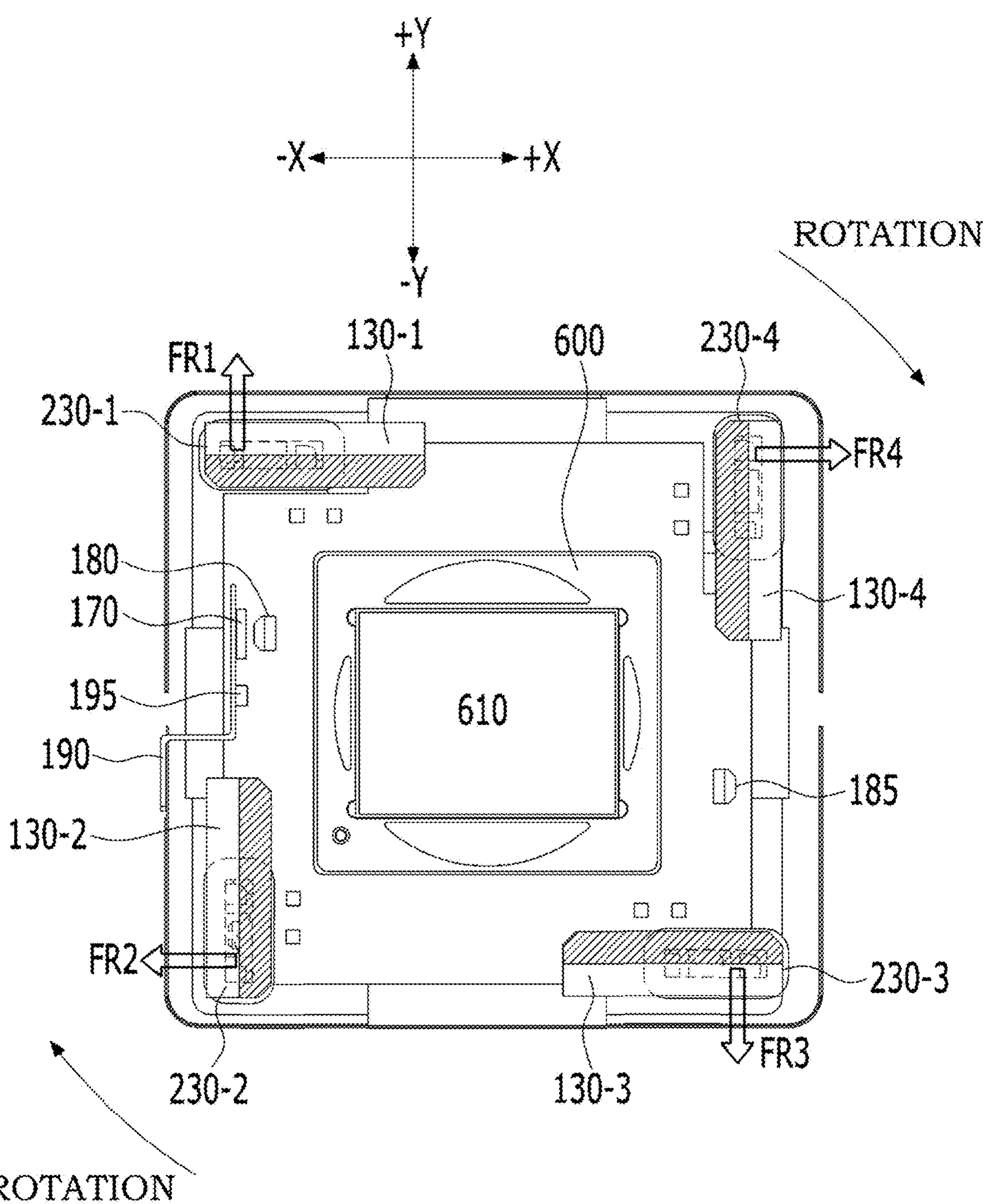
FIG. 20E is a view for explaining rotation of the OIS moving unit in the clockwise direction in a four-channel drive mode.
Figure 20F:
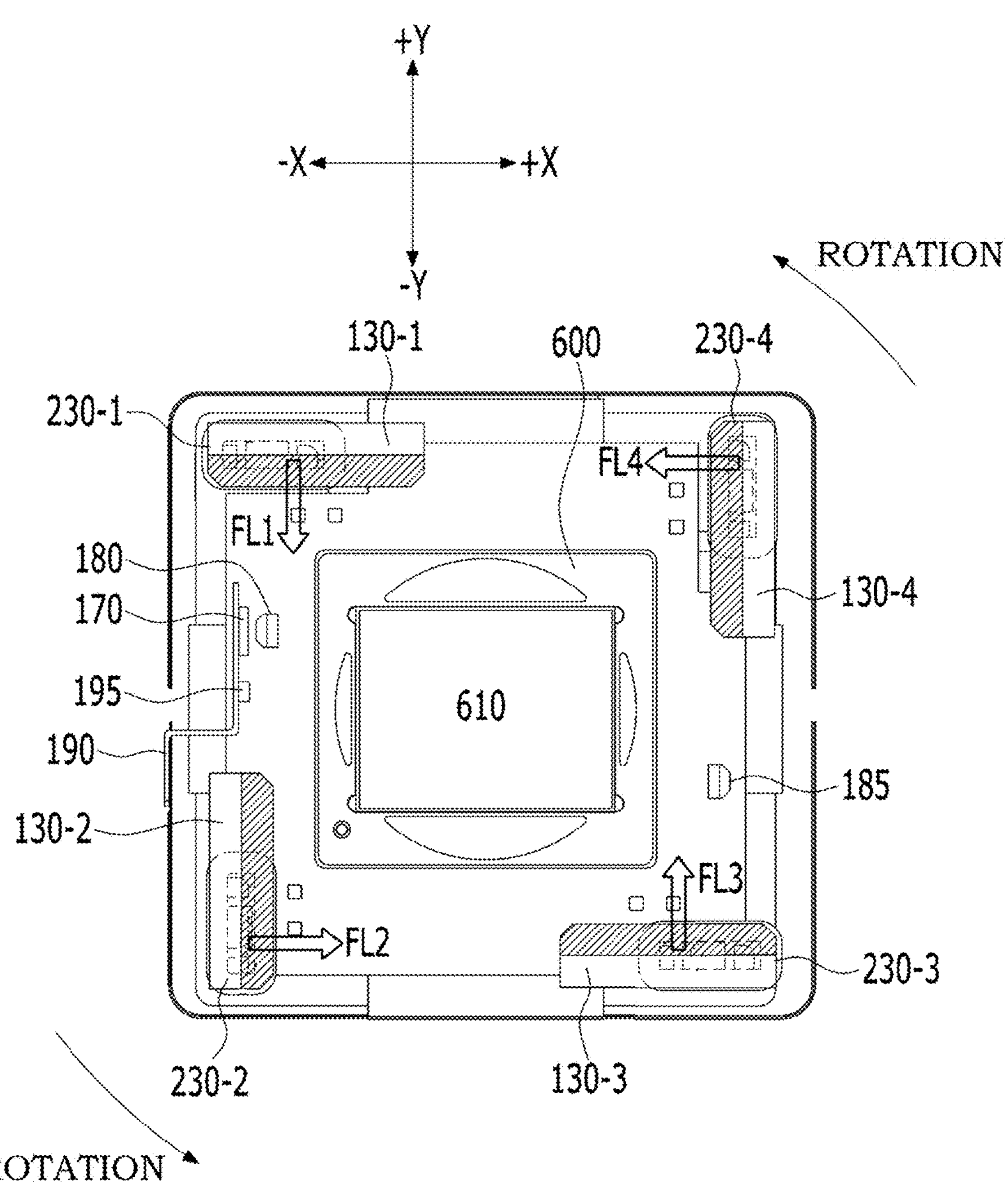
FIG. 20F is a view for explaining rotation of the OIS moving unit in the counterclockwise direction in the four-channel drive mode.

FIG. 20E is a view for explaining rotation of the OIS moving unit in the clockwise direction in the four-channel drive mode, and FIG. 20F is a view for explaining rotation of the OIS moving unit in the counterclockwise direction in the four-channel drive mode.

Referring to FIGS. 20E and 20F, the OIS moving unit may be rotated, tilted, or rolled with respect to the optical axis or about the optical axis by first electromagnetic force FR1 or FL1, which is generated by interaction between the first coil unit 230-1 and the first magnet unit 130-1, second electromagnetic force FR2 or FL2, which is generated by interaction between the second coil unit 230-2 and the second magnet unit 130-2, third electromagnetic force FR3 or FL3, which is generated by interaction between the third coil unit 230-3 and the third magnet unit 130-3, and fourth electromagnetic force FR4 or FL4, which is generated by interaction between the fourth coil unit 230-4 and the fourth magnet unit 130-4. In an example, the direction of the first electromagnetic force FR1 or FL1 and the direction of the third electromagnetic force FR3 or FL3 may be opposite each other. In addition, in an example, the direction of the second electromagnetic force FR2 or FL2 and the direction of the fourth electromagnetic force FR4 or FL4 may be opposite each other. In addition, in an example, the direction of the first electromagnetic force FR1 or FL1 and the direction of the second electromagnetic force FR2 or FL2 may be perpendicular to each other.

Compared to the three-channel drive mode shown in FIGS. 20C and 20D, according to the four-channel drive mode shown in FIGS. 20E and 20F, the electromagnetic force for rotation of the OIS driving unit may be increased, whereby the amount of driving current required to drive the first to fourth coil units 230-1 to 230-4 may be reduced, and accordingly, the amount of power that is consumed may be reduced.

The second position sensor 240 may be disposed on, coupled to, or mounted on the first surface 60A (e.g., the upper surface) of the first circuit board 250. The second position sensor 240 may detect displacement of the OIS moving unit in a direction perpendicular to the optical-axis direction, for example, shift or movement of the OIS moving unit in a direction perpendicular to the optical-axis direction. In addition, the second position sensor 240 may detect rotation, rolling, or tilting of the OIS moving unit within a predetermined range with respect to the optical axis or about the optical axis. The first position sensor 170 may alternatively be referred to as an "AF position sensor", and the second position sensor 240 may alternatively be referred to as an "OIS position sensor". The second position sensor 240 may include three or more sensors corresponding to or overlapping three or more magnet units, among the four magnet units, in the optical-axis direction in order to detect movement of the OIS moving unit.

In an example, the second position sensor 240 may be disposed below the second coil 230.

In an example, the second position sensor 240 may not overlap the second coil 230 in a direction perpendicular to the optical axis. In an example, the sensing element of the second position sensor 240 may not overlap the second coil 230 in a direction perpendicular to the optical axis. The sensing element may be a part that detects a magnetic field.

In an example, the center of the second position sensor 240 may not overlap the second coil 230 in a direction perpendicular to the optical axis. In an example, the center of the second position sensor 240 may be a spatial center in the x-axis direction and the y-axis direction in an xy-coordinate plane perpendicular to the optical axis. Alternatively, the center of the second position sensor 240 may be a spatial center in the x-axis, y-axis, and z-axis directions.

In another embodiment, at least a portion of the second position sensor 240 may overlap the second coil 230 in a direction perpendicular to the optical axis.

In an example, the second position sensor 240 may overlap the holes 41A to 41C in the holder 270 in the optical-axis direction. In addition, in an example, the second position sensor 240 may overlap the cavity in the second coil 230 in the optical-axis direction. In addition, in an example, at least some of the holes 41A to 41C in the holder 270 may overlap the cavity in the second coil 230 in the optical-axis direction.

In an example, the second position sensor 240 may include a first sensor 240A, a second sensor 240B, and a third sensor 240C, which are spaced apart from each other.

For example, each of the first to third sensors 240A, 240B, and 240C may be a Hall sensor. In another embodiment, each of the first to third sensors 240A, 240B, and 240C may be a driver IC including a Hall sensor and a driver. The description of the first position sensor 170 may be equally or similarly applied to the first to third sensors 240A, 240B, and 240C. For example, each of the first to third sensors 240A, 240B, and 240C may be a displacement detection sensor that varies in output voltage depending on the positional relationship with the magnet unit corresponding thereto.

Each of the first sensor 240A, the second sensor 240B, and the third sensor 240C may be conductively connected to the first circuit board 250.

The second position sensor 240 may be disposed below the cavity in the second coil 230. The second position sensor 240 may not overlap the second coil 230 in a direction perpendicular to the optical-axis direction. In an example, the second position sensor 240 may overlap the holder 270 in a direction perpendicular to the optical-axis direction.

In an example, the first sensor 240A may be disposed below the cavity in the first coil unit 230-1. The first sensor 240A may be disposed in a hole 41A corresponding thereto among the holes 41A to 41C in the holder 270. The second sensor 240B may be disposed below the cavity in the second coil unit 230-2. The second sensor 240B may be disposed in a hole 41B corresponding thereto among the holes 41A to 41C in the holder 270. The third sensor 240C may be disposed below the cavity in the third coil unit 230-3. The third sensor 240C may be disposed in a hole 41C corresponding thereto among the holes 41A to 41C in the holder 270.

In an example, each of the first to third sensors 240A, 240B, and 240C may not overlap a corresponding one of the coil units 230-1 to 230-3 in a direction perpendicular to the optical axis. The first to third sensors 240A, 240B, and 240C may overlap the holder 270 in a direction perpendicular to the optical axis.

Since the first to third sensors 240A, 240B, and 240C are disposed so as not to overlap the OIS coil 230 in a direction perpendicular to the optical axis, the influence of the magnetic field of the OIS coil 230 on the output of the OIS position sensor 240 may be reduced, and accordingly, it is possible to accurately perform OIS feedback operation and to ensure the reliability of OIS operation.

The second position sensor 240 may face, correspond to, or overlap the magnet 130 in the optical-axis direction.

In an example, at least a portion of the first sensor 240A may overlap the first magnet unit 130-1 in the optical-axis direction. The first sensor 240A may output a first output signal (e.g., first output voltage) corresponding to the result of detection of the magnetic field of the first magnet unit 130-1.

In an example, when the OIS moving unit is located at the initial position thereof, at least a portion of the second sensor 240B may overlap the second magnet unit 130-2 in the optical-axis direction. The second sensor 240B may output a second output signal (e.g., second output voltage) corresponding to the result of detection of the magnetic field of the second magnet unit 130-2.

In addition, in an example, when the OIS moving unit is located at the initial position thereof, at least a portion of the third sensor 240C may overlap the third magnet unit 130-3 in the optical-axis direction. The third sensor 240C may output a third output signal (e.g., third output voltage) corresponding to the result of detection of the magnetic field of the third magnet unit 130-3.

When the OIS moving unit is located at the initial position thereof, each of the first sensor unit 240A1 and the second sensor unit 240A2 may be disposed such that at least a portion thereof overlaps the boundary line or the interface between the N pole and the S pole of the first magnet unit 130-1.

The initial position of the OIS moving unit may be the original position of the OIS moving unit in the state in which no power or driving signal is applied to the second coil 230 from the controller 820 or 780 or the position at which the OIS moving unit is located as the result of the support board being elastically deformed due only to the weight of the OIS moving unit. In addition, the initial position of the OIS moving unit may be the position at which the OIS moving unit is located when gravity acts in the direction from the first board unit 255 toward the second board unit 800 or when gravity acts in the opposite direction. In addition, the initial position of the OIS moving unit may be the position at which the OIS moving unit is located without being moved in the state in which no power or driving signal is supplied to the second coil 230 by the controller 820 or 780.

In an example, the controller 830 or 780 may control rolling of the OIS moving unit using at least one of the first output voltage from the first sensor 240A, the second output voltage from the second sensor 240B, or the third output voltage from the third sensor 240C. In an example, the controller 830 or 780 may control rolling of the OIS moving unit using the first output voltage and the third output voltage.

In an example, the controller 830 or 780 may control movement or displacement of the OIS moving unit in the first horizontal direction (e.g., the y-axis direction) or the second horizontal direction (e.g., the x-axis direction) using at least one of the first to third output voltages. In an example, the controller 830 or 780 may control movement or displacement of the OIS moving unit in the first horizontal direction using the first output voltage from the first sensor 240A, and may control movement or displacement of the OIS moving unit in the second horizontal direction using the second output voltage from the second sensor 240B.

Each of the first to third sensors 240A, 240B, and 240C may be a Hall sensor or a driver IC including a Hall sensor. In another embodiment, each of the first and second sensors 240A and 240B may be a Hall sensor, and the third sensor 240C may be a tunnel magnetoresistance (TMR) sensor. In this case, the tunnel magnetoresistance (TMR) sensor may be a TMR magnetic angle sensor.

In still another embodiment, each of the first to third sensors 240A, 240B, and 240C may be a tunnel magnetoresistance (TMR) sensor. In this case, the TMR sensor may be a TMR linear magnetic field sensor having a linear output corresponding to the displacement (or stroke) of the OIS moving unit.

The base 210 may be disposed under the first board unit 255. The base 210 may have a polygonal shape, for example, a quadrangular shape, which coincides with or corresponds to the shape of the cover member 300 or the first board unit 255.

In an example, the base 210 may include a lower plate 21A and a side plate 21B protruding from the edge of the lower plate 21A. The lower plate 21A may correspond to or face a first region 801 of the second board unit 800, and the side plate 21B may protrude or extend from the lower plate 21A toward the side plate 302 of the cover member 300. In an example, the base 210 may include a bore 210A formed in the lower plate 21A thereof. The bore 210A in the base 210 may be a through-hole formed through the base 210 in the optical-axis direction. In another embodiment, the base may not have a bore.

In an example, the side plate 21B of the base 210 may be coupled to the side plate 302 of the cover member 300. The base 210 may include a stair 211 (refer to FIG. 18A), to which an adhesive is applied in order to be bonded to the side plate 302 of the cover member 300. In this case, the stair 211 may guide the side plate 302 of the cover member 300 to be coupled to the upper side thereof. The stair 211 of the base 210 and the lower end of the side plate 302 of the cover member 300 may be bonded and fixed to each other by means of an adhesive or the like.

The base 210 may include at least one protruding portion 216A to 216D, which protrudes from the lower plate 21A. In an example, the at least one protruding portion 216A to 216D may protrude from the side plate 21B of the base 210.

In an example, the side plate 21B of the base 210 may include four side plates, and each of the protruding portions 216A to 216D may be formed on a respective one of the four side plates. In an example, each of the protruding portions 216A to 216D may be disposed or located on the center of a respective one of the four side plates.

The second board unit 800 may be disposed under the base 210. In an example, the second board unit 800 may be disposed under the lower plate 21A of the base 210. The second board unit 800 may be coupled to the base 210. In an example, the second board unit 800 may be coupled to the lower plate 21A of the base 210. In an example, the second board unit 800 may be coupled to the lower surface of the lower plate 21A of the base 210.

The second board unit 800 may serve to supply a signal from the outside to the image sensor unit 350 or to output a signal from the image sensor unit 350 to the outside.

The second board unit 800 may include a first region (or a first board) 801 corresponding to the AF moving unit 100 or the image sensor 810, a second region (or a second board) 802 in which the connector 804 is disposed, and a third region (or a third board) 803 interconnecting the first region 801 and the second region 802. The connector 804 may be provided with ports in order to be conductively connected to the second region 802 of the second board unit 800 and to be conductively connected to an external device (e.g., the optical instrument 200A). The bore 210A in the base 210 may be closed or blocked by the first region 801 of the second board unit 800.

Each of the first region 801 and the second region 802 of the second board unit 800 may include a rigid substrate, and the third region 803 may include a flexible substrate. In addition, each of the first region 801 and the second region 802 may further include a flexible substrate.

In another embodiment, at least one of the first to third regions 801 to 803 of the second board unit 800 may include at least one of a rigid substrate or a flexible substrate.

The second board unit 800 may be disposed behind the first board unit 255. In an example, the first board unit 255 may be disposed between the AF moving unit 100 and the second board unit 800.

When viewed from above, the first region 801 of the second board unit 800 may have a polygonal shape (e.g., a quadrangular shape, a square shape, or a rectangular shape), but the disclosure is not limited thereto. In another embodiment, the first region of the second board unit may have a circular shape.

The second board unit 800 may include a plurality of pads 800B corresponding to the terminals 311 of the support board 220. Here, the pad 800B may alternatively be referred to as a "terminal".

Referring to FIG. 10A, the plurality of pads 800B may be formed in the first region 801 of the second board unit 800. In an example, the second board unit 800 may include first pads, which are disposed or arranged on one side of the first region 801 so as to be spaced apart from each other in the third direction (e.g., the y-axis direction), and second pads, which are disposed or arranged on the opposite side of the first region 801 so as to be spaced apart from each other in the third direction (e.g., the y-axis direction).

In an example, the plurality of pads 800B may be formed on a first surface of the second board unit 800 (e.g., the first region 801), which faces the first board unit 255.

The second board unit 800 may include at least one coupling hole 800C formed therein for coupling to a coupling protrusion 45B of the base 210. The coupling hole 800C may be a through-hole formed through the second board unit 800 in the optical-axis direction. In another embodiment, the coupling hole may take the form of a recess.

In an example, the coupling protrusion 45B may protrude from the lower surface of the base 210, and may be formed on each of the corners of the lower surface of the base 210, which face each other in an oblique direction. In addition, the coupling hole 800C may be formed in each of the corners of the second board unit 800, which face each other in an oblique direction. In another embodiment, the coupling hole in the second board unit 800 may be disposed adjacent to at least one of the sides or the corners of the first region 801.

The support board 310 may conductively connect the first board unit 255 to the second board unit 800. The support board 310 may alternatively be referred to as a "support member", a "connection board", or a "connection part".

The support board 310 may include a flexible substrate, or may be embodied as a flexible substrate. In an example, the support board 310 may include a flexible printed circuit board (FPCB). At least a portion of the support board 310 may be flexible. The first circuit board 250 and the support board 310 may be connected to each other.

In an example, the support board 310 may include a connection portion 320, which is connected to the first circuit board 250. In an example, the first circuit board 250 and the support board 310 may be integrally formed with each other. In another embodiment, the first circuit board 250 and the support board 310 may be provided separately from each other, rather than being integrated, and may be connected to each other via the connection portion 320 and may be conductively connected to each other.

In addition, the support board 310 may be conductively connected to the first circuit board 250. The support board 310 may be conductively connected to the second board unit 800.

The support board 310 may guide movement of the OIS moving unit. The support board 310 may guide the OIS moving unit to move in a direction perpendicular to the optical-axis direction. The support board 310 may guide the OIS moving unit to rotate about the optical axis. The support board 310 may restrict movement of the OIS moving unit in the optical-axis direction.

A portion of the support board 310 may be connected to the first circuit board 250, which is the OIS moving unit, and another portion of the support board 310 may be coupled to the base 210, which is the fixed unit. In an example, the connection portion 320 of the support board 310 may be coupled to the first circuit board 250. In addition, bodies 86 and 87 of the support board 310 may be coupled to protruding portions of the base 210, and terminal units 7A, 7B, 8A, and 8B of the support board 310 may be coupled to the second board unit 800.

Referring to FIGS. 15 to 18B, the support board 310 may include an elastic unit 310A and a circuit member 310B. The support board 310 may alternatively be referred to as an "interposer".

The elastic unit 310A serves to elastically support the OIS moving unit, and may be embodied as an elastic body, for example, a spring. The elastic unit 310A may include metal, or may be made of an elastic material.

FIG. 16 illustrates embodiments of the elastic unit 310A.

The elastic unit 310A1 shown in FIG. 16(*a*) may include a planar portion 371A and an uneven portion 371B. The planar portion 371A may be provided in plural, and the uneven portion 371B may be formed between two planar portions. In an example, the uneven portion 371B may include at least one of a first bump 371B1 and a second bump 371B2. In an example, the first bump 371B1 and the second bump 371B2 may be formed to be symmetrical with each other in the vertical direction.

The elastic unit 310A2 shown in FIG. 16(*b*) may include a planar portion 372A and an uneven portion 372B. The planar portion 372A may be provided in plural, and the uneven portion 372B may be formed between two planar portions 372A. For example, the uneven portion 372B may take the form of a sinusoidal curve, sawteeth, or zigzag.

The elastic unit 310A3 shown in FIG. 16(*c*) may include a first planar portion 373A and a second planar portion 373B. The length of the first planar portion 373A in the first direction (or the optical-axis direction) may be different from the length of the second planar portion 373B in the first direction (or the optical-axis direction). In an example, the former may be longer than the latter. The first planar portion 373A may be provided in plural, and the second planar portion 373B may be provided in plural. In an example, the first planar portion 373A and the second planar portion 373B may be formed to be uneven.

The elastic unit 310A4 shown in FIG. 16(*d*) may include a first planar portion 373A, a second planar portion 373B, and a protruding portion (or an extension portion) protruding or extending from the first planar portion 373A.

In another embodiment, only corner portions of each of the elastic units shown in FIGS. 16(*a*) to 16(*d*) may be included.

The elastic unit 310A may include at least one of the elastic units 310A1 to 310A4 shown in FIGS. 16(*a*) to 16(*d*).

The circuit member 310B serves to conductively connect the first circuit board 250 to the second board unit 800, and may be embodied as a flexible substrate or may include at least one of a flexible substrate or a rigid substrate. The circuit member 310B may be, for example, an FPCB.

The elastic unit 310A may be coupled to the circuit member 310B, and may serve to increase the strength of the circuit member 310B. Referring to FIGS. 15 and 17, the elastic unit 310A may be disposed outside the circuit member 310B, and the outer side surface of the circuit member 310B may be coupled to the inner side surface of the elastic unit 310A. In another embodiment, the circuit member may be disposed outside the elastic unit.

The support board 310 may be connected to the first board unit 255 (e.g., the first circuit board 250), and may include one or more connection portions 320A and 320B, which are conductively connected to the first board unit 255 (e.g., the first circuit board 250). In addition, the support board 310 may be connected to the second board unit 800, and may include one or more terminal units 7A, 7B, 8A, and 8B, which are conductively connected to the second board unit 800. Each of the terminals 7A, 7B, 8A, and 8B may include a plurality of terminals 311.

Referring to FIGS. 15 and 17, the support board 310 may include a first support board 310-1 and a second support board 310-2, which are spaced apart from each other. The first support board 310-1 and the second support board 310-2 may be formed to be bilaterally symmetrical with each other. In another embodiment, the first support board 310-1 and the second support board 310-2 may be integrated into a single board.

As shown in FIG. 17, the first and second support boards 310-1 and 310-2 may be disposed on respective sides of the first circuit board 250. In an example, the first support board 310-1 may include a first body 86 and at least one terminal unit 7A and 7B extending from the first body 86. The at least one terminal unit 7A and 7B of the first support board 310-1 may include a plurality of terminals 311.

The second support board 310-2 may include a second body 87 and at least one terminal unit 8A and 8B extending from the second body 87. The at least one terminal unit 8A and 8B of the second support board 310-2 may include a plurality of terminals 311.

The first circuit board 250 may include a first side portion 33A and a second side portion 33B, which are located opposite each other, and may include a third side portion 33C and a fourth side portion 33D, which are located between the first side portion 33A and the second side portion 33B and are located opposite each other.

The first body 86 may include a first portion 6A, which corresponds to or faces the first side portion 33A of the first circuit board 250, a second portion 6B, which corresponds to a portion (or one side) of the third side portion 33C of the first circuit board 250, and a third portion 6C, which corresponds to a portion (or one side) of the fourth side portion 33D of the first circuit board 250. In addition, the first body 86 may include a first bent portion 6D, which interconnects the first portion 6A and the second portion 6B and is bent from one end of the first portion 6A, and a second bent portion 6E, which interconnects the first portion 6A and the third portion 6C and is bent from the other end of the first portion 6A.

The first support board 310-1 may include a first terminal unit 7A, which extends or protrudes from the second portion 6B of the first body 86 toward the second board unit 800, and a second terminal unit 7B, which extends or protrudes from the third portion 6C of the first body 86 toward the second board unit 800. The second terminal unit 7B may be located opposite the first terminal unit 7A.

The first support board 310-1 may include a first connection portion 320A, which interconnects the first portion 6A of the first body 86 and the first side portion 33A of the first circuit board 250. The first connection portion 320A may include a bent portion.

The second body 87 may include a first portion 9A, which corresponds to or faces the second side portion 33B of the first circuit board 250, a second portion 9B, which corresponds to another portion (or opposite side) of the third side portion 33C of the first circuit board 250, and a third portion 9C, which corresponds to another portion (or opposite side) of the fourth side portion 33D of the first circuit board 250. In addition, the second body 87 may include a first bent portion 9D, which interconnects the first portion 9A and the second portion 9B and is bent from one end of the first portion 9A, and a second bent portion 9E, which interconnects the first portion 9A and the third portion 9C and is bent from the other end of the first portion 9A.

The second support board 310-2 may include a third terminal unit 8A, which extends or protrudes from the second portion 9B of the second body 87 toward the second board unit 800, and a fourth terminal unit 8B, which extends or protrudes from the third portion 9C of the second body 87 toward the second board unit 800. The fourth terminal unit 8B may be located opposite the third terminal unit 8A.

The second support board 310-2 may include a second connection portion 320B, which interconnects the first portion 9A of the second body 87 and the second side portion 33B of the first circuit board 250. The second connection portion 320B may include a bent portion.

In addition, the first support board 310-1 may include a first flexible board 31A, which conductively connects the first board unit 255 (e.g., the first circuit board 250) to the second board unit 800, and a first elastic member 30A, which is coupled to the first flexible board 31A.

The second support board 310-2 may include a second flexible board 31B, which conductively connects the first board unit 255 (e.g., the first circuit board 250) to the second board unit 800, and a second elastic member 30B, which is coupled to the second flexible board 31B.

The terminal unit (e.g., 8B) of the support board 310 may be provided with terminals P1 to P4 in order to be conductively connected to the terminals B1 to B4 of the terminal unit 95 of the circuit board 190 of the AF moving unit 100. The terminals B1 to B4 of the terminal unit 95 of the circuit board 190 and the terminals P1 to P4 of the terminal unit 8B of the support board 310 may be conductively connected to each other by means of solder or a conductive adhesive. That is, the circuit board 190 of the AF moving unit 100 may be conductively connected to the second board unit 800 via the support board 310.

Referring to FIG. 17, the circuit member 310B of the support board 310 may include a first insulating layer 29A, a second insulating layer 29B, and a conductive layer 29C formed between the first insulating layer 29A and the second insulating layer 29B. The conductive layer 29C may be a wiring layer for transmitting an electrical signal. In an example, the second layer 29B may be located outside the first layer 29A.

Each of the first and second insulating layers 29A and 29B may be formed of an insulative material, such as polyimide, and the conductive layer 29C may be formed of a conductive material, such as copper, gold, or aluminum, or may be formed of an alloy including copper, gold, or aluminum.

The elastic unit 310A may be disposed on the second layer 29B. The elastic unit 310A may include at least one of copper, titanium, or nickel, or may be formed of an alloy including at least one of copper, titanium, or nickel in order to serve as a spring. In an example, the elastic unit 310A may be formed of an alloy of copper and titanium or an alloy of copper and nickel.

The elastic unit 310A may be conductively connected to the ground of the first board unit 255 or the ground of the second board unit 800. The elastic unit 310A may be used for impedance matching of transmission lines (or wires) of the board units 255, 310, and 800, and may reduce loss of transmission signals through impedance matching to reduce the influence of noise. In an example, the matching impedance may be 40 ohms to 600 ohms. In an example, the matching impedance may be 50 ohms. In an example, a sheet of EMI tape or a sheet of conductive tape may be used for impedance matching. In an example, the sheet of EMI tape or the sheet of conductive tape may be disposed on or attached to at least one of the elastic unit 310A or the circuit member 310B.

The support board 310 may further include a protective material or an insulative material enveloping or covering the elastic unit 310A.

In an example, the thickness T11 of the conductive layer 29C between the first layer 29A and the second layer 29C may be 7 micrometers to 50 micrometers. In another embodiment, the thickness T11 may be 15 micrometers to 30 micrometers.

In addition, in an example, the thickness T12 of the elastic unit 310A may be 20 micrometers to 150 micrometers. In another embodiment, the thickness T12 may be 30 micrometers to 100 micrometers. In an example, the thickness T12 of the elastic unit 310A may be larger than the thickness T11 of the conductive layer 29C. In another embodiment, T12 may be equal to or smaller than T11.

Referring to FIGS. 14B, 15, 17, 18A, and 18B, the holder 270 may include first to fourth side portions corresponding to the first to fourth side portions 33A to 33D of the first circuit board 250. The at least one connection portion 320A and 320B of the support board 310 may be coupled to at least one of the first to fourth side portions of the holder 270 by means of an adhesive. In an example, the first connection portion 320A may be coupled to the first side portion of the holder 270 by means of an adhesive, and the second connection portion 320B may be coupled to the second side portion of the holder 270 by means of an adhesive.

The first to fourth side portions of the holder 270 may be provided with protruding portions 4A to 4D. In an example, the first connection portion 320A and the first protruding portion 4A formed on the first side portion of the holder 270 may form a first coupling region (38A in FIG. 18A), in which the first connection portion 320A and the first protruding portion 4A are coupled to each other. The second connection portion 320B and the second protruding portion 4B formed on the second side portion of the holder 270 may form a second coupling region (38B in FIG. 18A), in which the second connection portion 320B and the second protruding portion 4B are coupled to each other.

In addition, the base 210 may include first to fourth side portions corresponding to the first to fourth side portions 33A to 33D of the first circuit board 250. In an example, the side plate 21B of the base 210 may include the first to fourth side portions of the base 210. The first to fourth side portions of the base 210 may be provided with protruding portions 216A to 216D.

At least a portion of the support board 310 may be coupled to the base 210. In an example, the bodies 86 and 87 of the support board 310 may be coupled to the base 210 by means of an adhesive. In an example, a portion of each of the bodies 86 and 87 of the support board 310, which are connected to the terminal units 7A, 7B, 8A, and 8B, may be coupled to the base 210.

In an example, the first terminal unit 7A and/or the second portion 6B of the first support board 310-1 may be coupled to one region of the third side portion (or the third protruding portion 216C) of the base 210, and the second terminal unit 7B and/or the third portion 6C of the first support board 310-1 may be coupled to one region of the fourth side portion (or the fourth protruding portion 216D) of the base 210.

In an example, the third terminal unit 8A and the second portion 9B of the second support board 310-2 may be coupled to another region of the third side portion (or the third protruding portion 216C) of the base 210, and the fourth terminal unit 8B and the third portion 9C of the second support board 310-2 may be coupled to another region of the fourth side portion (or the fourth protruding portion 216D) of the base 210.

A third coupling region (39A in FIG. 18A) may be formed between the first and third terminal units 7A and 8A of the support board 310 and the third side portion (or the third protruding portion 216C) of the base 210, and a fourth coupling region (39B in FIG. 18A) may be formed between the second and fourth terminal units 7B and 8B and the fourth side portion (or the fourth protruding portion 216D) of the base 210. The OIS moving unit may be elastically supported with respect to the fixed unit by the support board 310 and the first to fourth coupling regions 38A, 38B, 39A, and 39B. The terminals 311 of the support board 310 may be coupled and conductively connected to the terminals of the second board unit 800 by means of solder or a conductive adhesive.

Referring to FIGS. 18A and 18B, a portion of the support board 310 may be coupled to the outer side surface of the base 210 (or the protruding portions 216C and 216D). In another embodiment, a portion of the support board 310 may be coupled to the inner side surface of the base 210 (or the protruding portions 216C and 216D).

In another embodiment, the support member may be an elastic member including no substrate, for example, a spring, a wire, a shape memory alloy, or a ball member.

The elastic member 315 may elastically support the first board unit 255 with respect to the base 210. In an example, one end of the elastic member 315 may be coupled to the first board unit 255, and the other end of the elastic member 315 may be coupled to the base 210.

Referring to FIGS. 18A, 18B, and 19, the elastic member 315 may include a first coupling portion 315A, which is coupled to the first circuit board 250 of the first board unit 255, a second coupling portion 315B, which is coupled to the base 210, and a connection portion 315C, which interconnects the first coupling portion 315A and the second coupling portion 315B.

In an example, the first coupling portion 315A may be coupled to at least a portion of the lower surface of the first circuit board 250. Alternatively, the first coupling portion 315A may be coupled to at least a portion of the lower surface of the holder 270. In an example, the first coupling portion 315A may be coupled to at least one of the lower surface of the first circuit board 250 or the lower surface of the holder 270 by means of an adhesive.

In an example, the second coupling portion 315B may be coupled to at least a portion of the upper surface of the base 210. In an example, the base 210 may be provided on the upper surface thereof with at least one protrusion 210-1, and the second coupling portion 315B may have a hole 315-1 formed therein for coupling to the at least one protrusion 210-1 of the base 210. The protrusion 210-1 may be formed on a corner of the upper surface of the base 210, and the hole 315-1 may be formed in a corner of the second coupling portion 315B.

In an example, when viewed in the first direction or from below, each of the first coupling portion 315A and the second coupling portion 315B may have a polygonal shape, such as a quadrangular shape, and may take the form of a closed curve. In an example, when viewed in the first direction or from below, the shape of the first coupling portion 315A may be a quadrangular ring shape.

In an example, when viewed in the first direction or from below, the first coupling portion 315A may be disposed inside the second coupling portion 315B. Each of the first coupling portion 315A and the second coupling portion 315B may take the form of a plate.

The connection portion 315C may include at least one of at least one linear portion or at least one bent portion. In an example, the connection portion 315C may take the form of a wire. In another embodiment, the connection portion 315C may take the form of a plate.

The connection portion 316C may include a plurality of connection portions or connection lines, which are spaced apart from each other. Each of the plurality of connection portions (or connection lines) may include at least one of at least one linear portion or at least one bent portion. In an example, the connection portion 316C may extend in a direction perpendicular to the optical axis.

The image sensor unit 350 may include at least one of a motion sensor 820, a controller 830, a memory 512, or a capacitor 514.

The motion sensor 820, the controller 830, and the memory 512 may be disposed on any one of the first board unit 255 and the second board unit 800. The capacitor 514 may be disposed on at least one of the first board unit 255 or the second board unit 800.

In an example, the motion sensor 820 and the memory 512 may be disposed on the second board unit 800 (e.g., the first region 801). In an example, the controller 830 may be disposed or mounted on the first circuit board 250 of the first board unit 255.

In another embodiment, the controller 830 may be disposed on the second board unit 800. Because the heat generated from the image sensor 810 may cause malfunction or errors of the controller 830, it may be preferable for the controller 830 to be located far away from the image sensor 810.

The motion sensor 820 may be conductively connected to the controller 830 via wirings or circuit patterns formed on the first board unit 255 and the second board unit 800. The motion sensor 820 may output rotational angular speed information regarding the movement of the camera device 10. The motion sensor 820 may be embodied as a two-axis or three-axis gyro sensor or an angular speed sensor. In an example, the motion sensor 820 may output information about the movement amount in the X-axis direction, the movement amount in the y-axis direction, and the rotation amount in response to movement of the camera device 10.

In another embodiment, the motion sensor 820 may be omitted from the camera device 10, or may be disposed in another region of the second board unit 800. In the case in which the motion sensor 820 is omitted from the camera module, the camera device 10 may receive position information from a motion sensor provided in the optical instrument 200A in response to movement of the camera device 10.

The memory 512 may store a first data value (or a code value) corresponding to the output from the second position sensor 240 according to displacement (or stroke) of the OIS moving unit in the second direction (e.g., the X-axis direction) perpendicular to the optical axis in order to implement OIS feedback operation.

In addition, the memory 512 may store a second data value (or a code value) corresponding to the output from the first position sensor 170 according to displacement (or stroke) of the bobbin 110 in the first direction (e.g., the optical-axis direction or the Z-axis direction) in order to implement AF feedback operation.

In an example, each of the first and second data values may be stored in the memory 512 in the form of a look-up table. Alternatively, each of the first and second data values may be stored in the memory 512 in the form of an equation or an algorithm. In addition, the memory 512 may store an equation, an algorithm, or a program for operation of the controller 830. In an example, the memory 512 may be a non-volatile memory, for example, an electrically erasable programmable read-only memory (EEPROM).

The controller 830 may be conductively connected to the first position sensor 170 and the second position sensor 240. The controller 830 may control a driving signal that is supplied to the second coil 230 using the output signal received from the second position sensor 240 (240-1 and 240-2) and the first data value stored in the memory 512, and may perform feedback OIS operation.

In addition, the controller 830 may control a driving signal that is supplied to the first coil 120 using the output signal from the first position sensor 170 and the second data value stored in the memory 512, and may perform feedback autofocus operation.

The controller 830 may be embodied as a driver IC, but the disclosure is not limited thereto. In an example, the controller 830 may be conductively connected to the terminals 251 of the first circuit board 250 of the first board unit 255.

The image sensor unit 350 may further include a filter 610. In addition, the image sensor unit 350 may further include a filter holder 600, in which the filter 610 is disposed, seated, or accommodated. The filter holder 600 may alternatively be referred to as a "sensor base".

The filter 610 may serve to block or allow introduction of light within a specific wavelength range, among the light that has passed through the lens barrel 400, into the image sensor 810.

The filter 610 may be, for example, an infrared cut filter. In an example, the filter 610 may be disposed parallel to the xy-plane, which is perpendicular to the optical axis OA. The filter 610 may be disposed below the lens module 400.

The filter holder 600 may be disposed below the AF moving unit 100. In an example, the filter holder 600 may be disposed on the first board unit 255. In an example, the filter holder 600 may be disposed on the first surface 260A of the second circuit board 260 of the first board unit 255.

The filter holder 600 may be coupled to one region of the second circuit board 260 around the image sensor 810 by means of an adhesive, and may be exposed through the bore 250A in the first circuit board 250. In an example, the filter holder 600 may be visible through the bore 250A in the first circuit board 250 of the first board unit 255. In an example, the bore 250A in the first circuit board 250 may expose the filter holder 600 disposed on the second circuit board 260 and the filter 610 disposed on the filter holder 600. In another embodiment, the filter holder may be coupled to the holder 270 or to the AF moving unit 100.

The filter holder 600 may have a bore 61A formed in a portion thereof, on which the filter 610 is mounted or disposed, in order to allow the light passing through the filter 610 to be introduced into the image sensor 810. The bore 61A in the filter holder 600 may be a through-hole formed through the filter holder 600 in the optical-axis direction. In an example, the bore 61A in the filter holder 600 may be formed through the center of the filter holder 600, and may be disposed so as to correspond to or face the image sensor 810.

The filter holder 600 may include a seating portion 500, which is depressed in the upper surface thereof to allow the filter 610 to be seated therein. The filter 610 may be disposed, seated, or mounted in the seating portion 500. The seating portion 500 may be formed so as to surround the bore 61A. In another embodiment, the seating portion of the filter holder may take the form of a protruding portion protruding from the upper surface of the filter.

The image sensor unit 350 may further include an adhesive disposed between the filter 610 and the seating portion 500, and the filter 610 may be coupled or attached to the filter holder 600 by means of the adhesive.

The cover member 300 may take the form of a box that has an open lower portion and includes an upper plate 301 and side plates 302. The lower portions of the side plates 302 of the cover member 300 may be coupled to the base 210. The shape of the upper plate 301 of the cover member 300 may be a polygonal shape, for example, a quadrangular shape or an octagonal shape. The cover member 300 may have a bore 303 formed in the upper plate 301 thereof to expose the lens of the lens module 400 coupled to the bobbin 110 to external light.

Referring to FIGS. 1 and 3, any one of the side plates 302 of the cover member 300 may have a recess portion 304 formed therein to expose the terminal 95 of the circuit board 190 and the terminal 800B of the second board unit corresponding thereto.

The cover member 300 may include a protruding portion 305 extending from the upper plate 301 toward the groove 119 in the bobbin 110. The protruding portion 305 may alternatively be referred to as an "extension portion". In an example, the cover member 300 may include at least one protruding portion 305 extending from one region adjacent to the bore 303 formed in the upper plate 301 toward the upper surface of the bobbin 110. The protruding portion 305 may be integrally formed with the upper plate 301 and the side plates 302, and may be made of the same material as the upper plate 301 and the side plates 302.

In an example, the cover member 300 may include four protruding portions corresponding to the four corners of the upper plate 301. In another embodiment, the number of protruding portions 305 may be one or two or more.

In an example, the protruding portion 305 may take the form of a polygonal-shaped plate, for example, a quadrangular-shaped plate. In an example, at least part of the protruding portion 305 may include a curved portion.

At least part of the protruding portion 305 of the cover member 300 may be disposed in or inserted into the groove 119 in the bobbin 110. In an example, one end or a distal end of the protruding portion 305 may be disposed in the groove 119 in the bobbin 110. In an example, at the initial position of the bobbin 110, the protruding portion 305 and the bottom surface of the groove 119 in the bobbin 110 may be spaced apart from each other.

When the bobbin 110 is moved in the optical-axis direction during AF operation, the protruding portion 305 of the cover member 300 may come into contact with the bottom surface of the groove 119 in the bobbin 110. Accordingly, the protruding portion 305 may serve as a stopper restricting movement of the bobbin 110 in the upward direction within a predetermined range. In addition, since at least part of the protruding portion 305 is disposed in the groove 119 in the bobbin 110, the protruding portion 305 may suppress or inhibit the bobbin 110 from rotating beyond a predetermined range about the optical axis due to impact.

In an example, the cover member 300 may be formed of an injection-molded material, for example, plastic or resin. In addition, the cover member 300 may be made of an insulative material or a material capable of blocking electromagnetic waves.

The cover member 300 and the base 210 may accommodate the AF moving unit 100 and the image sensor unit 350, may protect the AF moving unit 100 and the image sensor unit 350 from external impact, and may inhibit introduction of external foreign substances thereinto.

The OIS moving unit is movable relative to the fixed unit in a direction perpendicular to the optical axis OA. The OIS moving unit is spaced apart from the fixed unit by a predetermined distance. That is, the OIS moving unit may be suspended (flown) from the fixed unit by the support board 310. The OIS moving unit may be moved relative to the fixed unit by first electromagnetic force generated by the magnet 130 and the second coil 230 and second electromagnetic force generated by the second magnet 24 and the second coil 230.

In an example, at the initial position of the OIS moving unit, the outer surface of the holder 270 may be spaced apart from the inner surface of the base 210 by a predetermined distance. In addition, in an example, at the initial position of the OIS moving unit, the lower surfaces of the holder 270 and the first board unit 255 may be spaced apart from the base 210 by a predetermined distance.

In an example, the first to fourth coil units 230-1 to 230-4 of the second coil 230 may controlled by four channels. In this case, the four coil units 230-1 to 230-4 may be controlled in the state of being conductively separated from each other. In an example, any one of a forward direction current and a reverse direction current may be selectively applied to each of the coil units 230-1 to 230-4. In this case, four pairs of lead wires, i.e., a total of eight lead wires, may be led out from the second coil 230.

In another embodiment, the first to fourth coil units 230-1 to 230-4 of the second coil 230 may be controlled by three channels in order to implement OIS operation. In an example, the first to third coil units 230-1 to 230-3 may be conductively separated from each other, and the fourth coil unit 230-4 may be conductively connected in series to any one of the first to third coil units. In this case, three pairs of lead wires, i.e., a total of six lead wires, may be led out from the second coil 230.

In an example, the second coil unit 230-2 and the fourth coil unit 230-4 may be connected in series to each other. The magnetization direction of the second magnet unit 130-2, which corresponds to or faces the second coil unit 230-2, and the magnetization direction of the fourth magnet unit 120-4, which corresponds to or faces the fourth coil unit 230-4, may be the same as each other. In an example, the magnetization direction of the first magnet unit 130-1 and the magnetization direction of the third magnet unit 130-3 may be the same as each other. In addition, in an example, the magnetization direction of the second magnet unit 130-2 may be different from the magnetization direction of the first magnet unit 130-1. In an example, the magnetization direction of the second magnet unit 130-2 may be perpendicular to the magnetization direction of the first magnet unit 130-1.

The controller 830 may supply at least one driving signal to at least one of the first to fourth coil units 230-1 to 230-4, and may control the at least one driving signal to move the OIS moving unit in the X-axis direction and/or the Y-axis direction or rotate the OIS moving unit within a predetermined angular range about the optical axis.

Figure 21:
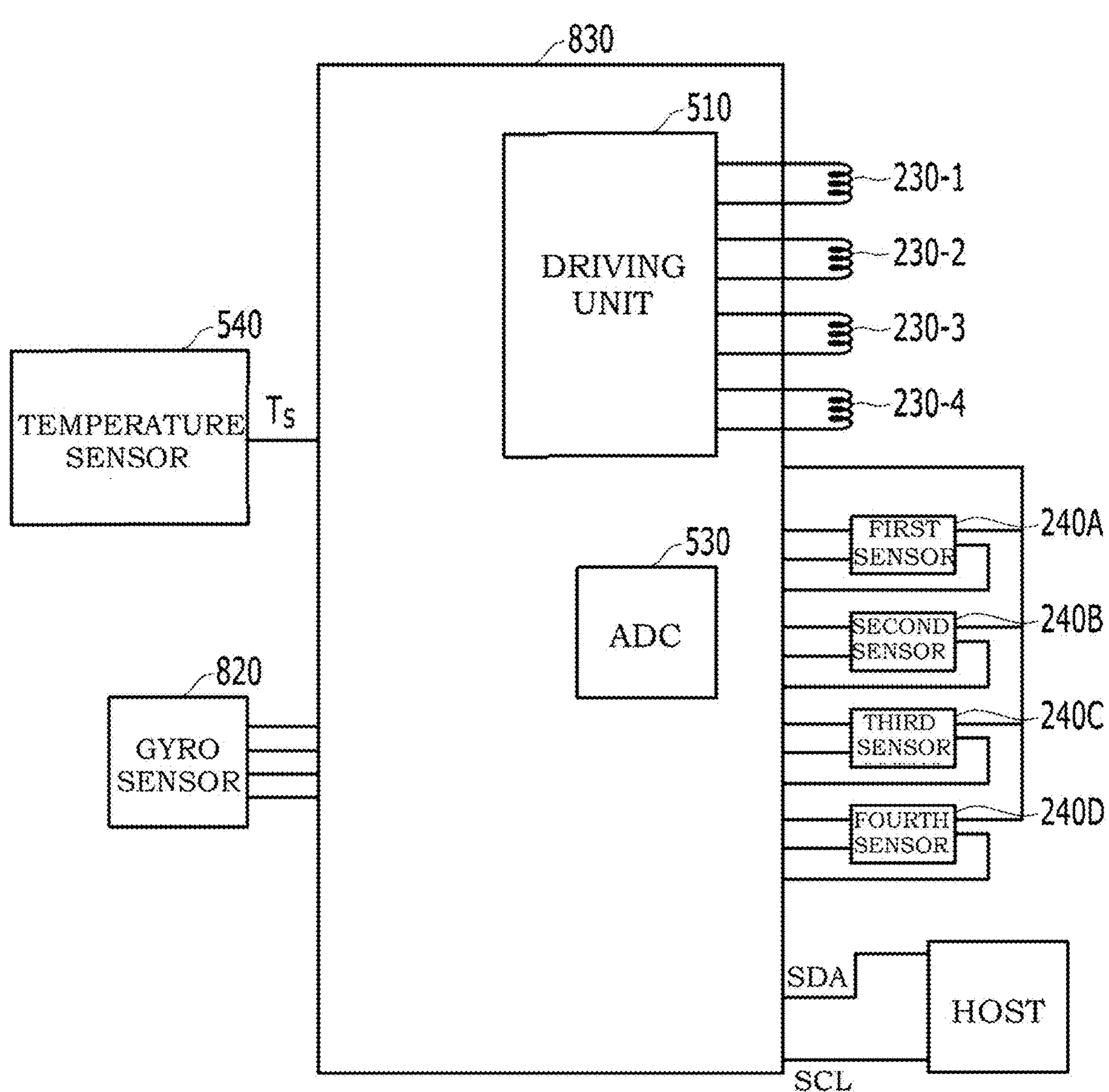
FIG. 21 is a block diagram of a controller and first to third sensors.

FIG. 21 is a block diagram of the controller 830 and the first to third sensors 240A, 240B, and 240C. The controller 830 may perform communication, for example, I2C communication, of transmitting and receiving data to and from a host using a clock signal SCL and a data signal SDA. In an example, the host may be the controller 780 of the optical instrument 200A.

The controller 830 may be conductively connected to the second coil 230. The controller 830 may include a driving unit 510 for supplying a driving signal required to drive the first to fourth coil units 230-1 to 230-4. In an example, the driving unit 510 may include an H bridge circuit or an H bridge driver capable of changing the polarity of the driving signal. In this case, the driving signal may be a PWM signal in order to reduce consumption of current, and the driving frequency of the PWM signal may be 20 kHz or more, which is outside of the audible frequency band. In another embodiment, the driving signal may be a DC signal.

Each of the first to third sensors 240A to 240C may include two input terminals and two output terminals. The controller 830 may supply power or a driving signal to two input terminals of each of the first to third sensors 240A to 240C. In an example, any one (e.g., a ground terminal or a (−) input terminal) of the two input terminals (a (+) input terminal and a (−) input terminal) of each of the first to third sensors 240A to 240C may be commonly connected.

In an example, the controller 830 may receive a first output voltage from the first sensor 240A, a second output voltage from the second sensor 240B, and a third output voltage from the third sensor 240C, and may control movement (or displacement) of the OIS moving unit in the X-axis direction or the Y-axis direction using the received first to third output voltages.

In addition, the controller 830 may control rotation, tilting, or rolling of the OIS moving unit about the optical axis using the received first to third output voltages.

Movement of the OIS moving unit in the X-axis direction or the Y-axis direction may be controlled.

In addition, the controller 830 may include an analog-to-digital converter 530, which receives output voltage from the two output terminals of each of the first to third sensors 240A to 240C and outputs a data value, a digital value, or a code value corresponding to the result of analog-to-digital conversion of the received output voltage.

The controller 830 may control movement (or displacement) of the OIS moving unit in the X-axis direction or the Y-axis direction and rotation, tilting, or rolling of the OIS moving unit about the optical axis using the data values output from the analog-to-digital converter 530.

A temperature sensor 540 may measure the ambient temperature (e.g., the temperature of each of the first to third sensors 240A, 240B, and 240C), and may output a temperature detection signal Ts corresponding to the result of the measurement. The temperature sensor 540 may be, for example, a thermistor.

The resistance value of a resistor included in the temperature sensor 540 may vary depending on changes in the ambient temperature, and accordingly, the value of the temperature detection signal Ts may vary depending on changes in the ambient temperature. An equation or a look-up table relating to the relationship between the ambient temperature and the temperature detection signal Ts may be stored in the memory or the controller 830 or 780 through calibration.

Because the output values from the first to third sensors 240A, 240B, and 240C are also influenced by temperature, it is necessary to compensate for the output values from the first to third sensors 240A, 240B, and 240C according to the ambient temperature in order to accurately and reliably implement OIS feedback operation.

To this end, in an example, the controller 830 or 780 may compensate for the output value (or the data value corresponding to output) from each of the first to third sensors 240A, 240B, and 240C using the ambient temperature measured by the temperature sensor 540 and a temperature compensation algorithm or a compensation equation. The temperature compensation algorithm or the compensation equation may be stored in the controller 830 or 780 or the memory.

The camera device may further include a fourth sensor 240D, which corresponds to or faces the fourth magnet unit 130-4 in the optical-axis direction. The fourth sensor 240D may be disposed on the first board unit 255 (e.g., the first circuit board 250). In an example, the fourth sensor 240D may be disposed adjacent to any one corner of the first circuit board 250, on which the first to third sensors are not disposed. In an example, the fourth sensor 240D may be located so as to face the second sensor 240B in an oblique direction. In an example, the output voltage from the fourth sensor 240D may be used to detect movement of the OIS moving unit in the X-axis direction or the Y-axis direction. In another embodiment, the fourth sensor 240D may correspond to the first position sensor 170 of the AF moving unit 100.

Figure 22:
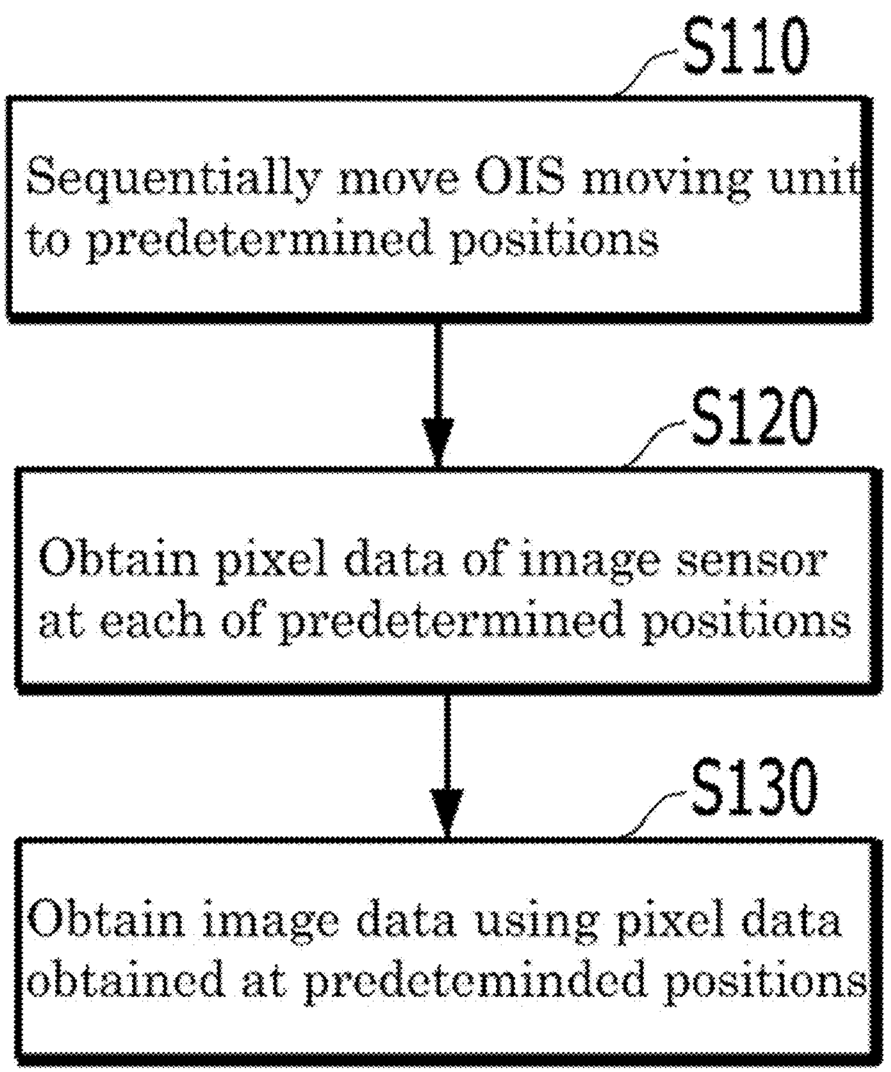
FIG. 22 illustrates an embodiment of a method of obtaining image data by controlling, by the controller, movement of the OIS moving unit.
Figure 23:
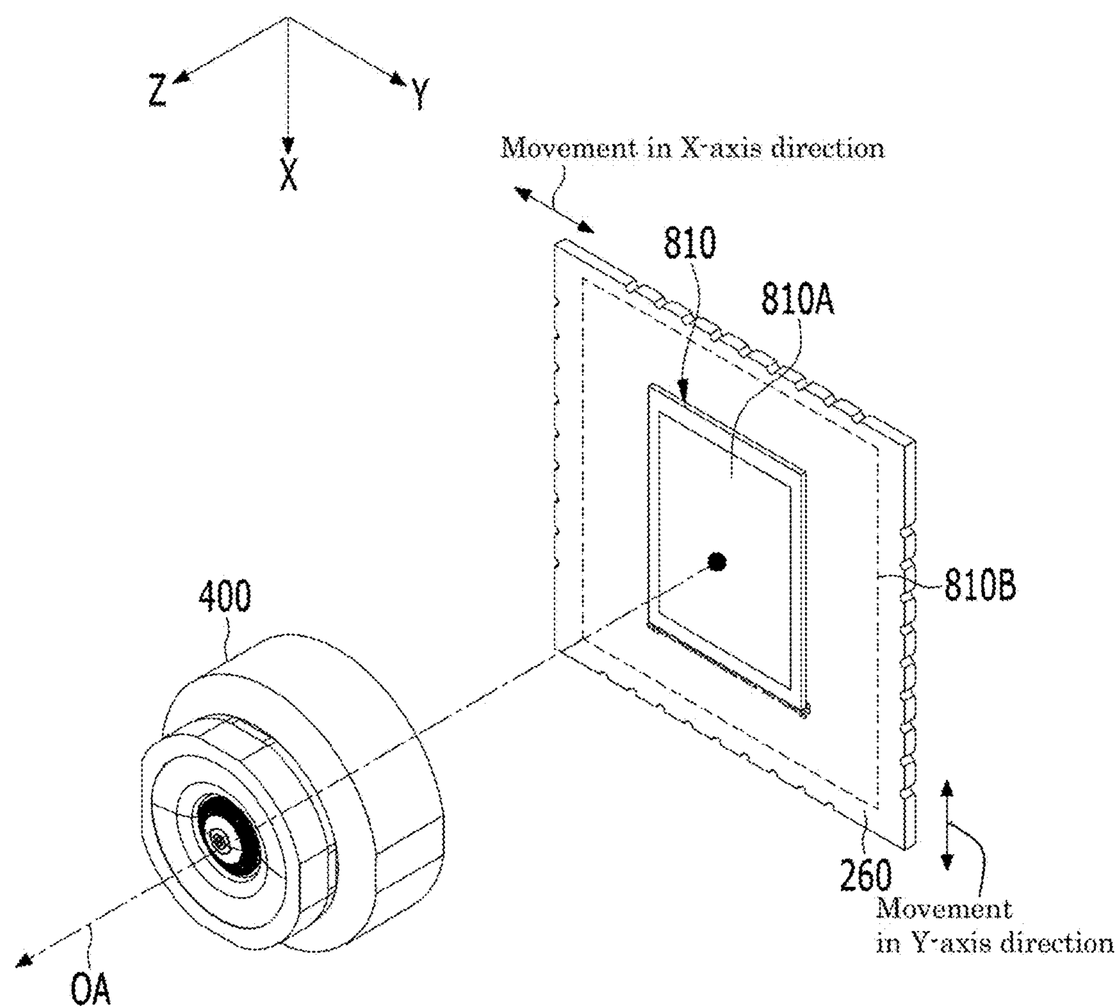
FIG. 23 illustrates movement of the image sensor according to movement of the OIS moving unit.

FIG. 22 illustrates an embodiment of a method of obtaining image data by controlling, by the controller 780 or 830, movement of the OIS moving unit, and FIG. 23 illustrates movement of the image sensor 810 according to movement of the OIS moving unit.

Referring to FIGS. 22 and 23, the controller 780 or 830 controls driving signals supplied to the first to fourth coil units 230-1 to 230-4, thereby controlling movement (or shift) of the OIS moving unit in the x-axis direction and/or movement (or shift) of the OIS moving unit in the y-axis direction.

In an example, as described above, the controller 780 or 830 may control driving signals supplied to the first to fourth coil units 230-1 to 230-4 using at least one of the first to third output voltages from the first to third sensors 240A to 240C, thereby controlling movement (or shift) of the OIS moving unit in the x-axis direction and/or movement (or shift) of the OIS moving unit in the y-axis direction.

An image or image data obtained according to the result of reception or detection by the imaging area of the image sensor 810 at the initial position of the OIS moving unit is referred to as initial position image data. In addition, the imaging area of the image sensor 810 at the initial position of the OIS moving unit is referred to as an "imaging area at the initial position".

The controller 780 or 830 sequentially moves the OIS moving unit to predetermined positions (S110). The controller 780 or 830 may sequentially move the OIS moving unit to predetermined positions for a predetermined time period.

In an example, the controller 780 or 830 may sequentially move the OIS moving unit based on code values (or data values) corresponding to the predetermined positions.

During the OIS feedback operation, the OIS moving unit may be sequentially moved based on a predetermined code value (or data value) corresponding to the output from the second position sensor 240. In this case, the predetermined code value (or data value) may be a predetermined code value (or data value) of the second position sensor 240 corresponding to each of the predetermined positions.

In an example, in order to move the OIS moving unit to the predetermined positions, the controller 780 or 830 may receive feedback on outputs from the second position sensor 240, e.g., the first and second sensors 240A and 240B, or code values (or data values) corresponding to the outputs.

The controller 780 or 830 may move the OIS moving unit once to predetermined positions for a predetermined time period. For example, the predetermined time period may be 1 millisecond (ms) to 1 second(s). Alternatively, for example, the predetermined time period may be 1 millisecond to 50 milliseconds. For example, the predetermined time period may be less than 1 second. Alternatively, for example, the predetermined time period may be less than 0.5 seconds. Alternatively, for example, the predetermined time period may be 1 second.

Alternatively, the controller 780 or 830 may repeatedly move the OIS moving unit to predetermined positions a predetermined number of times for 1 second.

In an example, the controller 780 or 830 may supply a driving signal to the second coil 230, and may control the driving signal to sequentially move the OIS moving unit to predetermined positions.

In an example, the predetermined positions may be positions spaced apart from the initial position of the OIS position sensor by a predetermined distance in different directions.

Alternatively, in an example, the predetermined positions may be positions spaced apart from the initial position of the OIS position sensor in different directions. Alternatively, in another embodiment, the predetermined positions may be positions spaced apart from the initial position of the OIS position sensor by different distances. In an example, the number of predetermined positions may be 2 or more. In an example, one of the predetermined positions may be the initial position of the OIS moving unit.

In an example, as described with reference to FIG. 21, sequential movement of the OIS moving unit to predetermined positions may be controlled using at least one of the first to third output voltages from the first to third sensors 240A to 240C.

In an example, sequential movement of the OIS moving unit to predetermined positions may be controlled using the first output voltage from the first sensor 240A and the second output voltage from the second sensor 240B. In addition, in another embodiment, the third sensor 240C may be omitted.

Figure 24:
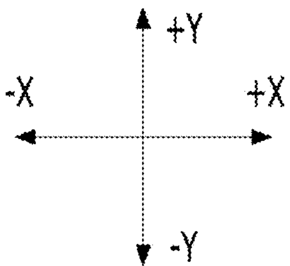
FIG. 24 illustrates an embodiment of four predetermined positions to which the OIS moving unit is moved.
Figure 24:
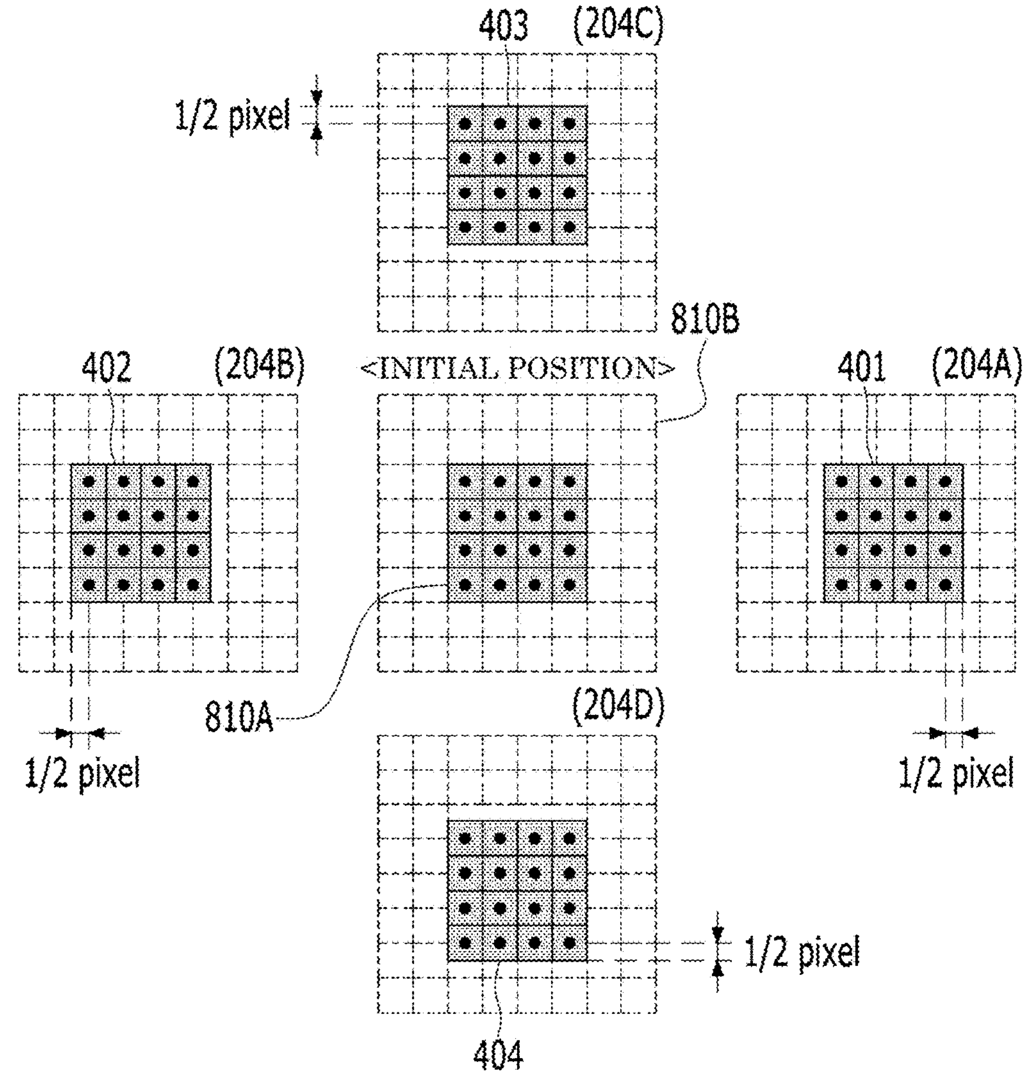

FIG. 24 illustrates an embodiment of four predetermined positions to which the OIS moving unit is moved.

Referring to FIG. 24, for example, the predetermined positions 204A to 204D may include first to fourth positions 204A to 204D spaced apart from the initial position of the OIS moving unit by a predetermined distance in different directions.

The first position 204A may be a position shifted from the initial position of the OIS moving unit by a first distance in a first positive horizontal direction (e.g., +x-axis direction). The second position 204B may be a position shifted from the initial position of the OIS moving unit by the first distance in a first negative horizontal direction (e.g., −x-axis direction). The third position 204C may be a position shifted from the initial position of the OIS moving unit by the first distance in a second positive horizontal direction (e.g., +y-axis direction). The fourth position 204D may be a position shifted from the initial position of the OIS moving unit by the first distance in a second negative horizontal direction (e.g., −y-axis direction).

For example, the first distance may be one half the length of a unit pixel of the imaging area 810A of the image sensor 810. Although the imaging area 810A of the image sensor 810 is illustrated in FIG. 24 as including sixteen unit pixels, this is merely illustrative for better understanding. In another embodiment, the number of unit pixels of the imaging area 810A may be two or more. Hereinafter, the length of the unit pixel in the horizontal or vertical direction will be referred to as a length of the unit pixel. The length of the unit pixel may be, for example, 0.5 micrometers to 10 micrometers. In another embodiment, the length of the unit pixel may be, for example, 1 micrometer to 5 micrometers.

The pixel area of the imaging area 810A at each of the predetermined positions may be defined as a pixel plane.

The pixel plane of the imaging area 810A at the first position 204A is referred to as a first pixel plane 401, the pixel plane of the imaging area 810A at the second position 204B is referred to as a second pixel plane 402, the pixel plane of the imaging area 810A at the third position 204C is referred to as a third pixel plane 403, and the pixel plane of the imaging area 810A at the fourth position 204D is referred to as a fourth pixel plane 404. In addition, the pixel plane of the imaging area 810A at the initial position of the OIS position sensor is referred to as an initial pixel plane.

Light that has passed through the lens module 400 may be supplied or radiated not only to the entirety of the imaging area 810A of the image sensor 810 but also to a predetermined peripheral area 810B (refer to FIG. 23) around the imaging area, and the predetermined peripheral area 810B may be referred to as a "light radiation area" or a "light area".

Each of the first to fourth pixel planes 401 to 404 may detect an area different from a light area (or "light detection area") detected by the initial pixel plane.

For example, the light detection area of the first pixel plane 401 may be an area shifted from the light detection area of the initial pixel plane by the first distance in the first positive horizontal direction (e.g., +x-axis direction). In addition, for example, the light detection area of each of the second to fourth pixel planes 402 to 404 may also be described as shown in FIG. 24. The light detection area of each of the first to fourth pixel planes 401 to 404 may be located within a light element area.

That is, in the embodiment, since the OIS moving unit is moved to the predetermined positions, the imaging area 810A of the image sensor 810 may detect different portions of the light radiation area at the respective predetermined positions, with the result that resolution may be improved.

Figure 25:
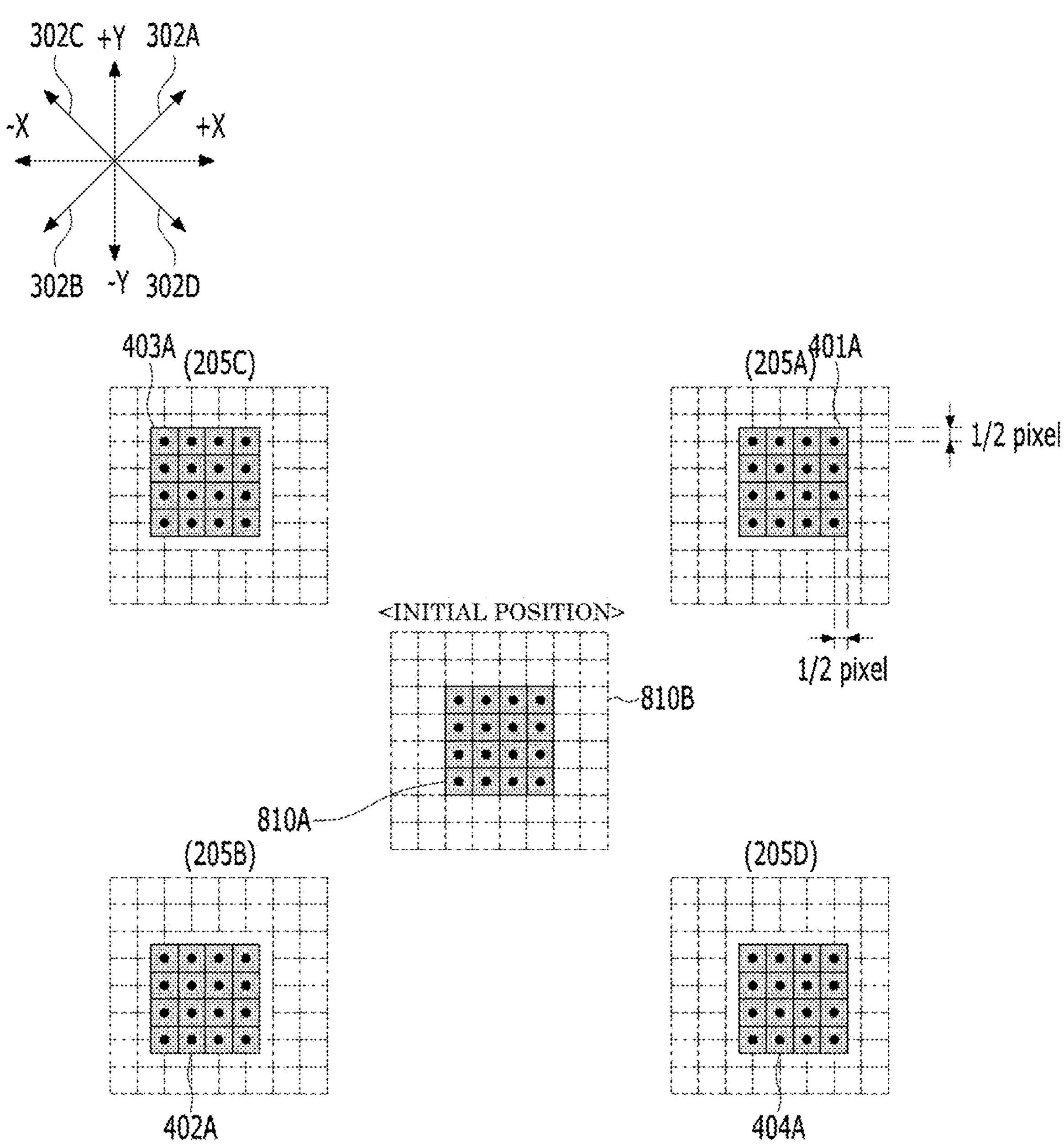
FIG. 25 illustrates another embodiment of four predetermined positions to which the OIS moving unit is moved.

FIG. 25 illustrates another embodiment 205A to 205D of four predetermined positions to which the OIS moving unit is moved.

Referring to FIG. 25, the first position 205A may be a position shifted from the initial position of the OIS moving unit by a second distance in a first oblique direction 302A. The second position 205B may be a position shifted from the initial position of the OIS moving unit by the second distance in a second oblique direction 302B. The third position 205C may be a position shifted from the initial position of the OIS moving unit by the second distance in a third oblique direction 302C. The fourth position 205D may be a position shifted from the initial position of the OIS moving unit by the second distance in a fourth oblique direction 302D. The first oblique direction and the second oblique direction may be opposite each other, and the third oblique direction and the fourth oblique direction may be opposite each other. The first oblique direction (or second oblique direction) and the third oblique direction (or fourth oblique direction) may be perpendicular to each other.

For example, the second distance may be root 2 (or square root 2) times the first distance in FIG. 24.

The imaging area 810A of the image sensor 810 in FIG. 25 may include first to fourth pixel planes 401A to 401D at the first to fourth positions 205A to 205D.

The controller 780 or 830 may move the OIS moving unit in one of the first to fourth oblique directions 302A to 302D by moving the OIS moving unit in the x-axis direction (+x-axis direction or −x-axis direction) and the y-axis direction (+y-axis direction or −y-axis direction). For example, as described with reference to FIGS. 20A and 20B, the OIS moving unit may be moved in the first oblique direction 302A by the sum of the first electromagnetic force Fx1 and the third electromagnetic force Fy1. The OIS moving unit may be moved in one of the first to fourth oblique directions by the sum of the electromagnetic force in the x-axis direction and the electromagnetic force in the y-axis direction described with reference to FIGS. 20A and 20B.

In FIG. 25, since the moving distance in the x-axis direction (or electromagnetic force in the x-axis direction) and the moving distance in the y-axis direction (or electromagnetic force in the y-axis direction) are equal to each other, each of the first to fourth oblique directions is tilted 45 degrees with respect to the X-axis or the Y-axis. However, the disclosure is not limited thereto. In another embodiment, the moving distance in the x-axis direction (or electromagnetic force in the x-axis direction) and the moving distance in the y-axis direction (or electromagnetic force in the y-axis direction) may be different from each other. In addition, the angle at which at least one of the first to fourth oblique directions is tilted with respect to the X-axis or the Y-axis may be different from the angles at which the other oblique directions are tilted. Alternatively, the angles at which the first to fourth oblique directions are tilted with respect to the X-axis or the Y-axis may be different from each other.

Alternatively, electromagnetic force generated by interaction between the magnet units 130-1 to 130-4 and the coil units 230-1 to 230-4 is controlled to act in one of the first to fourth oblique directions 302A to 302D, whereby the OIS moving unit may be moved in one of the first to fourth oblique directions 302A to 302D. For example, in another embodiment, the N pole and the S pole of each of the magnet units may be disposed so as to face each other in the first oblique direction 302A or the third oblique direction 302C, and the coil units may be disposed so as to correspond to or face the magnet units in the optical-axis direction, whereby electromagnetic force generated by interaction between the magnet units and the coil units may act in one of the first to fourth oblique directions. In FIG. 25, the moving distances in the first to fourth oblique directions 302A to 302D are equal to each other. However, in another embodiment, the moving distance in at least one of the first to fourth oblique directions 302A to 302D may be different from the moving distances in the other oblique directions. Alternatively, the moving distances in the first to fourth oblique directions 302A to 302D may be different from each other.

Figure 26:
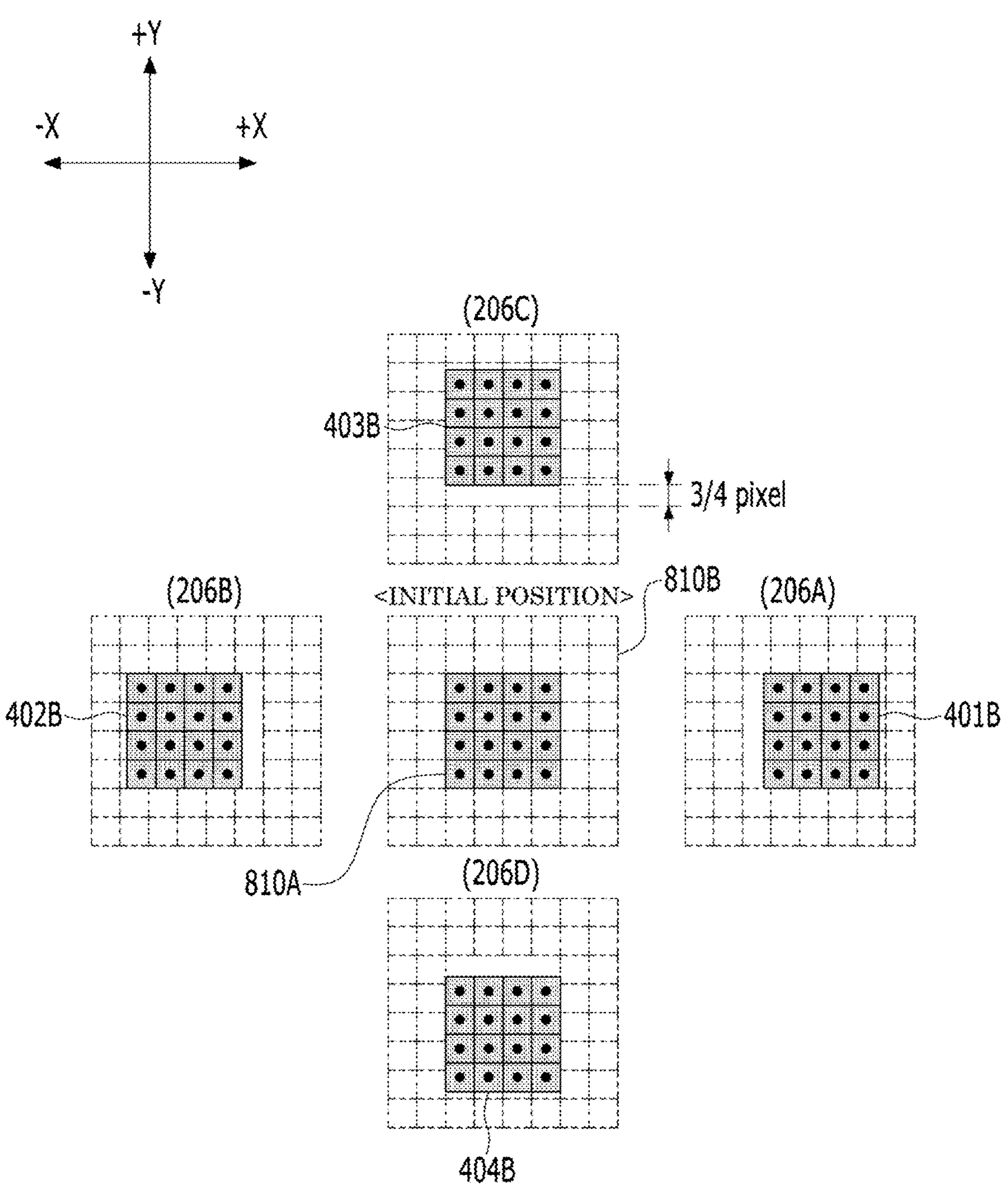
FIG. 26 illustrates still another embodiment of four predetermined positions to which the OIS moving unit is moved.

FIG. 26 illustrates still another embodiment 206A to 206D of four predetermined positions to which the OIS moving unit is moved.

FIG. 26 is a modified example of FIG. 24, and the moving distance of the OIS moving unit in FIG. 26 may be different from the moving distance of the OIS moving unit in FIG. 25.

In FIG. 26, each of the first to fourth positions 206A to 206D may be a position spaced apart from the initial position of the OIS moving unit by a third distance. The imaging area of the OIS moving unit may include first to fourth pixel planes 401B to 404B at the first to fourth positions 206A to 206D.

For example, the third distance may be greater than one half the length of the unit pixel of the imaging area 810A of the image sensor 810 and may be shorter than the length of the unit pixel of the imaging area 810A.

For example, the controller 780 or 830 or the memory 512 may store first data values (or first code values) that correspond to, match, or map to the entire displacement (or entire stroke range) of the OIS moving unit in the x-axis direction and second data values (or second code values) that correspond to, match, or map to the entire displacement (or entire stroke range) of the OIS moving unit in the y-axis direction.

For example, the data value (or code value) may be a data value that corresponds to, matches, or maps to the output voltage from the second position sensor 240. Alternatively, for example, the first data value may be a data value that corresponds to, matches, or maps to the second output voltage from the second sensor 240B, and the second data value may be a data value that corresponds to, matches, or maps to the first output voltage from the first sensor 240A.

For example, the lower limit value of the moving distance of the OIS moving unit for obtaining a pixel plane may be greater than or equal to a unit distance by which the OIS moving unit may move due to increase in the data value (or code value). If the lower limit value of the moving distance is less than the unit distance by which the OIS moving unit may move, it is not possible to move the OIS moving unit to the predetermined positions.

For example, when the entire stroke range of the OIS moving unit in the x-axis direction is 600 micrometers and 2048 data values (or codes) correspond to, match, or map to the entire stroke range, the unit moving distance of the OIS moving unit corresponding to 1 code may be about 0.3 micrometers, and the lower limit value of the moving distance of the OIS moving unit for obtaining a pixel plane may be greater than or equal to 0.3 micrometers.

For example, when the length of the unit pixel of the imaging area 810A is 1 micrometer, one half the length of the unit pixel may be 0.5 micrometers, and the third distance may be 0.5 micrometers. Accordingly, the conditions for the lower limit value of the moving distance of the OIS moving unit for obtaining the pixel plane may be satisfied. For example, the moving distance of the OIS moving unit for obtaining the pixel plane may be greater than or equal to 0.3 micrometers.

In addition, for example, the moving distance of the OIS moving unit for obtaining the pixel plane based on the initial position may be greater than or equal to one half the length of the unit pixel of the imaging area 810A.

Alternatively, for example, the moving distance of the OIS moving unit for obtaining the pixel plane may be greater than or equal to a quarter the length of the unit pixel of the imaging area 810A. Alternatively, for example, the moving distance of the OIS moving unit for obtaining the pixel plane may be greater than or equal to a third the length of the unit pixel of the imaging area 810A. Alternatively, for example, the moving distance of the OIS moving unit for obtaining the pixel plane may be greater than or equal to one half the length of the unit pixel of the imaging area 810A.

For example, the moving distance of the OIS moving unit for obtaining the pixel plane may be less than or equal to ten times the length of the unit pixel of the imaging area 810A. Alternatively, for example, the moving distance of the OIS moving unit for obtaining the pixel plane may be less than or equal to five times the length of the unit pixel of the imaging area 810A. Alternatively, for example, the moving distance of the OIS moving unit for obtaining the pixel plane may be less than or equal to three-halves the length of the unit pixel of the imaging area 810A.

The order in which the OIS moving unit is moved to the first to fourth positions 204A to 204D, 205A to 205D, or 206A to 206D in FIGS. 24 to 26 may be variously set. For example, the OIS moving unit may be sequentially moved to the positions in order of proximity in order to reduce the moving time and the moving distance.

Figure 27:
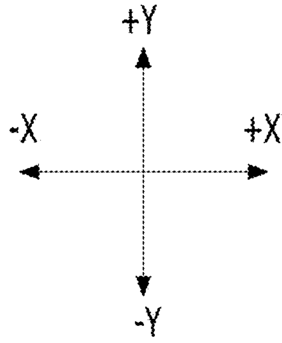
FIG. 27 illustrates still another embodiment of four predetermined positions to which the OIS moving unit is moved.
Figure 27:
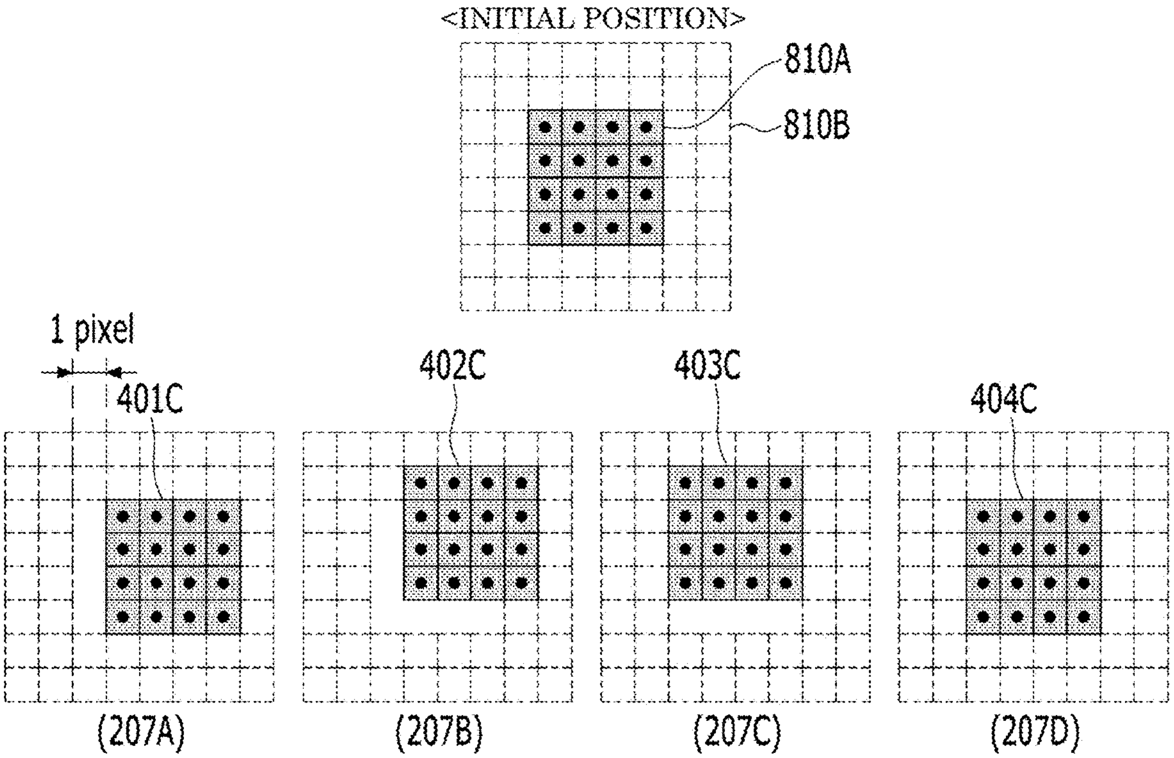

FIG. 27 illustrates still another embodiment 207A to 207D of four predetermined positions to which the OIS moving unit is moved.

FIG. 27 is another modified example of FIG. 24. In FIG. 27, the OIS moving unit may be sequentially moved by a fourth distance to the first position 207A, the second position 207B, the third position 207C, and the fourth position 207D. For example, in FIG. 27, the fourth distance may be equal to the length of the unit pixel of the imaging area 810A.

The first position 207A may be spaced apart from the initial position of the OIS moving unit by a fourth distance in the +x-axis direction, the second position 207B may be spaced apart from the first position 207A by the fourth distance in the +y-axis direction, the third position 207C may be spaced apart from the second position 207B by the fourth distance in the −x-axis direction, and the fourth position 207D may be spaced apart from the third position 207C by the fourth distance in the −y-axis direction. The OIS moving unit may be sequentially moved to the first position 207A, the second position 207B, the third position 207C, and the fourth position 207D.

For example, in another embodiment, the fourth distance may be greater than or equal to one half the length of the unit pixel of the imaging area 810A of the image sensor 810, and may be less than or equal to the length of the unit pixel of the imaging area 810A. In still another embodiment, the fourth distance may be less than or equal to ten times the length of the unit pixel of the imaging area 810A. In still another embodiment, the fourth distance may be less than or equal to five times the length of the unit pixel of the imaging area 810A.

The imaging area of the OIS moving unit may include first to fourth pixel planes 401C to 404C at the first to fourth positions 207A to 207D.

In FIG. 27, the OIS moving unit may be moved from the initial position thereof by the fourth distance in the +x-axis direction, may be moved by the fourth distance in the +y-axis direction, may be moved by the fourth distance in the −x-axis direction, and may be moved by the fourth distance in the −y-axis direction. For example, the OIS moving unit may be moved in the counterclockwise direction.

In another embodiment, the OIS moving unit may be moved alternately in the x-axis direction (+x-axis direction or −x-axis direction) and the Y-axis direction (+y-axis direction or −y-axis direction) so as to be sequentially moved to the predetermined positions in the clockwise direction or to be sequentially moved to the predetermined positions in the counterclockwise direction. In FIG. 27, the moving distances in the +x-axis direction, the −x-axis direction, the +y-axis direction, and the −y-axis direction may be equal to each other. However, in another embodiment, the moving distance in the x-axis direction (e.g., +x-axis direction (or −x-axis direction) and the moving distance in the y-axis direction (+y-axis direction (or −y-axis direction) may be different from each other.

In the embodiment shown in FIG. 27, since the OIS moving unit is sequentially moved to the first to fourth positions 207A to 207D, the moving distance of the OIS moving unit for obtaining the first to fourth pixel planes 401C to 404C may be minimized, and the time required to obtain the first to fourth pixel planes 401C to 404C may be reduced, whereby the operation speed may be increased. As a result, more pixel planes may be obtained within a given time period.

Figure 28:
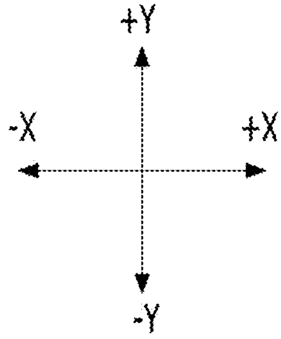
FIG. 28 illustrates still another embodiment of four predetermined positions to which the OIS moving unit is moved.
Figure 28:
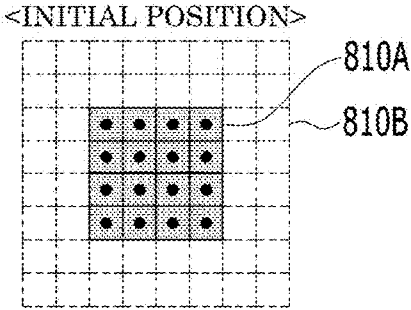
Figure 28:
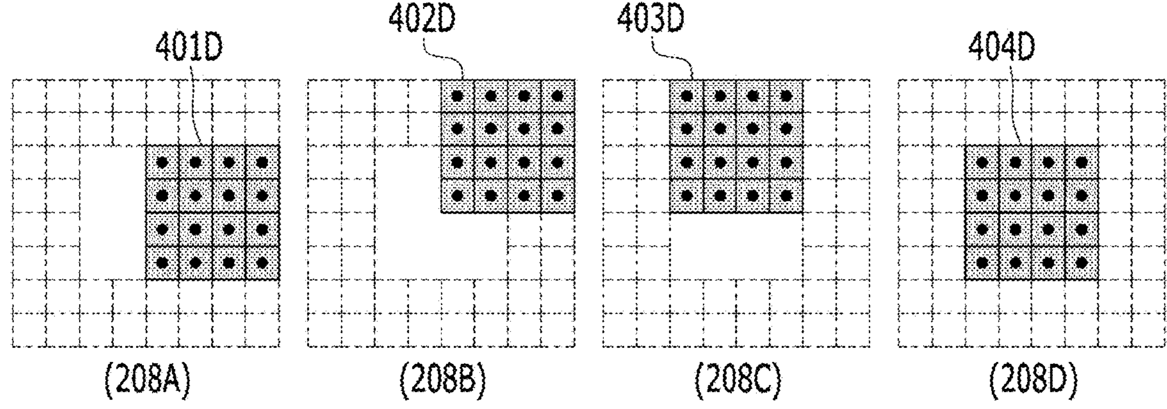

FIG. 28 illustrates still another embodiment 208A to 208D of four predetermined positions to which the OIS moving unit is moved.

FIG. 28 is a modified example of FIG. 27. In FIG. 28, the OIS moving unit may be sequentially moved by a fifth distance to the first position 208A, the second position 208B, the third position 208C, and the fourth position 208D. In FIG. 28, the imaging area of the OIS moving unit may include first to fourth pixel planes 401D to 404D at the first to fourth positions 208A to 208D.

For example, in FIG. 28, the fifth distance may be twice the length of the unit pixel of the imaging area 810A. The description given with reference to FIG. 27 may be equally or similarly applied to FIG. 28, with the exception of difference in the moving distance.

Figure 29:
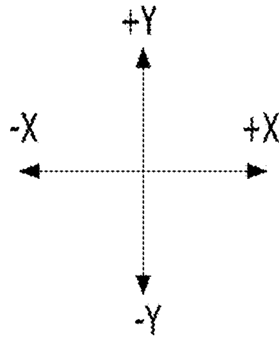
FIG. 29 illustrates still another embodiment of four predetermined positions to which the OIS moving unit is moved.
Figure 29:
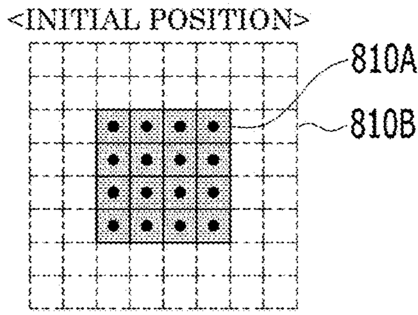
Figure 29:
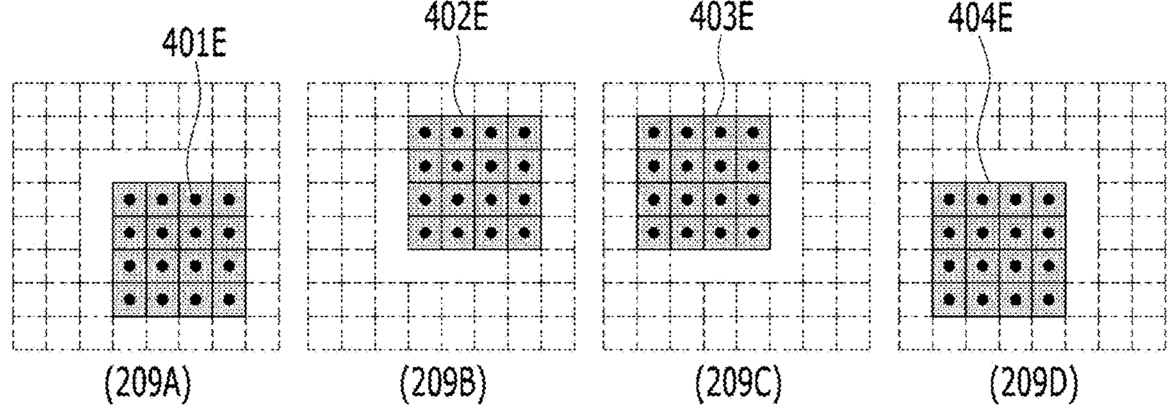

FIG. 29 illustrates still another embodiment 209A to 209D of four predetermined positions to which the OIS moving unit is moved.

Referring to FIG. 29, the OIS moving unit may be sequentially moved to the first position 209A, the second position 209B, the third position 209C, and the fourth position 209D.

The first position 209A may be a position shifted from the initial position of the OIS moving unit by a sixth distance in one (e.g., the fourth oblique direction 302D) of the first to fourth oblique directions. The second position 209B may be a position shifted from the first position 209A by a seventh distance in the +y-axis direction, the third position 209C may be a position shifted from the second position 209B by the seventh distance in the −x-axis direction, and the fourth position 209D may be a position shifted from the third position 209C by the seventh distance in the −y-axis direction. The position shifted from the fourth position 209D by the seventh distance in the +x-axis direction may be the first position 209A.

For example, the sixth distance may be root 2 (or square root 2) times the length of the unit pixel of the imaging area 810A. For example, the seventh distance may be twice the length of the unit pixel of the imaging area 810A.

In another embodiment, the seventh distance may be greater than or equal to one half the length of the unit pixel of the imaging area 810A and may be less than or equal to ten times the length of the unit pixel of the imaging area 810A.

In FIG. 29, the imaging area 810A of the OIS moving unit may include first to fourth pixel planes 401E to 404E at the first to fourth positions 209A to 209D.

In FIG. 29, the OIS moving unit may be sequentially moved to the first position 209A, the second position 209B, the third position 209C, and the fourth position 209D, and may be moved in the counterclockwise direction. In another embodiment, as described with reference to FIG. 29, the OIS moving unit may be moved in the counterclockwise direction, starting from the first position 209A.

Figure 30:
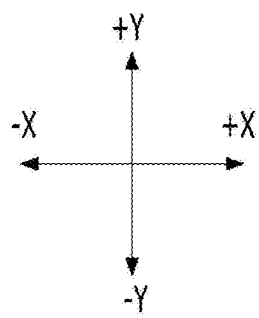
FIG. 30 illustrates an embodiment of nine predetermined positions to which the OIS moving unit is moved.
Figure 30:
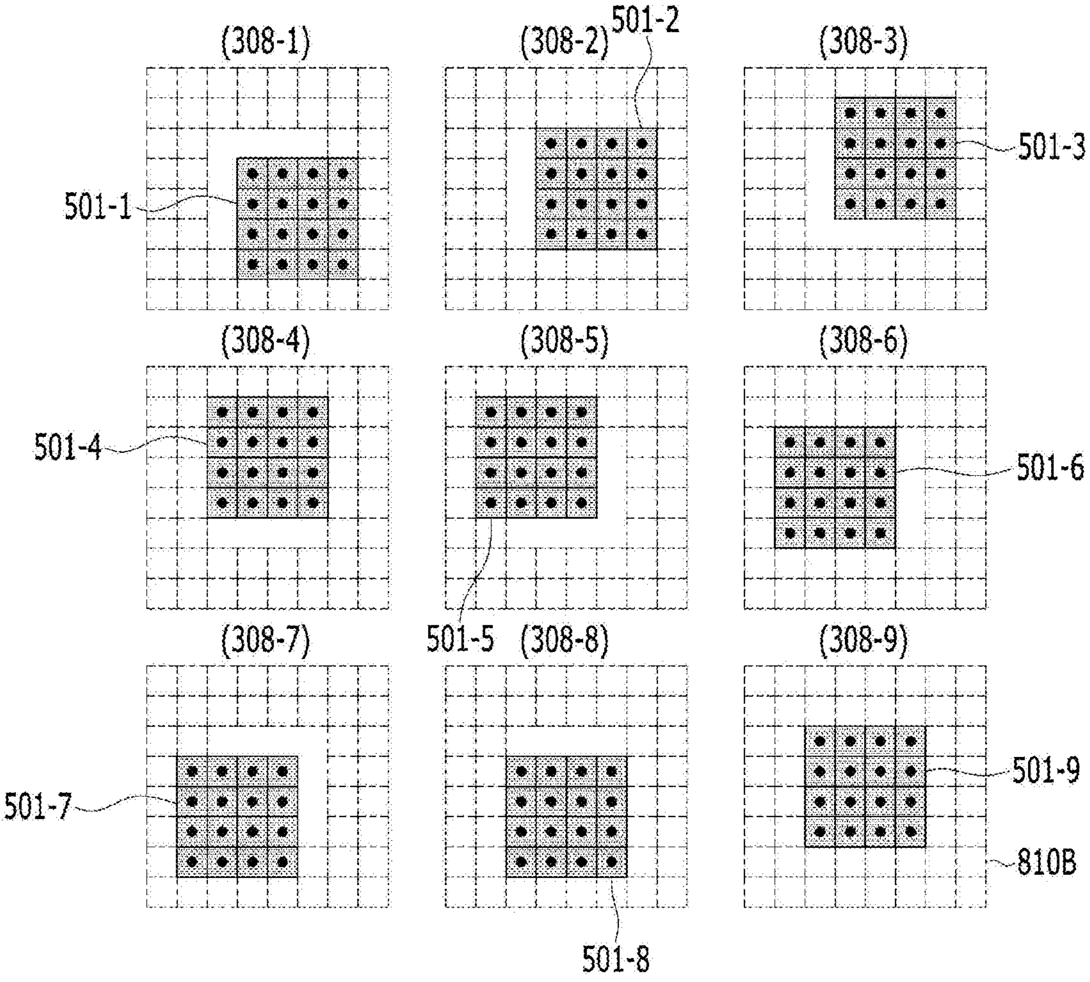

FIG. 30 illustrates an embodiment 308-1 to 308-9 of nine predetermined positions to which the OIS moving unit is moved.

Referring to FIG. 30, the OIS moving unit may be sequentially moved to the first position 308-1, the second position 308-2, the third position 308-3, the fourth position 308-4, the fifth position 308-5, the sixth position 308-6, the seventh position 308-7, the eighth position 308-8, and the ninth position 308-9.

The first position 308-1 may be a position shifted from the initial position of the OIS moving unit by the sixth distance in one (e.g., the fourth oblique direction 302D) of the first to fourth oblique directions.

From the second position 308-2 to the ninth position 308-9, the OIS moving unit may be moved by the fourth distance in the x-axis direction (+x-axis direction or −x-axis direction) or the y-axis direction (+y-axis direction or −y-axis direction). For example, the ninth position 308-9 may be the initial position of the OIS moving unit.

In FIG. 30, the imaging area 810A of the OIS moving unit may include first to ninth pixel planes 501-1 to 501-9 at the first to ninth positions 308-1 to 308-9.

In a photographing mode of the camera device for taking a photograph or a snapshot (hereinafter referred to as a "first mode"), the OIS moving unit may be moved to the predetermined positions described above with reference to FIGS. 24 to 30 for a predetermined time period (e.g., 1 second). For example, in the first mode, the OIS moving unit may be moved to the predetermined positions once for a predetermined time period.

For example, the image sensor 810 may obtain a plurality of pixel planes of the imaging area 810A through the OIS moving unit for a predetermined time period (e.g., 1 second).

For example, the speed of the image sensor 810, for example, the frame rate, may mean the number of frames of the imaging area 810A that the image sensor 810 is capable of transmitting or processing for 1 second. For example, the frame rate may be 10 frames/sec to 100 frames/sec. Alternatively, for example, the frame rate may be 30 frames/sec to 60 frames/sec. Alternatively, for example, the frame rate may be 30 frames/sec or 60 frames/sec.

In an example, the number of pixel planes of the imaging area 810A obtained for 1 second, which have been described with reference to FIGS. 24 to 30, may be less than or equal to the number of frames of the image sensor 810 that may be processed for 1 second.

For example, the speed of the image sensor 810 may be a predetermined number of frames per second. The OIS moving unit may be repeatedly moved to the predetermined positions a predetermined number of times for 1 second. For example, the predetermined number of times may be greater than or equal to the number of predetermined positions, and may be less than or equal to a value obtained by dividing the predetermined number of frames by the number of predetermined positions.

For example, when the speed of the image sensor 810 is 30 frames/sec (or 60 frames/sec), the image sensor 810 may transmit or process 30 pixel planes per second. Accordingly, the image sensor 810 having a rate of 30 frames/sec (or 60 frames/sec) may sufficiently transmit or process four pixel planes of the embodiments shown in FIGS. 24 to 29 in the first mode.

Figure 31:
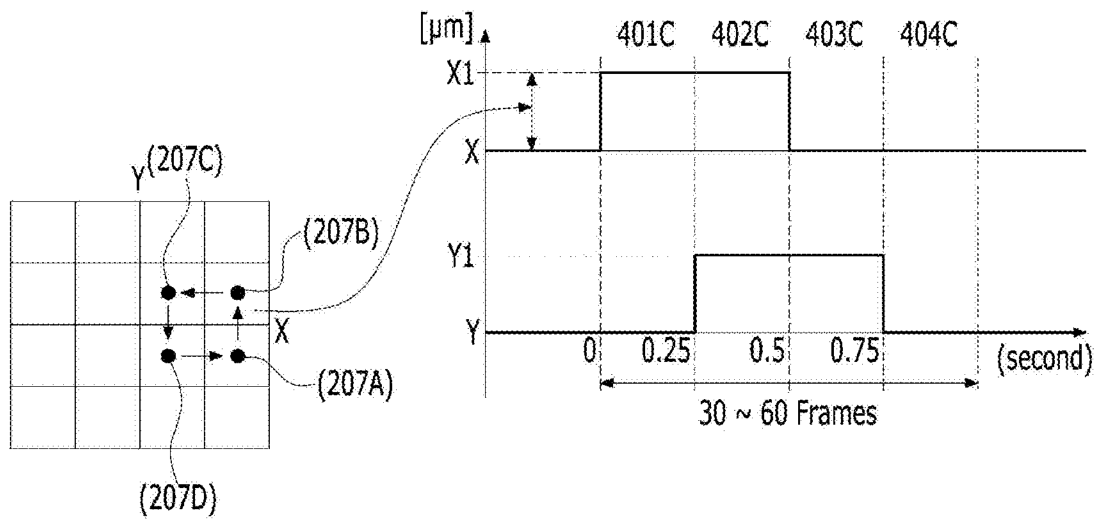
FIG. 31 illustrates x-axis and y-axis coordinates at first to fourth positions for 1 second in the embodiment shown in FIG. 27.

FIG. 31 illustrates x-axis and y-axis coordinates at the first to fourth positions 401C to 404C for 1 second in the embodiment shown in FIG. 27. In FIG. 31, the X-axis coordinate represents time, and the Y-axis coordinate represents the coordinates of the first to fourth positions 401C to 404C.

Referring to FIG. 31, in a first section (0 to 0.25 seconds), the imaging area 810 may be moved to the first position 401C, and the coordinates (x,y) of the first position 401C may be (X1,0). In a second section (0.25 seconds to 0.5 seconds), the imaging area 810 may be moved to the second position 402C, and the coordinates (x,y) of the second position 402C may be (X1, Y1).

In a third section (0.5 seconds to 0.75 seconds), the imaging area 810 may be moved to the third position 403C, and the coordinates (x,y) of the third position 403C may be (0, Y1). In a fourth section (0.75 to 1 second), the imaging area 810 may be moved to the fourth position 404C, and the coordinates (x,y) of the fourth position 404C may be (0,0).

The description given with reference to FIG. 31 may be equally or similarly applied to all of the embodiments shown in FIGS. 24 to 26, 28, and 29. In addition, the embodiment shown in FIG. 30 differs only in the number of predetermined positions from the embodiment shown in FIG. 27, and the coordinates of the first to ninth positions may be explained in a manner of dividing 1 second into nine sections.

In a photographing mode of the camera device for taking a video (hereinafter referred to as a "second mode"), sequential movement to the predetermined positions described above with reference to FIGS. 24 to 30 is repeatedly performed. For example, in the second mode, sequential movement of the OIS moving unit to the predetermined positions described with reference to FIGS. 24 to 30 may be repeated.

For example, in FIGS. 24 to 29, since the OIS moving unit is repeatedly moved to four predetermined positions, four pixel planes may be repeatedly obtained.

For example, when the speed of the image sensor 810 is a predetermined number of frames per second, the OIS moving unit may be repeatedly moved to the predetermined positions in order to obtain a predetermined number of pixel planes per second.

For example, the predetermined number may be greater than the number of predetermined positions, and may be less than or equal to the predetermined number of frames.

For example, when the number of predetermined positions is 4 and the speed of the image sensor 810 is 30 frames/sec, the OIS moving unit may be repeatedly moved to the predetermined positions in order to obtain four to thirty pixel planes for 1 second.

Figure 32:
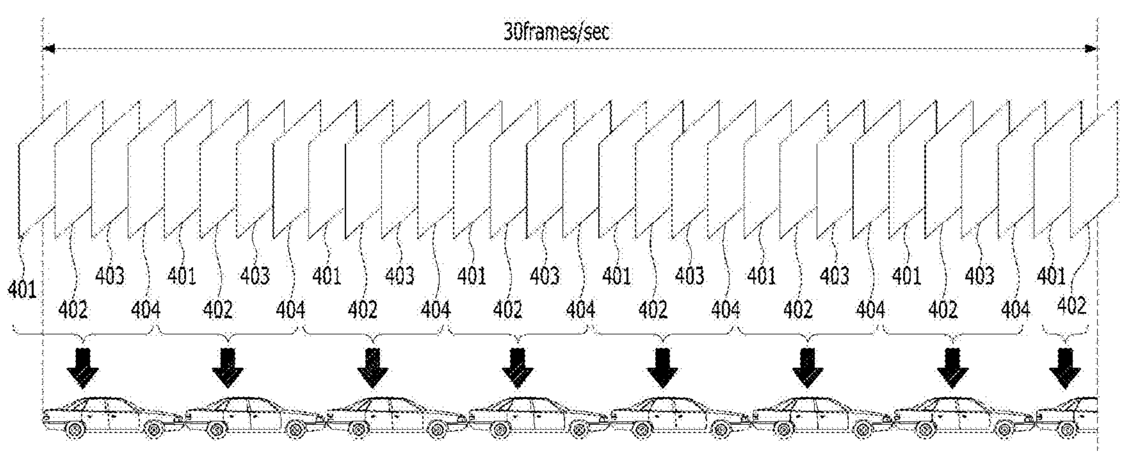
FIG. 32 illustrates pixel planes of an imaging area at the predetermined positions in a video-capturing mode.

FIG. 32 illustrates pixel planes of the imaging area 810A at the predetermined positions in the video-capturing mode. Referring to FIG. 32, the number of predetermined positions may be four, and the speed of the image sensor 810 may be 30 frames/sec. FIG. 32 illustrates the pixel planes 401 to 404 shown in FIG. 24. However, in another embodiment, the embodiments shown in FIGS. 25 to 30 may be equally or similarly applied thereto.

For example, the OIS moving unit may be repeatedly moved to the predetermined positions 204A to 204D so that 30 pixel planes 401 to 404 are obtained per second in order to match the speed of the image sensor 810.

If the pixel planes 401 to 404 at the predetermined positions 204A to 204D are defined as one group, thirty pixel planes may include first to seventh groups and an eighth group. Each of the first to seventh groups may include first to fourth pixel planes, and the eighth group may include first and second pixel planes. Each group may match one image (e.g., one vehicle shown in FIG. 32). As will be described later, one image may be realized using four pixel planes included in each group.

Referring to FIG. 22, subsequently, the image sensor 810 obtains pixel data (or pixel values) of the imaging area 810A at each of the predetermined positions (S120).

For example, the image sensor 810 may obtain pixel data (or pixel values) corresponding to each of the pixel planes. For example, pixel data may be obtained like digital data Ds shown in FIG. 34.

For example, the image sensor 810 may obtain data corresponding to pixels of each of the pixel planes. The pixel data of the pixel plane may be defined as an "image plane". The image plane stores information such as the bit width of pixel data expressed in a two-dimensional array and the size of the plane.

Subsequently, the controller 780 receives pixel data (or pixel values) of the imaging area 810A at the predetermined positions from the image sensor 810, performs image processing on the received pixel data, and obtains image data corresponding to the result of the image processing.

For example, the controller 780 may obtain a high-resolution image by performing image processing on the received pixel data.

For example, the pixel data transmitted from the image sensor 810 may be stored in a memory 760.

The controller 780 may include an image processing function for image processing. The image processing function may include at least one of pixel map definition (PMD), four arithmetic operations, logical operation, statistics, block operation, filtering, copy, or data input/output.

For example, the controller 780 may perform image processing on pixel data (or image planes) corresponding to the pixel planes at the predetermined positions, and may transmit the result of the image processing to a display module 751. The display module 751 may display an image based on the result of the image processing.

For example, the controller 780 may interpolate or average pixel data (or image planes) corresponding to the pixel planes at the predetermined positions using an interpolation method (or average method), and may obtain interpolation data (or average data) corresponding to the result of the interpolation or average. The display module 751 may display an image based on the interpolation data (or average data).

For example, in the case of pixels overlapping twice or more at the same position in the pixel planes, the average value of the data of the overlapping pixels may be used as image data.

Figure 33:
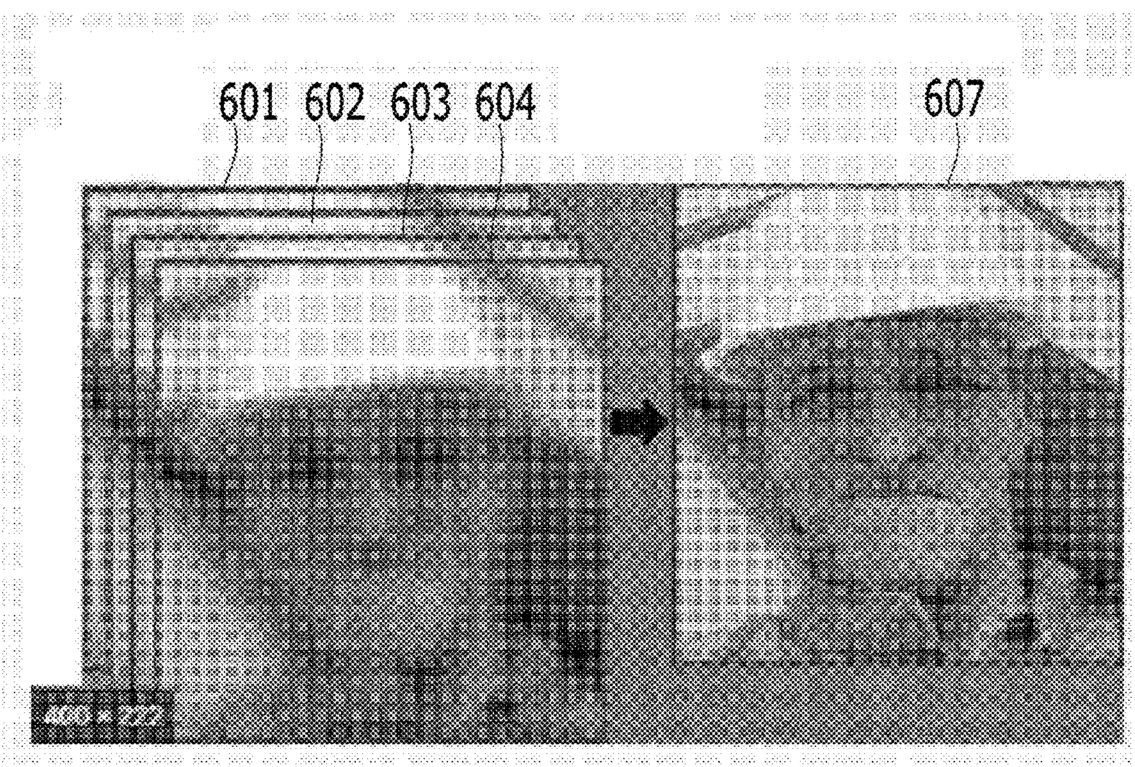
FIG. 33 and FIG. 34.

FIG. 33 illustrates an image 607 obtained by performing image processing on images 601 to 604 corresponding to the pixel planes at the predetermined positions according to an embodiment.

For example, the pixel planes at the predetermined positions in FIG. 33 may correspond to one of the embodiments described with reference to FIGS. 24 to 29.

The controller 780 may perform image processing on the image planes corresponding to the predetermined positions. A final image 607 may be obtained based on the result of the image processing. The final image 607 may be displayed through the display module 751. Since the final image 607 is obtained as a result of performing image processing on the image planes corresponding to the predetermined positions, the resolution of the final image 607 may be improved.

Along with enhancement of functionality of mobile phones, a hand-tremor compensation function is added, and consumer's needs for products exhibiting high resolution are increasing. In order to achieve high resolution, the size of the image sensor needs to be increased, and in order to achieve high image quality, the pixel size of the image sensor also needs to be increased. However, increase in the size and pixel size of the image sensor may cause great increase in the size of the camera module, and may make placement of other components in the mobile phone difficult. In order to inhibit increase in the size of the image sensor, there is need for technology for achieving higher resolution using an image sensor having a given size. There is a method of increasing resolution by adding interpolation data using software. However, there is a limitation on resolution correction using software.

The embodiments may achieve higher resolution through a combination of mechanical movement of the OIS moving unit and addition of interpolation data using software. According to the embodiments, since the image sensor 810 is moved to the predetermined positions shifted in the x-axis or y-axis direction perpendicular to the optical axis and an image is realized according to the result of performing image processing on the pixel data of the pixel planes at the predetermined positions, the resolution obtainable through an image sensor having a given condition may be increased without increase in the pixel size of the image sensor.

In FIGS. 24 to 29, it may be possible to improve resolution by four times or more by securing pixel data on four additional positions (six additional positions in FIG. 30) through movement of the image sensor 810.

Figure 34:
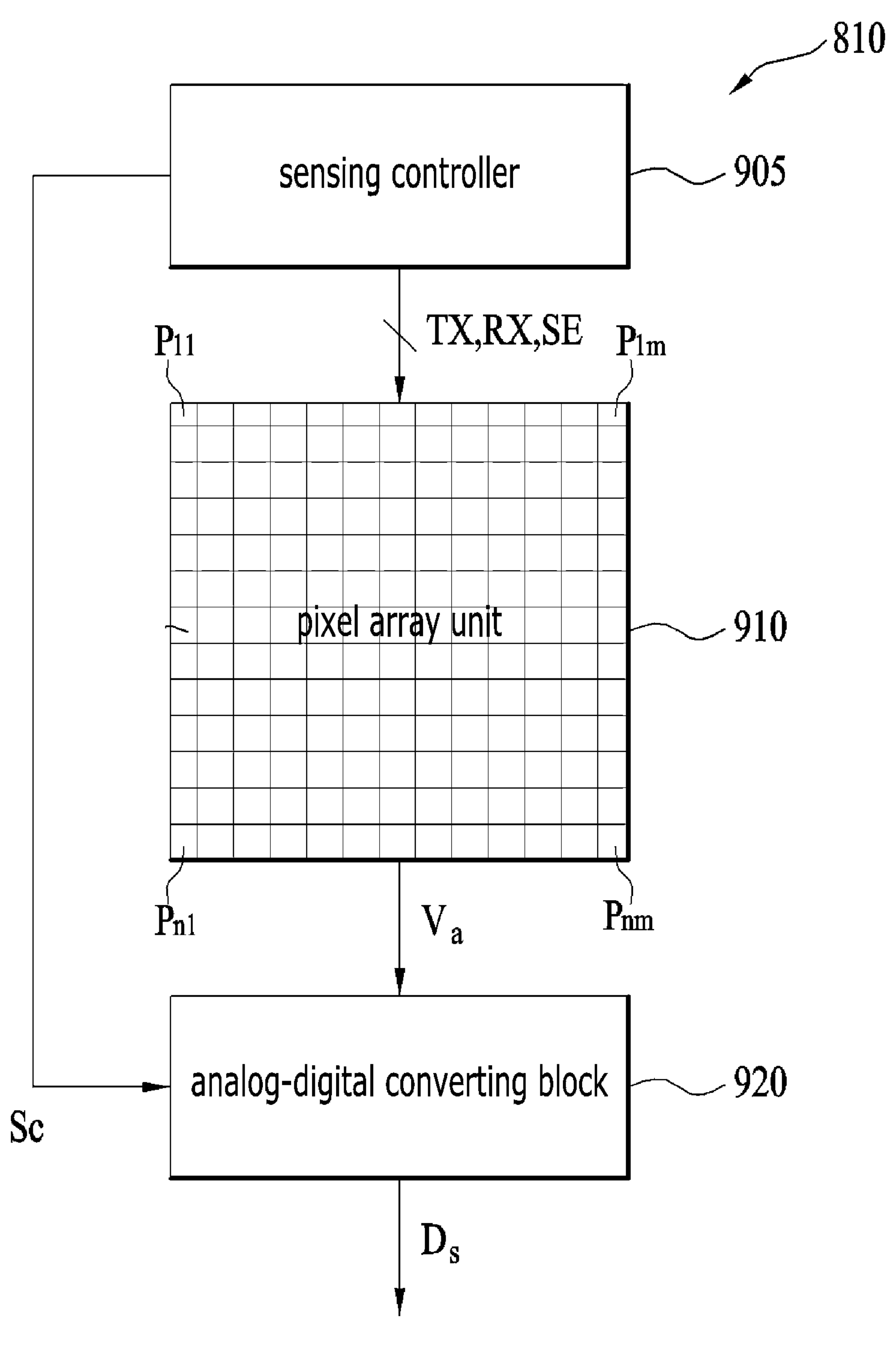

FIG. 34 is a block diagram of an embodiment of the image sensor 810.

Referring to FIG. 34, the image sensor 810 may include a sensing controller 905, a pixel array unit 910, and an analog-to-digital converting block 920. The pixel array unit 910 may include the above-described imaging area 810A, or may be the imaging area 810A.

The sensing controller 905 may output control signals (e.g., a reset signal RX, a transmission signal TX, and a selection signal SE) for control of transistors included in the pixel array unit 910 and control signals Sc for control of the analog-to-digital converting block 920.

The pixel array unit 910 may include a plurality of unit pixels P11 to Pnm (n and m being natural numbers >1). The plurality of unit pixels P11 to Pnm may be arranged in the form of a matrix including rows and columns. Each of the unit pixels P11 to Pnm may be a photoelectric conversion element that detects light and converts the light into an electrical signal.

The pixel array unit 910 may include sensing lines connected to output terminals of the unit pixels P11 to Pnm.

For example, each of the unit pixels P11 to Pnm may include a photodiode, a transfer transistor, a reset transistor, a drive transistor, and a select transistor. However, the disclosure is not limited thereto. The number of transistors included in each of the unit pixels may be three or five, rather than being limited to four.

The photodiode may absorb light, and may generate charges using the absorbed light.

The transfer transistor may transmit the charges generated by the photodiode to a sensing node (e.g., a floating diffusion region) in response to the transmission signal TX. The reset transistor may reset the unit pixel in response to the reset signal RX. The drive transistor may be controlled in response to the voltage of the sensing node, may be implemented as a source follower, and may serve as a buffer. The select transistor may be controlled in response to the selection signal SE, and may output a detection signal Va to the output terminal of the unit pixel.

The analog-to-digital converting block 920 performs sampling on the detection signal Va, which is an analog signal output from the pixel array unit 910, and converts the sampled detection signal into a digital signal Ds or digital data. The analog-to-digital converting block 920 may perform correlated double sampling (CDS) in order to remove fixed pattern noise inherent to the pixel.

The sensing controller 905 and the analog-to-digital converting block 920 described above may be provided separately from the controller 830. In another embodiment, the sensing controller 905, the analog-to-digital converting block 920, and the controller 830 may be implemented as a single controller. In still another embodiment, the sensing controller 905 and the analog-to-digital converting block 920 may be included in the controller 780.

In one embodiment, the OIS moving unit may be moved using an OIS coil. However, in another embodiment, the OIS moving unit may be moved in the X-axis direction and/or the Y-axis direction or may be rotated, tilted, or rolled with respect to the optical axis using a shape memory alloy, instead of the OIS coil.

In addition, the camera device according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 35:
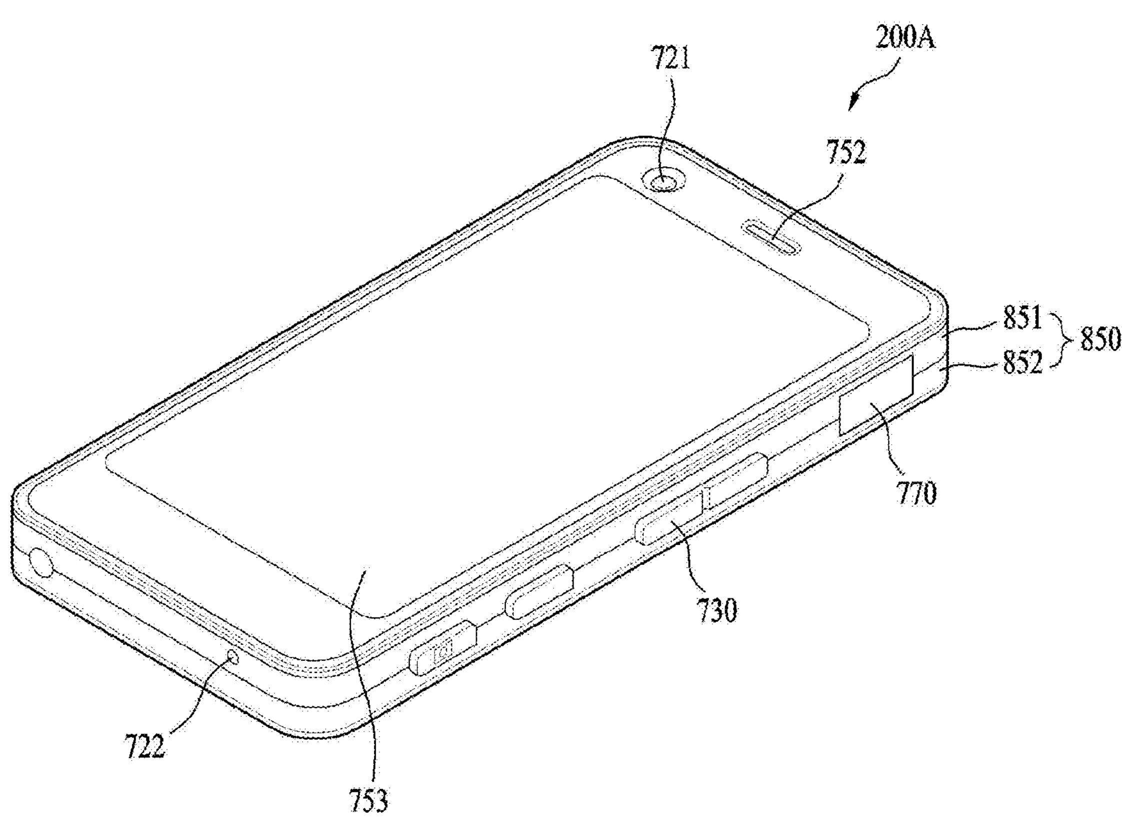
FIG. 35 is a perspective view of an optical instrument according to an embodiment.
Figure 36:
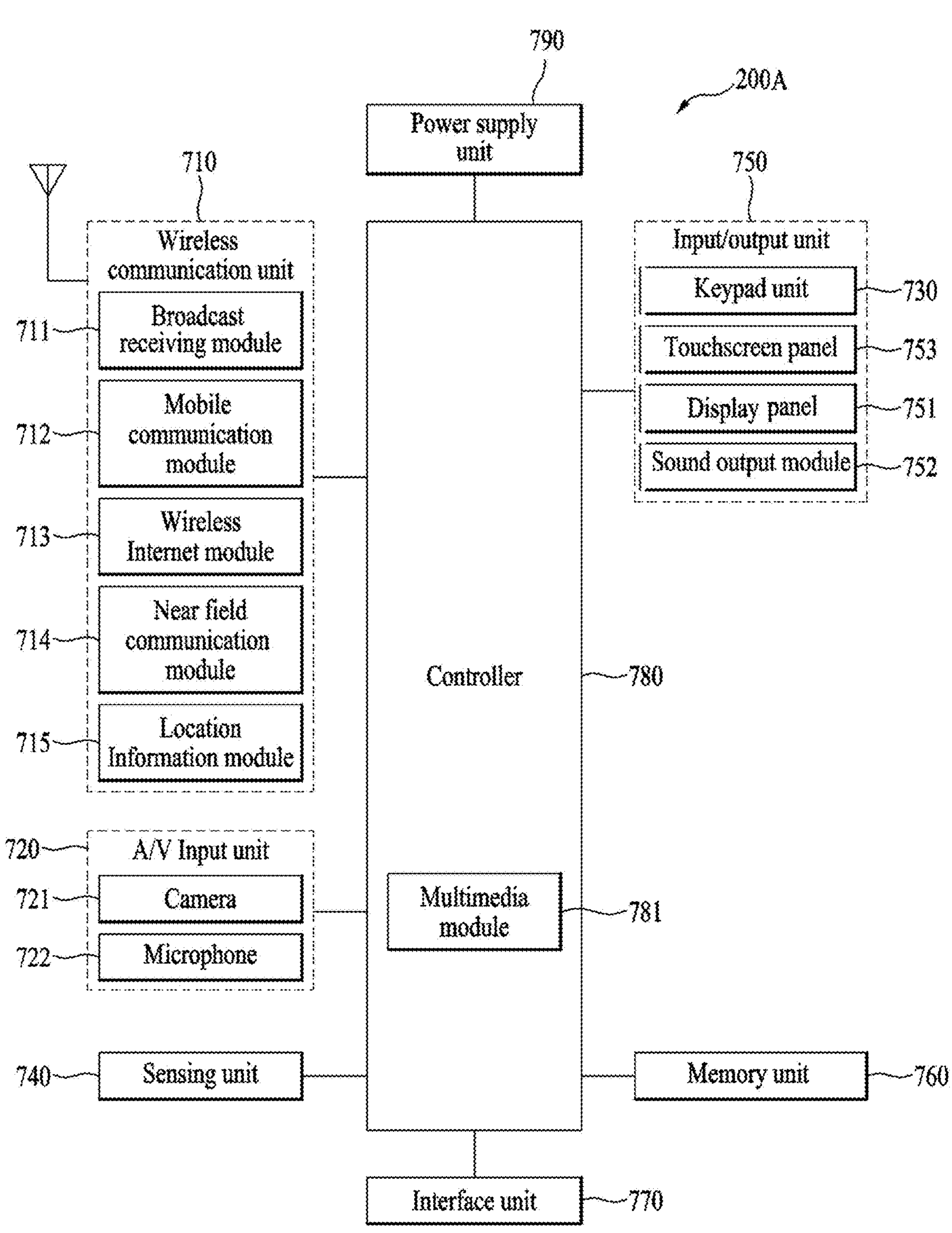
FIG. 36 is a configuration diagram of the optical instrument shown in FIG. 35.

FIG. 35 is a perspective view of an optical instrument 200A according to an embodiment, and FIG. 36 is a configuration diagram of the optical instrument 200A shown in FIG. 35.

Referring to FIGS. 35 and 36, the optical instrument 200A may include a body 850, a wireless communication unit 710, an A/V input unit 720, a sensing unit 740, an input/output unit 750, a memory 760, an interface unit 770, a controller 780, and a power supply unit 790.

The body 850 shown in FIG. 35 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the optical instrument 200A and a wireless communication system or between the optical instrument 200A and a network in which the optical instrument 200A is located. In an example, the wireless communication unit 710 may include a broadcast receiving module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera device according to the embodiment.

The sensing unit 740 may sense the current state of the optical instrument 200A, such as the open or closed state of the optical instrument 200A, the position of the optical instrument 200A, the presence or absence of a user's touch, the orientation of the optical instrument 200A, or the acceleration/deceleration of the optical instrument 200A, and may generate a sensing signal to control the operation of the optical instrument 200A. For example, when the optical instrument 200A is a slide-type phone, whether the slide-type phone is open or closed may be detected. In addition, the sensor serves to sense whether power is supplied from the power supply unit 790 or whether the interface unit 770 is coupled to an external device.

The input/output unit 750 serves to generate visual, audible, or tactile input or output. The input/output unit 750 may generate input data to control the operation of the optical instrument 200A, and may display information processed in the optical instrument 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal receiving mode, a call mode, a recording mode, a voice recognition mode, or a broadcast receiving mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g., a phone book, messages, audio, still images, pictures, and moving images). For example, the memory 760 may store images captured by the camera 721, for example, pictures or moving images. For example, the memory 760 may store software, an algorithm, or an equation for implementation of the hand-tremor compensation described above.

The interface unit 770 serves as a passage for connection between the optical instrument 200A and an external device. The interface unit 770 may receive data or power from the external device, and may transmit the same to respective components inside the optical instrument 200A, or may transmit data inside the optical instrument 200A to the external device. For example, the interface unit 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the optical instrument 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touchscreen is perceived as characters or images.

The power supply unit 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera device capable of improving resolution by securing additional pixel data of an imaging area of an image sensor through mechanical movement of an OIS moving unit and an optical instrument including the same.

The invention claimed is:

1. A camera device comprising:

a fixed unit;

a moving unit spaced apart from the fixed unit, the moving unit comprising an image sensor having an imaging area comprising a unit pixel; and a first controller configured to move the moving unit with respect to the fixed unit in a direction perpendicular to an optical axis, wherein the first controller is configured to sequentially move the moving unit to predetermined positions, and the image sensor is configured to obtain pixel data of the imaging area at the predetermined positions, and wherein the first controller is configured to sequentially move the moving unit to the predetermined positions in a clockwise or counterclockwise direction, the movement being performed along directions parallel to an X-axis or a Y-axis, each of the X-axis and the Y-axis being perpendicular to the optical axis.

2. The camera device according to claim 1, wherein the predetermined positions are positions spaced apart from an initial position of the moving unit by a predetermined distance in different directions, and the initial position is a position of the moving unit in a state in which the moving unit is not moved by the first controller.

3. The camera device according to claim 2, wherein the predetermined positions comprise: a first position shifted from the initial position by the predetermined distance in a positive x-axis direction, a second position shifted from the initial position by the predetermined distance in a negative x-axis direction, a third position shifted from the initial position by the predetermined distance in a positive y-axis direction, and a fourth position shifted from the initial position by the predetermined distance in a negative y-axis direction.

4. The camera device according to claim 2, wherein the predetermined distance is greater than or equal to one half a length of the unit pixel.

5. The camera device according to claim 4, wherein the predetermined distance is less than or equal to ten times the length of the unit pixel.

6. The camera device according to claim 1, wherein, in a mode of taking a snapshot, the moving unit is sequentially moved to the predetermined positions for a predetermined time period.

7. The camera device according to claim 6, wherein the predetermined time period is 1 second.

8. The camera device according to claim 1, wherein, in a mode of taking a video, sequential movement of the moving unit to the predetermined positions is repeatedly performed.

9. The camera device according to claim 8, wherein a pixel area of the imaging area at each of the predetermined positions is defined as a pixel plane, and wherein, when a speed of the image sensor is a predetermined number of frames per second, the moving unit is repeatedly moved to the predetermined positions in order to obtain a predetermined number of pixel planes per second.

10. The camera device according to claim 1, wherein the predetermined positions comprise: a first position spaced apart from an initial position of the moving unit by a predetermined distance in a +x-axis direction, a second position spaced apart from the first position by the predetermined distance in a +y-axis direction, a third position spaced apart from the second position by the predetermined distance in a-x-axis direction, and a fourth position spaced apart from the third position by the predetermined distance in a-y-axis direction, and wherein the moving unit is sequentially moved to the first position, the second position, the third position, and the fourth position.

11. The camera device according to claim 1, comprising:

a magnet disposed in the fixed unit; and a coil disposed in the moving unit so as to face the magnet, wherein the first controller is configured to supply a driving signal to the coil and control the driving signal to sequentially move the moving unit to the predetermined positions.

12. The camera device according to claim 1, wherein one of the predetermined positions is an initial position of the moving unit, and the initial position is a position of the moving unit in a state in which the moving unit is not moved by the first controller.

13. A camera device comprising:

a fixed unit;

a moving unit spaced apart from the fixed unit and comprising an image sensor having an imaging area comprising a plurality of unit pixels; and a first controller configured to move the moving unit with respect to the fixed unit in a direction perpendicular to an optical axis, wherein the first controller sequentially moves the moving unit to predetermined positions for a predetermined time period, and the image sensor obtains pixel data of the imaging area at each of the predetermined positions, and wherein the first controller is configured to sequentially move the moving unit to the predetermined positions in a clockwise or counterclockwise direction, the movement being performed along directions parallel to an X-axis or a Y-axis, each of the X-axis and the Y-axis being perpendicular to the optical axis.

14. The camera device according to claim 13, wherein the first controller is configured to move the moving unit to the predetermined positions once for the predetermined time period.

15. The camera device according to claim 13, wherein the first controller is configured to move the moving unit to the predetermined positions twice or more for the predetermined time period.

16. The camera device according to claim 13, wherein the predetermined time period is 1 second.

17. The camera device according to claim 14, wherein the moving unit is repeatedly moved to the predetermined positions a predetermined number of times for 1 second.

18. The camera device according to claim 17, wherein the speed of the image sensor is a predetermined number of frames per second, and wherein the predetermined number of times is greater than or equal to a number of predetermined positions, and less than or equal to a value obtained by dividing the predetermined number of frames by the number of predetermined positions.

19. An optical instrument comprising:

the camera device according to claim 1; and a second controller configured to perform image processing on pixel data of the imaging area at the predetermined positions transmitted from the image sensor.

* * * * *